(12) United States Patent
Cai et al.

(10) Patent No.: US 12,550,209 B2
(45) Date of Patent: Feb. 10, 2026

(54) SIDELINK SIGNALING RADIO BEARER CONFIGURATION METHOD AND COMMUNICATIONS APPARATUS

(71) Applicant: Huawei Technologies Co., Ltd., Shenzhen (CN)

(72) Inventors: Yu Cai, Shenzhen (CN); Haibo Xu, Beijing (CN); Chuting Yao, Beijing (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 320 days.

(21) Appl. No.: 18/006,444

(22) PCT Filed: Jul. 20, 2021

(86) PCT No.: PCT/CN2021/107248
§ 371 (c)(1),
(2) Date: Jan. 23, 2023

(87) PCT Pub. No.: WO2022/017348
PCT Pub. Date: Jan. 27, 2022

(65) Prior Publication Data
US 2023/0269799 A1   Aug. 24, 2023

(30) Foreign Application Priority Data
Jul. 24, 2020 (CN) .......................... 202010724475.0

(51) Int. Cl.
*H04W 76/14* (2018.01)
*H04W 76/11* (2018.01)

(52) U.S. Cl.
CPC ............ *H04W 76/14* (2018.02); *H04W 76/11* (2018.02)

(58) Field of Classification Search
CPC ..... H04W 72/40; H04W 76/11; H04W 76/14; H04W 88/04; H04W 4/44; H04W 76/27; H04L 5/0053
See application file for complete search history.

(56) References Cited

U.S. PATENT DOCUMENTS 11,071,006 B1 * 7/2021 Pan .................... H04W 28/24
11,533,673 B1 * 12/2022 Pan .................... H04W 40/22
(Continued)

FOREIGN PATENT DOCUMENTS

CN       108029148 A    5/2018
CN       108391285 A    8/2018
(Continued)

OTHER PUBLICATIONS

English translation of the International Search Report (ISR) for PCT/CN2021/107248 mailed Sep. 28, 2021; retrieved from the Internet on Apr. 14, 2025 (Year: 2025).*
(Continued)

*Primary Examiner* — Benjamin H Elliott, IV
(74) *Attorney, Agent, or Firm* — Conley Rose, P.C.

(57) ABSTRACT

A remote terminal device receives first configuration information by using a relay terminal device, where the first configuration information includes or indicates information used to configure a first sidelink radio link control (SL RLC) bearer on a sidelink between the remote terminal device and the relay terminal device. The remote terminal device establishes the first SL RLC bearer based on the first configuration information, where the first SL RLC bearer corresponds to at least one first signaling radio bearer (SRB). The remote terminal device transmits control signaling to a network device on the at least one first SRB by using the relay terminal device.

20 Claims, 24 Drawing Sheets

(56) References Cited

U.S. PATENT DOCUMENTS

| | | | |
|---|---|---|---|
| 2017/0048643 A1* | 2/2017 | Lee | H04L 1/1867 |
| 2017/0048922 A1* | 2/2017 | Lee | H04W 76/38 |
| 2017/0181206 A1* | 6/2017 | Lee | H04W 76/32 |
| 2018/0069618 A1* | 3/2018 | Loehr | H04W 72/1263 |
| 2018/0077624 A1* | 3/2018 | Jung | H04W 36/385 |
| 2018/0213577 A1* | 7/2018 | Burbidge | H04W 76/10 |
| 2018/0343692 A1* | 11/2018 | Lee | H04W 92/18 |
| 2019/0261450 A1* | 8/2019 | Adachi | H04W 76/11 |
| 2021/0297841 A1* | 9/2021 | Jung | H04W 4/12 |
| 2022/0007447 A1* | 1/2022 | Hong | H04W 76/18 |
| 2022/0053418 A1* | 2/2022 | Back | H04B 17/318 |
| 2022/0159753 A1* | 5/2022 | Kuo | H04W 72/1263 |
| 2023/0013067 A1* | 1/2023 | Liu | H04W 28/24 |
| 2023/0023135 A1* | 1/2023 | Liu | H04W 4/00 |
| 2023/0053135 A1* | 2/2023 | Kuo | H04W 76/12 |
| 2023/0073469 A1* | 3/2023 | Wang | H04W 40/22 |
| 2023/0093763 A1* | 3/2023 | Liu | H04W 76/14 370/315 |
| 2023/0171823 A1* | 6/2023 | Zhao | H04W 76/14 370/329 |
| 2023/0180313 A1* | 6/2023 | Freda | H04W 76/14 370/310 |
| 2023/0269799 A1* | 8/2023 | Cai | H04W 72/40 370/329 |
| 2024/0163935 A1* | 5/2024 | Cheng | H04W 76/10 |

FOREIGN PATENT DOCUMENTS

| | | |
|---|---|---|
| CN | 111417215 A | 7/2020 |
| CN | 111901847 A | 11/2020 |
| EP | 3579642 A1 | 12/2019 |
| WO | 2016159698 A1 | 10/2016 |
| WO | 2020085831 A1 | 4/2020 |
| WO | 2021207505 A1 | 10/2021 |

OTHER PUBLICATIONS

Huawei et al.: "Study aspects of UE-to-Network relay and solutions for L2 relay", 3GPP Draft; R2-2008047, 3rd Generation Partnership Project (3GPP), RAN WG2, Online; Aug. 17, 2020-Aug. 28, 2020 (Aug. 7, 2020), XP051912666, total.

Qualcomm Incorporated, Additional considerations for Layer-2 UE-to-Network Relay solution [online], 3GPP TSG SA WG2 #139e S2-2004290 Internet URL: https://www.3gpp.org/ftp/tsg_sa/WG2_Arch/TSGS2_139e_Electronic/Docs/S2-2004290.zip, May 22, 2020, total 10 pages.

Zte: "Discussion on connection establishment and bearer setup", 3GPP Draft; R2-168149 Discussion on Connection Establishment and Bearer Setup, 3rd Generationpartnership Project (3GPP), RAN WG2, Reno, USA; Nov. 14, 2016-Nov. 18, 2016 Nov. 13, 2016 (Nov. 13, 2016), XP051177836, total.

Zte, Discussion on QoS aspects for feD2D [online], 3GPP TSG RAN WG2 #97bis R2-1703071, Internet URL: http://www.3gpp.org/ftp/tsg_ran/WG2_RL2/TSGR2_97bis/Docs/R2-1703071.zip, Mar. 24, 2017, total 3 pages.

Coolpad, Discussion on Radio Bearer Mapping for L2 Relay UE [online], 3GPP TSG RAN WG2 #97bis R2-1703371, Internet URL: http://www.3gpp.org/ftp/tsg_ran/WG2_RL2/TSGR2_97bis/Docs/R2-1703371.zip, Mar. 24, 2017, total 4 pages.

R2-1701248, Coolpad, "Discussion on RRC Message Transportation via L2 Relay UE," 3GPP TSG-RAN WG2 Meeting #97, Feb. 13-18, 2017, 3 pages.

3rd Generation Partnership Project; Technical Specification Group Radio Access Network; NR; NR and NG-RAN Overall Description; Stage 2(Release 15),3GPP TS 38.300 V15.9.0 (Mar. 2020), total:100pages.

* cited by examiner

SIDELINK SIGNALING RADIO BEARER CONFIGURATION METHOD AND COMMUNICATIONS APPARATUS

CROSS-REFERENCE TO RELATED APPLICATIONS

This is a U.S. National Stage of International Patent Application No. PCT/CN2021/107248, filed on Jul. 20, 2021, which claims priority to Chinese Patent Application No. 202010724475.0, filed on Jul. 24, 2020. Both of the aforementioned applications are hereby incorporated by reference in their entireties.

TECHNICAL FIELD

This application relates to the communication field, and more specifically, to a sidelink signaling radio bearer configuration method and a communications apparatus.

BACKGROUND

Vehicle-to-device (vehicle-to-everything, V2X) communication is an important key technology for implementing environment perception and information exchange in the internet of vehicles. A communication link between different user terminal devices may be referred to as a sidelink (sidelink, SL). Vehicle-to-entity (entity) communication (vehicle-to-everything, V2X) may be performed through the sidelink. The V2X communication may be considered as a special case of device-to-device (device-to-device. D2D) communication. A communication link between different terminal devices may be referred to as an SL. For example, a communication link between vehicles may be an SL.

A terminal device may communicate with a network device through the SL through relay of a relay terminal device when the terminal device is not within coverage of the network device. However, how the terminal device transmits control signaling with the network device by using the relay terminal device is not defined currently. This cannot ensure quality of control signaling transmission, and results in low control signaling transmission efficiency.

SUMMARY

This application provides a sidelink signaling radio bearer configuration method and a communications apparatus, to configure an SL RLC bearer on a sidelink PC5 interface for a Uu SRB of a remote terminal device, and establish the SL RLC bearer to transmit the Uu SRB. Control signaling carried on the Uu SRB is transmitted on the SL RLC bearer between the remote terminal device and a relay terminal device. This can improve quality of the control signaling transmitted on the Uu SRB, and improve control signaling transmission efficiency.

According to a first aspect, a sidelink signaling radio bearer configuration method is provided. The method may be performed by a remote terminal device or a chip used in the remote terminal device. The remote terminal device transmits data and signaling with a network device by using a relay terminal device. The method includes: A first terminal device (namely, the remote terminal device) receives first configuration information by using a second terminal device (namely, the relay terminal device), where the first configuration information includes or indicates information used to configure a first sidelink radio link control SL RLC bearer on a sidelink between the first terminal device and the second terminal device. The first terminal device establishes the first SL RLC bearer based on the first configuration information, where the first SL RLC bearer corresponds to at least one first signaling radio bearer SRB. The first terminal device transmits control signaling to the network device on the at least one first SRB (namely, at least one Uu SRB) by using the second terminal device.

According to a second aspect, a sidelink signaling radio bearer configuration method is provided. The method may be performed by a remote terminal device or a chip used in the remote terminal device. The remote terminal device transmits data and signaling with a network device by using a relay terminal device. The method includes: A first terminal device (namely, the remote terminal device) obtains first configuration information, where the first configuration information is predefined, and the first configuration information includes or indicates information used to configure a first sidelink radio link control SL RLC bearer on a sidelink between the first terminal device and a second terminal device (namely, the relay terminal device). The first terminal device establishes the first SL RLC bearer based on the first configuration information, where the first SL RLC bearer corresponds to at least one first signaling radio bearer SRB. The first terminal device transmits control signaling to the network device on the at least one first SRB by using the second terminal device.

According to the sidelink signaling radio bearer configuration method provided in the first aspect or the second aspect, the first terminal device establishes the first SL RLC bearer between the first terminal device and the second terminal device, and the first terminal device can transmit the control signaling to the network device on the at least one first SRB by using the second terminal device. Therefore, the Uu SRB is transmitted on the SL RLC bearer on the sidelink between the first terminal device and the second terminal device. This can ensure normal transmission of the control signaling on the Uu SRB of the first terminal device, and improve quality and efficiency of the control signaling transmitted on the Uu SRB.

In this embodiment of this application, a radio bearer on a Uu interface corresponding to the remote terminal device includes a DRB used to transmit user-plane data and an SRB used to transmit control-plane data. A Uu DRB of the remote terminal device may be understood as a DRB between the remote terminal device and the network device, and a Uu SRB of the remote terminal device may be understood as an SRB between the remote terminal device and the network device. The Uu SRB needs to be first transmitted to the relay terminal device through a PC5 interface, and then forwarded by the relay terminal device to the radio access network device.

In this embodiment of this application, the first SL RLC bearer may alternatively correspond to at least one first DRB, the first DRB may be understood as a Uu DRB, and the first DRB is used to transmit user-plane data between the first terminal device and the network device. In other words, the first SL RLC bearer corresponds to at least one first DRB, or the first SL RLC bearer corresponds to at least one first SRB.

In a possible implementation of the first aspect or the second aspect, the first SL RLC bearer is different from a second SL RLC bearer on the sidelink, the second SL RLC bearer corresponds to a second signaling radio bearer SRB (namely, an SL SRB), and the first terminal device transmits control signaling to the second terminal device on the second SRB. The first terminal device transmits the control signaling or control-plane data to the second terminal device on the second SRB. In this implementation, the SL RLC bearer different from that of the SL SRB is configured for the Uu SRB. Because SL RLC bearers corresponding to the SL SRB (the second SRB) and the Uu SRB (the first SRB) are different, the first terminal device and the second terminal device can distinguish between, based on the different SL RLC bearers, the Uu SRB and the SL SRB on the SL between the first terminal device and the second terminal device; and correctly distinguish between the control signaling carried on the Uu SRB and the control signaling carried on the SL SRB after distinguishing between the Uu SRB and the SL SRB. This can ensure accurate transmission of the control signaling, and improve data transmission efficiency and user experience.

In a possible implementation of the first aspect or the second aspect, the first configuration information includes: one or more of SL RLC configuration information corresponding to the first SL RLC bearer, configuration information of a logical channel corresponding to the first SL RLC bearer, an index or identifier of the first SL RLC bearer, an identifier or index of the at least one first SRB, or a logical channel identity LCID corresponding to the first SL RLC bearer.

Optionally, when the SL RLC bearer different from that of the SL SRB is configured for the Uu SRB, or when the SL RLC bearer same as that of the SL SRB is configured for the Uu SRB, a possible implementation is as follows: SL RLC bearer configuration corresponding to a Uu SRB 0 is defined in a standard protocol. SL RLC bearer configuration corresponding to a Uu SRB 1/a Uu SRB 2/a Uu SRB 3 is defined by default in the standard protocol. The network device may further configure SL RLC bearer configuration corresponding to the Uu SRB 1/Uu SRB 2/Uu SRB 3. It should be understood that SL RLC bearers corresponding to the Uu SRB 1, the Uu SRB 2, and the Uu SRB 3 may be different RLC bearers.

In a possible implementation of the first aspect or the second aspect, the first configuration information is determined by the network device. The network device sends the first configuration information to the first terminal device by using the second terminal device. For example, the first configuration information is first sent by the network device to the second terminal device, and then forwarded by the second terminal device to the first terminal device. That is, the first terminal device receives, by using the second terminal device, the first configuration information sent by the network device.

In a possible implementation of the first aspect or the second aspect, the method further includes: The first terminal device sends second configuration information to the second terminal device, where the second configuration information is determined based on the first configuration information. For example, when the first configuration information is first sent by the network device to the second terminal device, and is directly forwarded by the second terminal device to the first terminal device, the first terminal device can determine the second configuration information based on the first configuration information, where the second configuration information is used by the second terminal device to establish the first SL RLC bearer.

Optionally, content included in the second configuration information may be the same as content included in the first configuration information, content included in the second configuration information may be a subset of content included in the first configuration information, content included in the second configuration information is content that is determined based on the first configuration information and that is different from that of the first configuration information, or partial content included in the second configuration information may be the same as partial content included in the first configuration information.

In a possible implementation of the first aspect or the second aspect, the second configuration information includes: a logical channel identity LCID corresponding to the first SL RLC bearer, where the LCID is used to identify a logical channel corresponding to the first SL RLC bearer, or used to identify the first SL RLC bearer.

In a possible implementation of the first aspect or the second aspect, the first configuration information is determined by the second terminal device based on third configuration information, the third configuration information is sent by the network device to the second terminal device, and the third configuration information is used by the second terminal device to establish the first SL RLC bearer, or used by the second terminal device to establish an SL RLC bearer corresponding to the first SL RLC bearer.

Optionally, the third configuration information includes: one or more of SL RLC configuration information corresponding to the first SL RLC bearer, configuration information of a logical channel corresponding to the first SL RLC bearer, an index or identifier of the first SL RLC bearer, an identifier or index of the at least one first SRB, or an LCID corresponding to the first SL RLC bearer.

In a possible implementation of the first aspect or the second aspect, the method further includes: The first terminal device receives fourth configuration information by using the second terminal device, where the fourth configuration information includes an index or identifier of the first SL RLC bearer, and configuration information of each of the at least one first SRB; and the configuration information of the first SRB includes PDCP configuration information corresponding to the first SRB. This implementation ensures that the first terminal device can determine one or more first SRBs corresponding to the first SL RLC bearer. Therefore, it can be ensured that the first terminal device transmits the control signaling to the network device on the one or more first SRBs by using the first SL RLC and the second terminal device. In addition, the fourth configuration information needs to include only the index or identifier of the first SL RLC bearer, and does not need to carry specific configuration information of the first SL RLC bearer. This can reduce signaling overheads and improve resource utilization.

Optionally, the PDCP configuration information corresponding to the first SRB and the index or identifier of the first SL RLC bearer may be placed in a same IE, or may be placed in different IEs.

The fourth configuration information may be sent at a time, or may be separately sent by using different signaling.

In a possible implementation of the first aspect or the second aspect, the method further includes: The first terminal device sends fifth configuration information to the second terminal device, where the fifth configuration information includes or indicates an index or identifier of the first SL RLC bearer and an identifier or index of the at least one first SRB. This implementation ensures that the second terminal device can determine one or more first SRBs corresponding to the first SL RLC bearer. Therefore, it can be ensured that the second terminal device transmits the control signaling between the first terminal device and the network device on the one or more first SRBs by using the first SL RLC.

In a possible implementation of the first aspect or the second aspect, a packet data convergence protocol data unit PDCP PDU of the at least one first SRB includes first indication information, and the first indication information is used to indicate a first SRB corresponding to the PDCP PDU.

In a possible implementation of the first aspect or the second aspect, a protocol stack of the first terminal device includes an adaptation layer, the adaptation layer is located between a radio link control RLC layer and a packet data convergence protocol PDCP layer, a protocol data unit PDU of the adaptation layer of the at least one first SRB includes second indication information, and the second indication information is used to indicate a first SRB corresponding to the PDU of the adaptation layer.

In a possible implementation of the first aspect or the second aspect, the at least one first SRB includes at least one of a first SRB 0, a first SRB 1, a first SRB 2, and a first SRB 3.

According to a third aspect, a signaling radio bearer configuration method is provided. The method may be performed by a network device or a chip used in the network device. A remote terminal device transmits data and signaling with the network device by using a relay terminal device. The method includes: The network device sends first configuration information to a first terminal device (namely, the remote terminal device) by using a second terminal device (namely, the relay terminal device), where the first configuration information includes or indicates information used to configure a first sidelink radio link control SL RLC bearer on a sidelink between the first terminal device and the second terminal device, and the first SL RLC bearer corresponds to at least one first signaling radio bearer SRB. The network device transmits control signaling to the first terminal device on the at least one first SRB (namely, at least one Uu SRB) by using the second terminal device.

According to the signaling radio bearer configuration method provided in the third aspect, the configuration information of the first SL RLC bearer between the first terminal device and the second terminal device is configured, so that the first terminal device can establish the first SL RLC bearer to the second terminal device. Therefore, the Uu SRB is transmitted on the SL RLC bearer on the sidelink between the first terminal device and the second terminal device. This can ensure normal transmission of the control signaling on the Uu SRB of the first terminal device, and improve quality and efficiency of the control signaling transmitted on the Uu SRB.

In this embodiment of this application, a radio bearer on a Uu interface corresponding to the remote terminal device includes a DRB used to transmit user-plane data and an SRB used to transmit control-plane data. A Uu DRB of the remote terminal device may be understood as a DRB between the remote terminal device and the network device, and a Uu SRB of the remote terminal device may be understood as an SRB between the remote terminal device and the network device. The Uu SRB or the Uu DRB needs to be first transmitted to the relay terminal device through a PC5 interface, and then forwarded by the relay terminal device to the network device.

In a possible implementation of the third aspect, the first SL RLC bearer may alternatively correspond to at least one first DRB, the first DRB may be understood as a Uu DRB, and the first DRB is used to transmit user-plane data between the first terminal device and the network device. In other words, the first SL RLC bearer corresponds to at least one first DRB, or the first SL RLC bearer corresponds to at least one first SRB.

In a possible implementation of the third aspect, the method further includes:

The network device sends third configuration information to the second terminal device, where the third configuration information is used by the second terminal device to establish the first SL RLC bearer.

Optionally, in this embodiment of this application, the first configuration information includes:

one or more of SL RLC configuration information corresponding to the first SL RLC bearer, configuration information of a logical channel corresponding to the first SL RLC bearer, an index or identifier of the first SL RLC bearer, an identifier or index of the at least one first SRB, or a logical channel identity LCID corresponding to the first SL RLC bearer.

Optionally, in this embodiment of this application, the third configuration information includes:

one or more of SL RLC configuration information corresponding to the first SL RLC bearer, configuration information of a logical channel corresponding to the first SL RLC bearer, an index or identifier of the first SL RLC bearer, an identifier or index of the at least one first SRB, or an LCID corresponding to the first SL RLC bearer.

Optionally, in this embodiment of this application, the first SL RLC bearer may alternatively correspond to at least one first DRB, the first DRB may be understood as a Uu DRB, and the first DRB is used to transmit user-plane data between the first terminal device and the network device. In other words, the first SL RLC bearer corresponds to at least one first DRB, or the first SL RLC bearer corresponds to at least one first SRB.

In a possible implementation of the third aspect, the method further includes: The network device sends fourth configuration information to the first terminal device by using the second terminal device. For example, the network device first sends the fourth configuration information to the second terminal device, and the second terminal device directly forwards the fourth configuration information to the first terminal device; or the network device first sends sixth configuration information to the second terminal device, and the second terminal device determines the fourth configuration information based on the sixth configuration information, and sends the fourth configuration information to the first terminal device.

The fourth configuration information includes an index or identifier of the first SL RLC bearer, and configuration information of each of the at least one first SRB; and the configuration information of the first SRB includes PDCP configuration information corresponding to the first SRB. This implementation ensures that the first terminal device can determine one or more first SRBs corresponding to the first SL RLC bearer. Therefore, it can be ensured that the first terminal device transmits the control signaling to the network device on the one or more first SRBs by using the first SL RLC and the second terminal device. In addition, the fourth configuration information needs to include only the index or identifier of the first SL RLC bearer, and does not need to carry specific configuration information of the first SL RLC bearer. This can reduce signaling overheads and improve resource utilization.

Optionally, the PDCP configuration information corresponding to the first SRB and the index or identifier of the first SL RLC bearer may be placed in a same IE, or may be placed in different IEs.

The fourth configuration information may be sent at a time, or may be separately sent by using different signaling.

In a possible implementation of the third aspect, a packet data convergence protocol data unit PDCP PDU of the at least one first SRB includes first indication information, and the first indication information is used to indicate a first SRB corresponding to the PDCP PDU.

In a possible implementation of the third aspect, the at least one first SRB includes at least one of a first SRB 0, a first SRB 1, a first SRB 2, and a first SRB 3.

In a possible implementation of the third aspect, the method further includes:

A network device receives seventh configuration information sent by the first terminal device or the second terminal device, where the seventh configuration information includes or indicates the first SL RLC bearer or an LCID corresponding to the first SRB.

Optionally, the seventh configuration information may further include or indicate an index or identifier of the first SL RLC bearer, or the seventh configuration information may further include or indicate an index or identifier of the first SRB.

According to a fourth aspect, a signaling radio bearer configuration method is provided. The method may be performed by a network device or a chip used in the network device. A remote terminal device transmits data and signaling with the network device by using a relay terminal device. The method includes: The network device sends third configuration information to a second terminal device (namely, the relay terminal device), where the third configuration information includes or indicates information used to configure a first sidelink radio link control SL RLC bearer on a sidelink between a first terminal device and the second terminal device, and the first SL RLC bearer corresponds to at least one first signaling radio bearer SRB. The network device transmits control signaling to the first terminal device on the at least one first SRB (namely, at least one Uu SRB) by using the second terminal device.

According to the signaling radio bearer configuration method provided in the fourth aspect, the configuration information of the first SL RLC bearer between the first terminal device and the second terminal device is configured, so that the second terminal device can establish the first SL RLC bearer to the first terminal device. Therefore, the Uu SRB is transmitted on the SL RLC bearer on the sidelink between the second terminal device and the first terminal device. This can ensure normal transmission of the control signaling on the Uu SRB of the first terminal device, and improve quality and efficiency of the control signaling transmitted on the Uu SRB.

In this embodiment of this application, a radio bearer on a Uu interface corresponding to the remote terminal device includes a DRB used to transmit user-plane data and an SRB used to transmit control-plane data. A Uu DRB of the remote terminal device may be understood as a DRB between the remote terminal device and the network device, and a Uu SRB of the remote terminal device may be understood as an SRB between the remote terminal device and the network device. The Uu SRB or the Uu DRB needs to be first transmitted to the relay terminal device through a PC5 interface, and then forwarded by the relay terminal device to the network device.

In a possible implementation of the fourth aspect, the first SL RLC bearer may alternatively correspond to at least one first DRB, the first DRB may be understood as a Uu DRB, and the first DRB is used to transmit user-plane data between the first terminal device and the network device. In other words, the first SL RLC bearer corresponds to at least one first DRB, or the first SL RLC bearer corresponds to at least one first SRB.

In a possible implementation of the fourth aspect, the method further includes:

The network device sends first configuration information to the first terminal device, where the first configuration information is used by the first terminal device to establish the first SL RLC bearer. The network device may send the first configuration information to the first terminal device by using the second terminal device.

Optionally, in this embodiment of this application, the first configuration information includes:

one or more of SL RLC configuration information corresponding to the first SL RLC bearer, configuration information of a logical channel corresponding to the first SL RLC bearer, an index or identifier of the first SL RLC bearer, an identifier or index of the at least one first SRB, or a logical channel identity LCID corresponding to the first SL RLC bearer.

Optionally, in this embodiment of this application, the third configuration information includes:

one or more of SL RLC configuration information corresponding to the first SL RLC bearer, configuration information of a logical channel corresponding to the first SL RLC bearer, an index or identifier of the first SL RLC bearer, an identifier or index of the at least one first SRB, or an LCID corresponding to the first SL RLC bearer.

Optionally, in this embodiment of this application, the first SL RLC bearer may alternatively correspond to at least one first DRB, the first DRB may be understood as a Uu DRB, and the first DRB is used to transmit user-plane data between the first terminal device and the network device. In other words, the first SL RLC bearer corresponds to at least one first DRB, or the first SL RLC bearer corresponds to at least one first SRB.

In a possible implementation of the fourth aspect, the method further includes: The network device sends fourth configuration information to the first terminal device by using the second terminal device. For example, the network device first sends the fourth configuration information to the second terminal device, and the second terminal device directly forwards the fourth configuration information to the first terminal device; or the network device first sends sixth configuration information to the second terminal device, and the second terminal device determines the fourth configuration information based on the sixth configuration information, and sends the fourth configuration information to the first terminal device.

The fourth configuration information includes an index or identifier of the first SL RLC bearer, and configuration information of each of the at least one first SRB; and the configuration information of the first SRB includes PDCP configuration information corresponding to the first SRB. This implementation ensures that the first terminal device can determine one or more first SRBs corresponding to the first SL RLC bearer. Therefore, it can be ensured that the first terminal device transmits the control signaling to the network device on the one or more first SRBs by using the first SL RLC and the second terminal device. In addition, the fourth configuration information needs to include only the index or identifier of the first SL RLC bearer, and does not need to carry specific configuration information of the first SL RLC bearer. This can reduce signaling overheads and improve resource utilization.

Optionally, the PDCP configuration information corresponding to the first SRB and the index or identifier of the first SL RLC bearer may be placed in a same IE, or may be placed in different IEs.

The fourth configuration information may be sent at a time, or may be separately sent by using different signaling.

In a possible implementation of the fourth aspect, a packet data convergence protocol data unit PDCP PDU of the at least one first SRB includes first indication information, and the first indication information is used to indicate a first SRB corresponding to the PDCP PDU.

In a possible implementation of the fourth aspect, the at least one first SRB includes at least one of a first SRB 0, a first SRB 1, a first SRB 2, and a first SRB 3.

In a possible implementation of the fourth aspect, the method further includes:

The network device receives seventh configuration information sent by the first terminal device or the second terminal device, where the seventh configuration information includes or indicates the first SL RLC bearer or an LCID corresponding to the first SRB.

Optionally, the seventh configuration information may further include or indicate an index or identifier of the first SL RLC bearer, or the seventh configuration information may further include or indicate an index or identifier of the first SRB.

According to a fifth aspect, a signaling radio bearer configuration method is provided. The method may be performed by a second terminal device (namely, a relay terminal device) or a chip used in the second terminal device. A remote terminal device transmits data and signaling with a network device by using the relay terminal device. The method includes: The second terminal device obtains first configuration information, where the first configuration information includes or indicates information used to configure a first sidelink radio link control SL RLC bearer on a sidelink between a first terminal device (the remote terminal device) and the second terminal device. The second terminal device establishes the first SL RLC bearer based on the first configuration information, where the first SL RLC bearer corresponds to at least one first signaling radio bearer SRB.

According to the sidelink signaling radio bearer configuration method provided in the fifth aspect or the second aspect, the first terminal device establishes the first SL RLC bearer between the first terminal device and the second terminal device, and the first terminal device can transmit the control signaling to the network device on the at least one first SRB by using the second terminal device. Therefore, the Uu SRB is transmitted on the SL RLC bearer on the sidelink between the first terminal device and the second terminal device. This can ensure normal transmission of the control signaling on the Uu SRB of the first terminal device, and improve quality and efficiency of the control signaling transmitted on the Uu SRB.

In this embodiment of this application, a radio bearer on a Uu interface corresponding to the remote terminal device includes a DRB used to transmit user-plane data and an SRB used to transmit control-plane data. A Uu DRB of the remote terminal device may be understood as a DRB between the remote terminal device and the network device, and a Uu SRB of the remote terminal device may be understood as an SRB between the remote terminal device and the network device. The Uu SRB needs to be first transmitted to the relay terminal device through a PC5 interface, and then forwarded by the relay terminal device to the network device.

In a possible implementation of the fifth aspect, that the second terminal device obtains first configuration information includes:

The second terminal device receives the first configuration information sent by the network device, and the second terminal device does not parse the first configuration information. The method further includes: The second terminal device sends the first configuration information to the first terminal device. The second terminal device receives second configuration information sent by the first terminal device, where the second configuration information is determined based on the first configuration information.

Optionally, content included in the second configuration information may be the same as content included in the first configuration information, content included in the second configuration information may be a subset of content included in the first configuration information, content included in the second configuration information is content that is determined based on the first configuration information and that is different from that of the first configuration information, or partial content included in the second configuration information may be the same as partial content included in the first configuration information.

In a possible implementation of the fifth aspect, that the second terminal device obtains first configuration information includes:

The second terminal device receives third configuration information sent by the network device. The second terminal device determines the first configuration information based on the third configuration information, where the third configuration information is used by the second terminal device to establish the first SL RLC bearer. The method further includes: The second terminal device sends the first configuration information to the first terminal device.

In a possible implementation of the fifth aspect, that the second terminal device obtains first configuration information includes:

The second terminal device receives the first configuration information sent by the network device, and the second terminal device does not parse the first configuration information. The method further includes:

The second terminal device sends the first configuration information to the first terminal device.

The second terminal device receives third configuration information sent by the network device, where the third configuration information is used by the second terminal device to establish the first SL RLC bearer, and the third configuration information is determined based on the first configuration information.

Optionally, in this embodiment of this application, the first configuration information is determined and generated by the second terminal device.

Optionally, in this embodiment of this application, the first configuration information includes:

one or more of SL RLC configuration information corresponding to the first SL RLC bearer, configuration information of a logical channel corresponding to the first SL RLC bearer, an index or identifier of the first SL RLC bearer, an identifier or index of the at least one first SRB, or a logical channel identity LCID corresponding to the first SL RLC bearer.

Optionally, in this embodiment of this application, the third configuration information includes: one or more of SL RLC configuration information corresponding to the first SL RLC bearer, configuration information of a logical channel corresponding to the first SL RLC bearer, an index or identifier of the first SL RLC bearer, an identifier or index of the at least one first SRB, or an LCID corresponding to the first SL RLC bearer.

Optionally, in this embodiment of this application, the first SL RLC bearer may alternatively correspond to at least one first DRB, the first DRB may be understood as a Uu DRB, and the first DRB is used to transmit user-plane data between the first terminal device and the network device. In other words, the first SL RLC bearer corresponds to at least one first DRB, or the first SL RLC bearer corresponds to at least one first SRB.

In a possible implementation of the fifth aspect, the method further includes: The second terminal device obtains fourth configuration information, and the second terminal device sends the fourth configuration information to the first terminal device, where the fourth configuration information includes an index or identifier of the first SL RLC bearer and configuration information of each of the at least one first SRB, and the configuration information of the first SRB includes PDCP configuration information corresponding to the first SRB. This implementation ensures that the first terminal device can determine one or more first SRBs corresponding to the first SL RLC bearer. Therefore, it can be ensured that the first terminal device transmits the control signaling to the network device on the one or more first SRBs by using the first SL RLC and the second terminal device. In addition, the fourth configuration information needs to include only the index or identifier of the first SL RLC bearer, and does not need to carry specific configuration information of the first SL RLC bearer. This can reduce signaling overheads and improve resource utilization.

Optionally, that the second terminal device obtains fourth configuration information includes: The second terminal device receives the fourth configuration information sent by the network device.

Optionally, that the second terminal device obtains fourth configuration information includes: The second terminal device receives sixth configuration information sent by the network device; and the second terminal device determines the fourth configuration information based on the sixth configuration information.

Optionally, the PDCP configuration information corresponding to the first SRB and the index or identifier of the first SL RLC bearer may be placed in a same IE, or may be placed in different IEs.

The fourth configuration information may be sent at a time, or may be separately sent by using different signaling.

In a possible implementation of the fifth aspect, a packet data convergence protocol data unit PDCP PDU of the at least one first SRB includes first indication information, and the first indication information is used to indicate a first SRB corresponding to the PDCP PDU.

In a possible implementation of the fifth aspect, the at least one first SRB includes at least one of a first SRB 0, a first SRB 1, a first SRB 2, and a first SRB 3.

In a possible implementation of the fifth aspect, the method further includes: The second terminal device receives fifth configuration information sent by the first terminal device, where the fifth configuration information includes or indicates an index or identifier of the first SL RLC bearer and an identifier or index of the at least one first SRB. This implementation ensures that the second terminal device can determine one or more first SRBs corresponding to the first SL RLC bearer. Therefore, it can be ensured that the second terminal device transmits the control signaling between the first terminal device and the network device on the one or more first SRBs by using the first SL RLC.

In a possible implementation of the fifth aspect, a protocol stack of the second terminal device includes an adaptation layer, the adaptation layer is located between a radio link control RLC layer and a packet data convergence protocol PDCP layer, a protocol data unit PDU of the adaptation layer of the at least one first SRB includes second indication information, and the second indication information is used to indicate a first SRB corresponding to the PDU of the adaptation layer.

In any one of the third aspect, the fourth aspect, or the fifth aspect, or possible implementations of the third aspect, the fourth aspect, or the fifth aspect, the first SL RLC bearer is different from the second SL RLC bearer on the sidelink, the second SL RLC bearer corresponds to the second signaling radio bearer SRB (namely, the SL SRB), and the first terminal device transmits control signaling to the second terminal device on the second SRB. The first terminal device transmits the control signaling or control-plane data to the second terminal device on the second SRB. In this implementation, the SL RLC bearer different from that of the SL SRB is configured for the Uu SRB. Because SL RLC bearers corresponding to the SL SRB (the second SRB) and the Uu SRB (the first SRB) are different, the first terminal device and the second terminal device can distinguish between, based on the different SL RLC bearers, the Uu SRB and the SL SRB on the SL between the first terminal device and the second terminal device; and correctly distinguish between the control signaling carried on the Uu SRB and the control signaling carried on the SL SRB after distinguishing between the Uu SRB and the SL SRB. This can ensure accurate transmission of the control signaling, and improve data transmission efficiency and user experience.

According to a sixth aspect, a sidelink data packet transmission method is provided. The method may be performed by a remote terminal device or a chip used in the remote terminal device. The remote terminal device transmits data and signaling with a network device by using a relay terminal device. The method includes: A first terminal device (namely, the remote terminal device) obtains a data packet. The first terminal device determines, based on indication information in the data packet, that the data packet corresponds to a first signaling radio bearer SRB or a second SRB. The first terminal device transmits control signaling to the network device on the first SRB by using a second terminal device (namely, the relay terminal device). The first terminal device transmits control signaling to the second terminal device on the second SRB.

According to the sidelink data packet transmission method provided in the sixth aspect, when control-plane data carried by a Uu SRB (the first SRB) and control-plane data carried by an SL SRB (the second SRB) each are transmitted on a sidelink between the first terminal device and the second terminal device, the indication information carried in the data packet is used to determine that an SRB corresponding to (or belonging to) the data packet is the SL SRB or the SL SRB, so that a data packet carried by the Uu SRB and a data packet carried by the SL SRB can be distinguished between. This ensures accurate transmission of the data packet, and improves data transmission efficiency and user experience.

In a possible implementation of the sixth aspect, both the first SRB and the second SRB correspond to a same sidelink radio link control SL RLC bearer on the sidelink between the first terminal device and the second terminal device. That is, the first SRB and the second SRB share the same SL RLC bearer.

In this embodiment of this application, the SL RLC bearer may alternatively correspond to a first SRB and a second DRB (the first SRB and the second DRB share the same SL RLC bearer). The second DRB may be understood as an SL DRB, and the SL DRB is used to transmit user-plane data between the first terminal device and the second terminal device.

In this embodiment of this application, the SL RLC bearer may further correspond to a first DRB and a second DRB. The second DRB may be understood as an SL DRB, and the SL DRB is used to transmit user-plane data between the first terminal device and the second terminal device. The first DRB may be understood as a Uu DRB, and the Uu DRB is configured to transmit user-plane data between the first terminal device and the network device.

In this embodiment of this application, the SL RLC bearer may alternatively correspond to a first DRB and a second SRB. The first DRB may be understood as a Uu DRB, and the Uu DRB is configured to transmit user-plane data between the first terminal device and the network device.

In other words, in this embodiment of this application, the SL RLC bearer corresponds to the first SRB and the second SRB (the first SRB and the second SRB share the same SL RLC bearer); the SL RLC bearer corresponds to the first SRB and the second DRB (the first SRB and the second DRB share the same SL RLC bearer); the SL RLC bearer corresponds to the first DRB and the second DRB (the first DRB and the second DRB share the same SL RLC bearer); or the SL RLC bearer corresponds to the first DRB and the second SRB (the first DRB and the second SRB share the same SL RLC bearer).

In a possible implementation of the sixth aspect, a protocol stack of the first terminal device includes an adaptation layer, and the adaptation layer is located between a radio link control RLC layer and a packet data convergence protocol PDCP layer. That the first terminal device determines, based on indication information in the data packet, that the data packet corresponds to a first signaling radio bearer SRB or a second SRB includes: The terminal device determines, based on indication information in a protocol data unit PDU of the adaptation layer, that the PDU of the adaptation layer corresponds to the first SRB or the second SRB.

In a possible implementation of the sixth aspect, that the first terminal device determines, based on indication information in the data packet, that the data packet corresponds to a first signaling radio bearer SRB or a second SRB includes:

The first terminal device determines, based on indication information in a packet data convergence protocol data unit PDCP PDU, that the PDCP PDU corresponds to the first SRB or the second SRB.

In a possible implementation of the sixth aspect, the first SRB is a plurality of first SRBs, and the indication information is further used to indicate a first SRB corresponding to the data packet in the plurality of first SRBs.

In a possible implementation of the sixth aspect, the indication information is located in a fourth bit and/or a third bit in a first octet oct in the data packet.

In a possible implementation of the sixth aspect, the plurality of first SRBs include at least two of a first SRB 0, a first SRB 1, a first SRB 2, and a first SRB 3.

According to a seventh aspect, a communications apparatus is provided. The apparatus includes units configured to perform the steps in any one of the first aspect, the second aspect, and the fifth aspect and the sixth aspect; or includes units configured to perform the steps in the possible implementations of any one of the first aspect, the second aspect, and the fifth aspect and the sixth aspect.

According to an eighth aspect, a communications apparatus is provided. The apparatus includes units configured to perform the steps in any one of the third aspect or the possible implementations of the third aspect, or includes units configured to perform the steps in any one of the fourth aspect or the possible implementations of the fourth aspect.

According to a ninth aspect, a communications apparatus is provided. The apparatus includes at least one processor and a memory. The at least one processor is configured to perform the method according to any one of the first aspect, the second aspect, or the fifth aspect and the sixth aspect; or configured to perform the method in any one of the possible implementations of the first aspect, the second aspect, or the fifth aspect and the sixth aspect.

According to a tenth aspect, a communications apparatus is provided. The apparatus includes at least one processor and a memory. The at least one processor is configured to perform the method in any one of the third aspect or the possible implementations of the third aspect, or is configured to perform the method in any one of the fourth aspect or the possible implementations of the fourth aspect.

According to an eleventh aspect, a communications apparatus is provided. The apparatus includes at least one processor and an interface circuit. The at least one processor is configured to perform the method in any one of the first aspect, the second aspect, or the fifth aspect and the sixth aspect; or configured to perform the method in any one of the possible implementations of the first aspect, the second aspect, or the fifth aspect and the sixth aspect.

According to a twelfth aspect, a communications apparatus is provided. The apparatus includes at least one processor and an interface circuit. The at least one processor is configured to perform the method in any one of the third aspect or the possible implementations of the third aspect; or configured to perform the method in any one of the fourth aspect or the possible implementations of the fourth aspect.

According to a thirteenth aspect, a terminal device is provided. The terminal device includes any communications apparatus provided in the seventh aspect, the ninth aspect, or the eleventh aspect.

According to a fourteenth aspect, a network device is provided. The terminal device includes any communications apparatus provided in the eighth aspect, the tenth aspect, or the twelfth aspect.

According to a fifteenth aspect, a computer program product is provided. The computer program product includes a computer program, and when executed by a processor, the computer program is configured to perform the method in any one of the first aspect to the sixth aspect; or configured to perform the method in any one of the possible implementations of the first aspect to the sixth aspect.

According to a sixteenth aspect, a computer-readable storage medium is provided. The computer-readable storage medium stores a computer program, and when executed, the computer program is configured to perform the method in any one of the first aspect to the sixth aspect; or configured to perform the method in any one of the possible implementations of the first aspect to the sixth aspect.

According to a seventeenth aspect, a chip is provided. The chip includes a processor, configured to invoke a computer program from a memory and run the computer program, so that a communications device on which the chip is installed performs the method in any one of the first aspect to the sixth aspect; or configured to perform the method in any one of the possible implementations of the first aspect to the sixth aspect.

According to the signaling radio bearer configuration method and the communications apparatus provided in embodiments of this application, when there is the relay terminal device, the SL RLC bearer is configured on the PC5 interface on the sidelink for the Uu SRB or the Uu DRB of the remote terminal device, so that the SL RLC bearer is established to transmit the Uu SRB or the Uu DRB. The SL RLC bearer between the remote terminal device and the relay terminal device is used to transmit the control signaling carried by the Uu SRB or the user-plane data carried by the Uu DRB. This can improve transmission quality of the Uu SRB or the Uu DRB, and improve transmission efficiency of the control signaling or the user-plane data.

DESCRIPTION OF EMBODIMENTS

Figure 1:
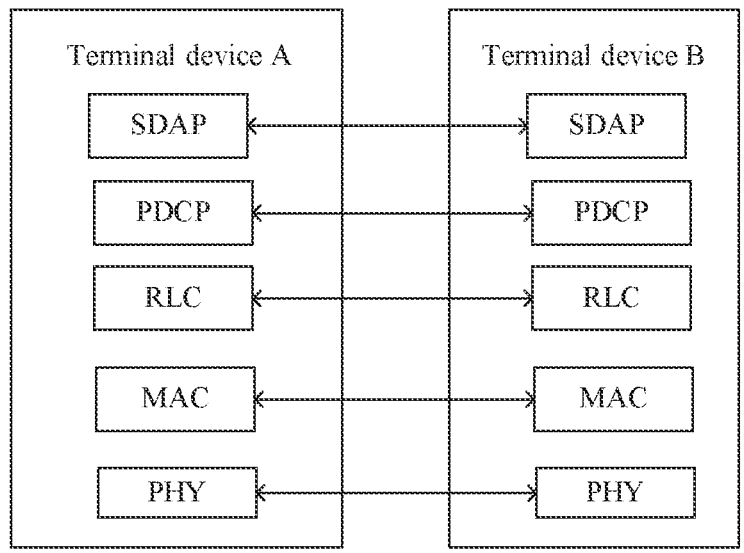
FIG. 1 is a schematic diagram of an architecture of a user-plane protocol stack on a PC5 interface.

The following describes technical solutions of this application with reference to the accompanying drawings.

In the descriptions of embodiments of this application. "/" means "or" unless otherwise specified. For example, A/B may represent A or B. In this specification. "and/or" describes only an association relationship between associated objects and represents that three relationships may exist. For example. A and/or B may represent the following three cases: Only A exists, both A and B exist, and only B exists. In addition, in the descriptions of embodiments of this application. "a plurality of" means two or more than two.

Terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise specified, "a plurality of" means two or more.

The technical solutions in embodiments of this application may be applied to various communications systems, for example, V2X, a device-to-device (device-to-device, D2D) communications system, a long term evolution (Long Term Evolution, LTE) system, an LTE frequency division duplex (Frequency Division Duplex, FDD) system, LTE time division duplex (Time Division Duplex, TDD), a universal mobile telecommunications system (Universal Mobile Telecommunications System, UMTS), a worldwide interoperability for microwave access (Worldwide Interoperability for Microwave Access, WiMAX) communications system, a 5th generation (5th Generation, 5G) system, or new radio (New Radio, NR).

A terminal device in embodiments of this application may also be referred to as user equipment, an access terminal, a subscriber unit, a subscriber station, a mobile station, a remote station, a remote terminal, a mobile device, a user terminal, a terminal, a wireless communications device, a user agent, a user apparatus, or a vehicle, a vehicle-mounted device, a road side unit (road side unit, RSU), and the like in a V2X communications system. Alternatively, the terminal device may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, or a vehicle-mounted device. For example, as one or more components or units, the terminal device may be a vehicle-mounted module, a vehicle-mounted assembly, a vehicle-mounted component, a vehicle-mounted chip, or a vehicle-mounted unit that is disposed in a vehicle, and the vehicle uses the vehicle-mounted module, the vehicle-mounted assembly, the vehicle-mounted component, the vehicle-mounted chip, the vehicle-mounted unit, or a roadside station that is disposed in the vehicle. Alternatively, the terminal device may be a terminal device in a future 5G network, a terminal device in a future evolved public land mobile network (Public Land Mobile Network. PLMN), or the like. This is not limited in embodiments of this application.

A network device (or may be referred to as a radio access network device) in embodiments of this application may be a device that can provide a random access function for a terminal device or a chip that can be disposed in the device. The device includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home NodeB (for example, a home evolved NodeB, or a home NodeB, HNB), a baseband unit (baseband unit, BBU), an access point (access point, AP), a wireless relay node, a wireless backhaul node, a transmission point (transmission and reception point. TRP, transmission point, TP), or the like in a wireless fidelity (wireless fidelity, Wi-Fi) system, or may be 5G, for example, NR or a gNB in a system, a transmission point (TRP or TP), one or a group of (including a plurality of antenna panels) antenna panels of a base station in a 5G system, a network node forming a gNB or a transmission point, for example, a baseband unit (BBU) or a distributed unit (DU, distributed unit), a network device in a future 5G network, or a network device in a future evolved PLMN network. This is not limited in embodiments of this application.

In embodiments of this application, the terminal device or the network device includes a hardware layer, an operating system layer running at the hardware layer, and an application layer running at the operating system layer. The hardware layer includes hardware such as a central processing unit (central processing unit, CPU), a memory management unit (memory management unit, MMU), and a memory (also referred to as a main memory). The operating system may be any one or more types of computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not particularly limited in embodiments of this application, provided that a program that records code of the method provided in embodiments of this application can be run to perform communication according to the method provided in embodiments of this application. For example, the execution body of the method provided in embodiments of this application may be the terminal device or the network device, or a functional module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (compact disc. CD) and a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may represent one or more devices and/or other machine-readable media that are configured to store information. The term "machine-readable media" may include but is not limited to a radio channel, and various other media that can store, contain and/or carry an instruction and/or data.

V2X communication is an important key technology for implementing environment perception and information exchange in the Internet of vehicles. Another device herein may be another vehicle, another infrastructure, a pedestrian, a terminal device, or the like. V2X communication may be considered as a special case of device-to-device (device to device. D2D) communication. A communication link between different user terminal devices may be referred to as an SL.

In V2X communication, two terminal devices that communicate with each other transmit control information and data through a PC5 interface. The PC5 interface may also be referred to as a PC5 reference point, and is an interface for communication between the two terminal devices. PC5 interface signaling (PC5 signaling. PC5-S) may include a direct communication request/accept (Direct Communication Request/Ack), a link identifier (Link Identifier), an update request/response/acknowledgment (Update Request/Response/Ack), a disconnect request/response (Disconnect Request/Response), a link modification request/accept (Link Modification Request/Accept), and the like.

Figure 2:
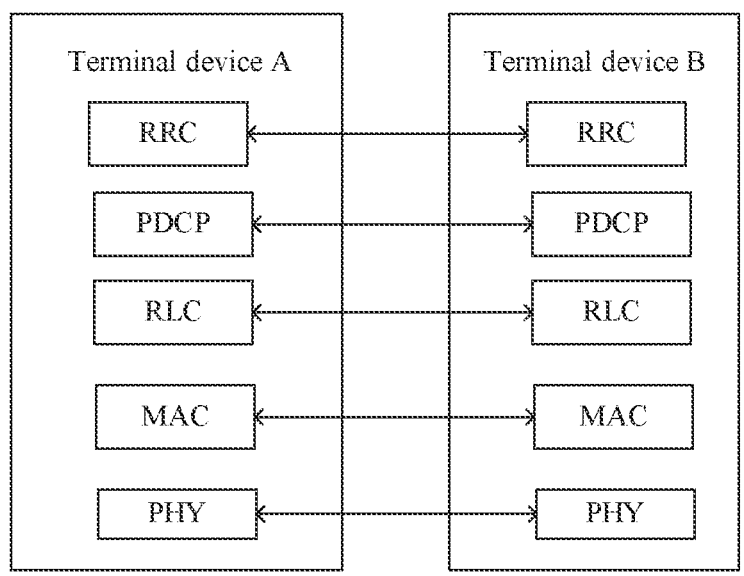
FIG. 2 is a schematic diagram of an architecture of a control-plane protocol stack of an RRC protocol on a PC5 interface.

Devices (for example, a terminal device A and a terminal device B) that communicate with each other each have a specific protocol stack architecture, and support unicast, multicast, and broadcast transmission modes in new radio sidelink (New Radio sidelink, NR SL) communication. Service data and control-plane data are transmitted by using a user-plane protocol stack and a control-plane protocol stack respectively on the PC5 interface. FIG. 1 is a schematic diagram of an architecture of a user-plane protocol stack on a PC5 interface. As shown in FIG. 1, the user-plane protocol stack (protocol stack) on the PC5 interface includes a service data adaptation layer (Service Data Adaptation Protocol, SDAP), a packet data convergence protocol (packet data convergence protocol, PDCP) layer, a radio link control (radio link control, RLC) layer, a media access control (media access control, MAC) layer, and a physical (physic, PHY) layer. FIG. 2 is a schematic diagram of an architecture of a control-plane protocol stack of an RRC protocol on a PC5 interface. The protocol stack includes a radio resource control (radio resource control. RRC) layer, a PDCP layer, an RLC layer, a MAC layer, and a PHY layer.

Figure 3:
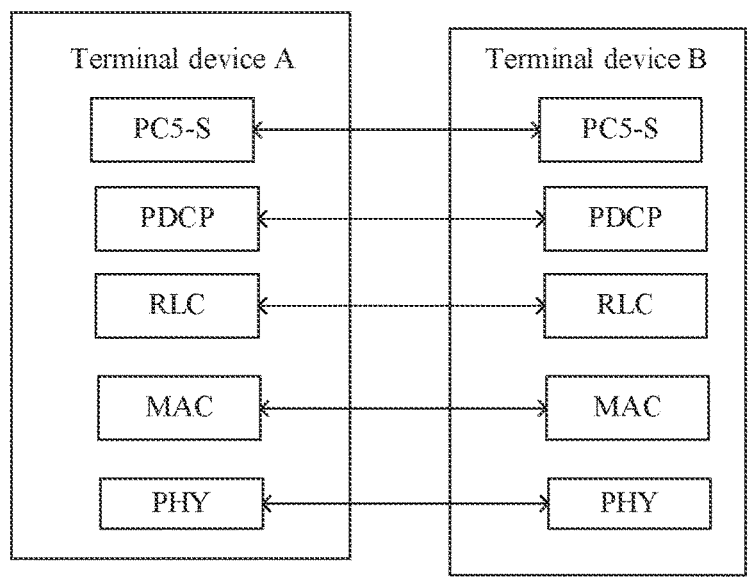
FIG. 3 is a schematic diagram of an architecture of a control-plane protocol stack of a PC5-S protocol on a PC5 interface.

FIG. 3 is a schematic diagram of an architecture of a control-plane protocol stack of a PC5-S protocol on a PC5 interface. The protocol stack includes a PC5-S layer, a PDCP layer, an RLC layer, a MAC layer, and a PHY layer.

The PHY layer is located at the lowest layer, and may also be referred to as a layer 1 (Layer 1). The MAC layer, the RLC, and the PDCP each belong to an intermediate layer, and may also be referred to as a layer 2 (Layer 2). The RRC belongs to a higher layer, and may also be referred to as a layer 3 (Layer 3).

Two types of radio bearers (radio bearers. RBs) are included on an SL. One is an SL data radio bearer (SL data radio bearer, SL DRB), and the other is an SL signaling radio bearer (SL signaling radio bearer. SL SRB). Control-plane data transmitted by the SL SRB includes RRC signaling and PC5-S on a PC5 interface.

When a terminal device needs to transmit the SL SRB to another terminal device, the terminal device needs to establish a PDCP entity, an RLC entity, and corresponding logical channels, to establish configuration information required for the SL SRB. For example, the configuration information includes PDCP configuration. RLC configuration, and MAC configuration.

When a terminal device needs to transmit the SL DRB to another terminal device, the terminal device also needs to establish a PDCP entity, an RLC entity, and corresponding logical channels, to establish configuration information required for the SL DRB. For example, the configuration information includes PDCP configuration, RLC configuration, and MAC configuration.

It can be learned from FIG. 2 and FIG. 3 that the radio bearer on the sidelink is transmitted on the PC5 interface by using the PDCP layer, the RLC layer, the MAC layer, and the PHY. RLC bearer configuration is a lower-layer part of radio bearer configuration, and includes the RLC configuration, logical channel configuration, and the like.

Figure 4:
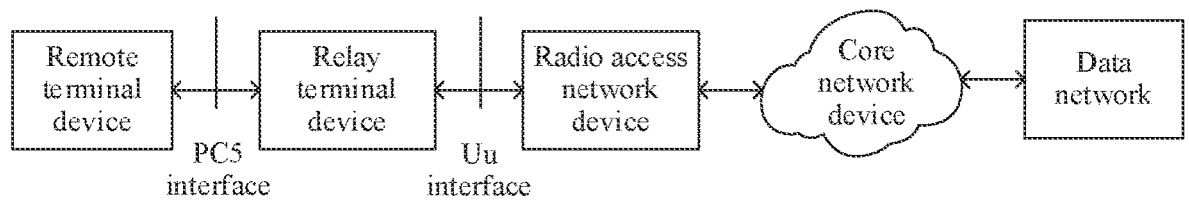
FIG. 4 is a schematic diagram of an example of an architecture with a remote terminal device, a relay terminal device, and a network device according to this application.

In embodiments of this application, in addition to directly communicating with the network device (for example, a base station), the terminal device may further communicate with the base station by using another terminal device. For example, in a public safety public safety scenario, a business scenario, or an Internet of Vehicles scenario, a relay terminal device may serve as a relay of a remote terminal device, so that the remote terminal device can communicate with a base station by using the relay terminal device. This technology is referred to as a UE2NW relay technology. When a terminal device is relatively far away from a network device (for example, not within a coverage area of the network device), or the terminal device is located at a coverage edge of the network device, or quality of a link between the terminal device and the network device is relatively poor, or the network device cannot directly serve the terminal device, or the terminal device does not have a Uu interface, or a power of the terminal device is relatively low, or the terminal device is in an energy-saving mode, or the terminal device is expected to reduce power consumption, the terminal device may communicate with the network device by using a relay terminal device (UE-to-Network Relay UE). In embodiments of this application, the relay terminal device may also be referred to as relay user equipment (Relay UE). The relay terminal device may be a terminal device that provides network access for a remote (Remote) terminal device. In embodiments of this application, the remote terminal device may also be referred to as remote user equipment (Remote UE). The relay terminal device provides a relay service for the remote terminal device. That the relay terminal device provides the relay service for the remote terminal device may be understood as that information sent by the remote terminal device to the network device is forwarded to the network device by using the relay terminal device, and information sent by the network device to the remote terminal device is also forwarded to the remote terminal device by using the relay terminal device. FIG. 4 is a schematic diagram of an example of an architecture with a remote terminal device, a relay terminal device, and a radio access network device. As shown in FIG. 4, the remote terminal device communicates with the relay terminal device through a PC5 interface on a sidelink, and is connected to the radio access network device (radio access network, RAN) by using the relay terminal device. The radio access network device is connected to a core network device, and the core network device further communicates with a data network. The relay terminal device communicates with the radio access network device through a Uu interface.

It should be understood that in this embodiment of this application, the network device may also be referred to as a radio access network device. For example, the network device or the radio access network device may be a base station.

Figure 5:
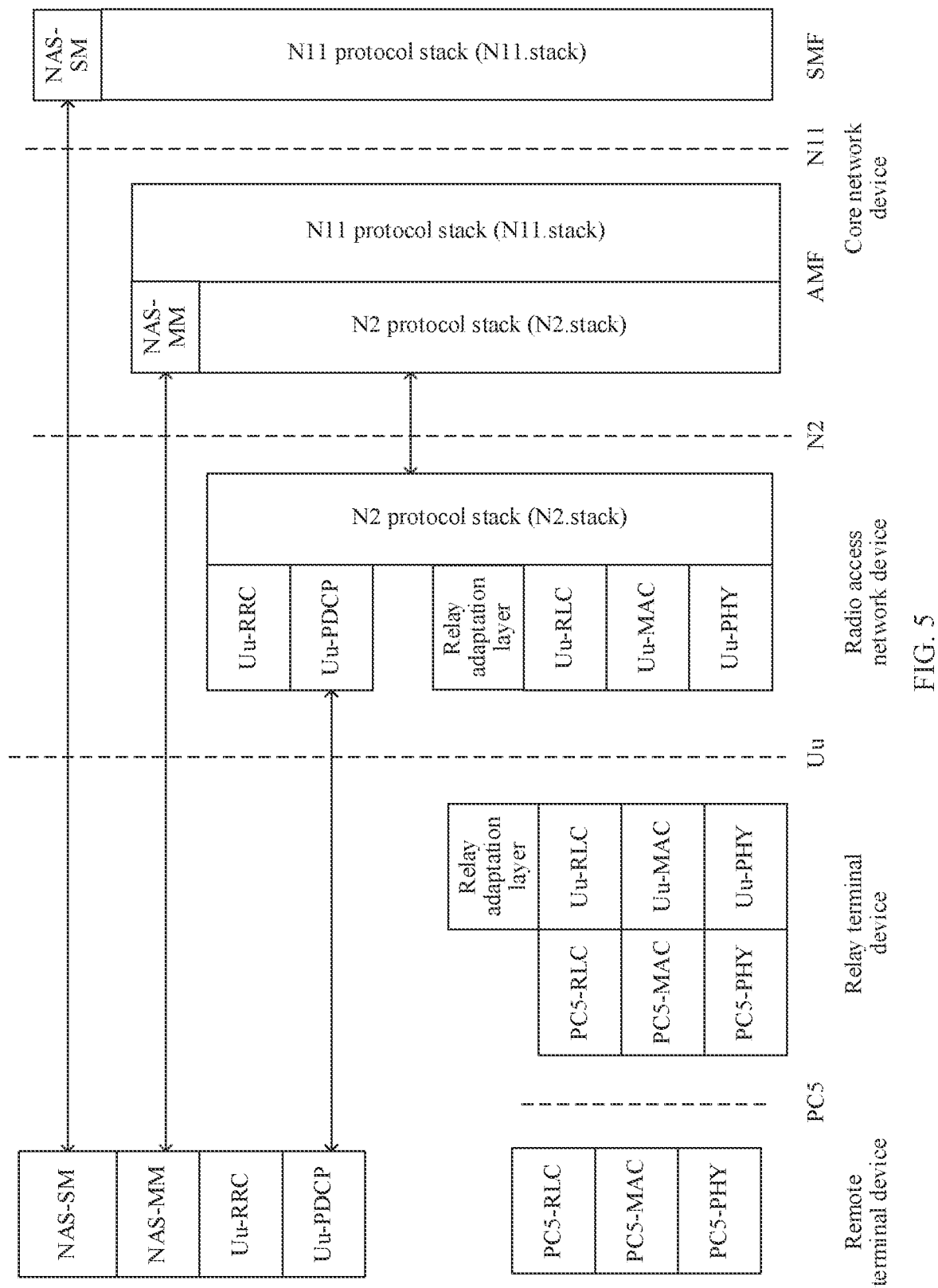
FIG. 5 is a schematic diagram of an example of an architecture of a control-plane protocol stack of a relay terminal device according to this application.

FIG. 5 is a schematic diagram of an example of an architecture of a control-plane protocol stack of a UE-to-Network Relay. Control-plane data between a remote terminal device and a radio access network device is forwarded on an RLC layer by using a relay terminal device. A PDCP layer and an RRC layer on a Uu interface corresponding to the remote terminal device each are connected in an end-to-end manner between the remote terminal device and the radio access network device. In other words, the remote terminal device is connected to the radio access network device in an end-to-end manner at the PDCP layer and the RRC layer, and the PDCP layer and the RRC layer on the Uu interface corresponding to the remote terminal device are terminated on the radio access network device. After the remote terminal device and the radio access network device each establish a corresponding PDCP entity, there may be a corresponding end-to-end connection between the remote terminal device and the radio access network device.

As shown in FIG. 5, an RLC layer, a MAC layer, and a PHY layer of the remote terminal device each are connected in an end-to-end manner between the remote terminal device and the relay terminal device and between the relay terminal device and the radio access network device. After the relay terminal device and the remote terminal device each establish a corresponding RLC entity and logical channel, and the relay terminal device and the radio access network device each establish a corresponding RLC entity and logical channel, control signaling can be transmitted between the remote terminal device and the radio access network device.

As shown in FIG. 5, an RRC message and a non-access stratum (Non-access stratum, NAS) message of the remote terminal device are transparently transmitted between the relay terminal device and the radio access network device by using the relay terminal device. That is, the relay terminal device only needs to relay the RRC message and the NAS message without changing the RRC message and the NAS message. Alternatively, the relay terminal device may not decode the RRC message and the NAS message. The remote terminal device and the radio access network device are connected in an end-to-end manner at the PDCP layer on a Uu interface (namely, the Uu interface between the remote terminal device and the radio access network device), and the relay terminal device relays a PDCP protocol data unit (packet data convergence protocol data unit (packet data convergence protocol Data Unit, PDCP PDU)) between the remote terminal device and the radio access network device. In some possible implementations, the relay terminal device may not decode the PDCP PDU, and then transmit the PDCP PDU to the remote terminal device by using a PC5-RLC entity of the relay terminal device. The PDCP PDU on the Uu interface is transmitted on the PC5 interface by using the RLC layer, the MAC layer, and the PHY layer between the remote terminal device and the relay terminal. In embodiments of this application, the radio access network device may send control-plane data (for example, configuration information and an RRC message) to the first terminal device by using the second terminal device in the protocol stack architecture shown in FIG. 5. The first terminal device can receive, by using the second terminal device, the control-plane data (for example, the configuration information and the RRC message) sent by the radio access network device in the protocol stack architecture shown in FIG. 5. Protocol stacks of the remote terminal device and the relay terminal device each may include a relay adaptation layer (Adaptation Relay). The relay adaptation layer is used to distinguish between or identify radio link control service data units (Radio Link Control Service Data Units. RLC SDUs) or PDCP PDUs of different remote terminal devices. The relay adaptation layer may also be used to distinguish between or identify RLC SDUs or PDCP PDUs of different radio bearers of one remote terminal device.

Figure 6:
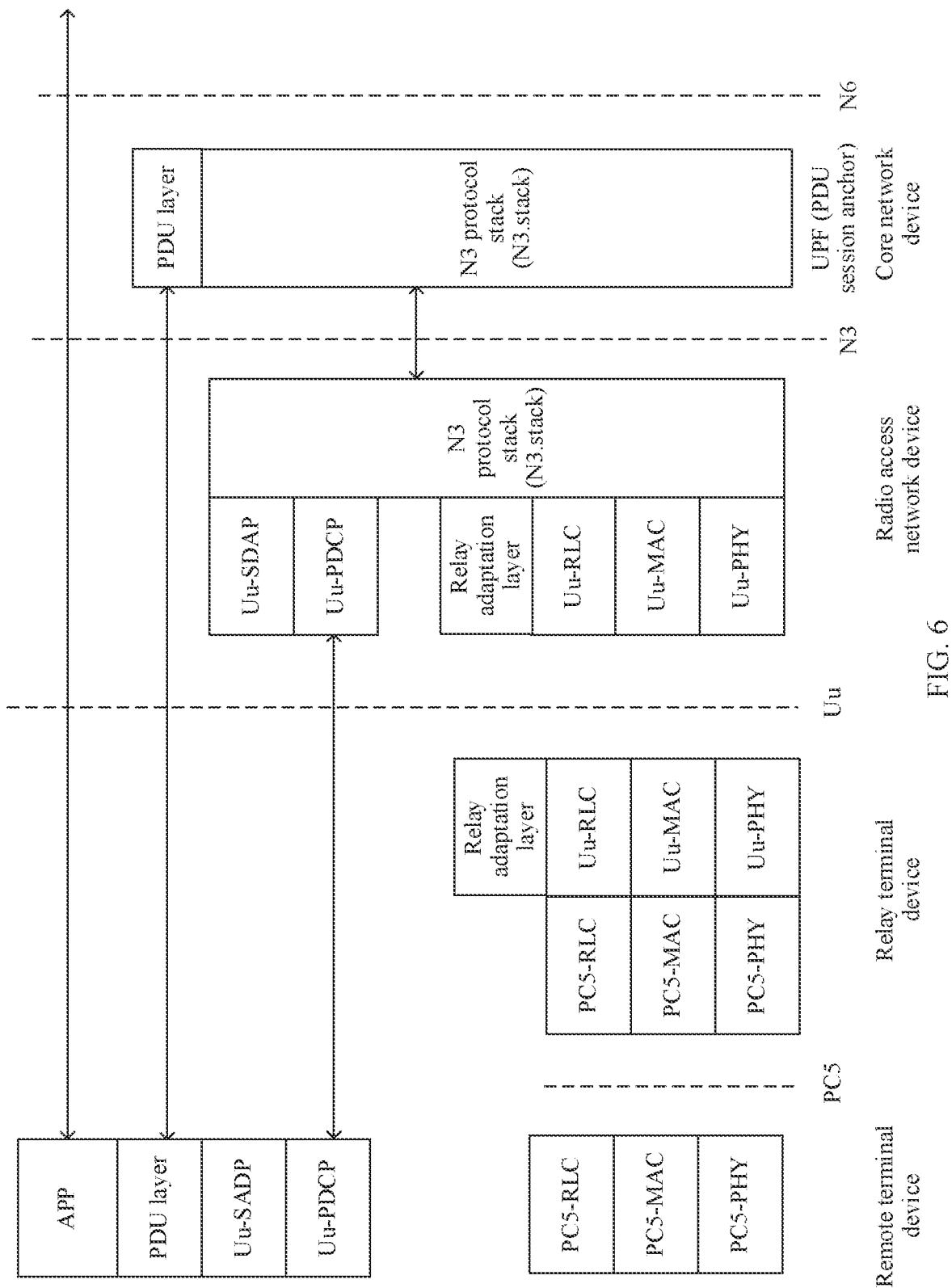
FIG. 6 is a schematic diagram of an example of an architecture of a user-plane protocol stack of a relay terminal device according to this application.

FIG. 6 is a schematic diagram of an example of an architecture of a user-plane protocol stack of a UE-to-Network Relay. User-plane data between a remote terminal device and a radio access network device is forwarded above an RLC layer by using a relay terminal device. A PDCP layer and an RRC layer on a Uu interface corresponding to the remote terminal device each are connected in an end-to-end manner between the remote terminal device and the radio access network device. In other words, the remote terminal device is connected to the radio access network device in an end-to-end manner at the PDCP layer and the RRC layer, and the PDCP layer and the RRC layer on the Uu interface corresponding to the remote terminal device are terminated on the radio access network device. After the remote terminal device and the radio access network device each establish a corresponding PDCP entity, there may be a corresponding end-to-end connection between the remote terminal device and the radio access network device.

As shown in FIG. 6, the remote terminal device and the relay terminal device, and the relay terminal device and the radio access network device are connected in an end-to-end manner at an RLC layer, a MAC layer, and a PHY layer. An RLC layer, a MAC layer, and a PHY layer of the remote terminal device are terminated on the relay terminal device. A PDCP PDU on the Uu interface corresponding to the remote terminal device is transparently transmitted between the relay terminal device and the radio access network device by using the relay terminal device. That is, the relay terminal device only needs to forward the PDCP PDU without changing the PDCP PDU. The relay terminal device may not decode PDCP PDU data, and then transmit the PDCP PDU data to the remote terminal device by using a PC5-RLC layer of the relay terminal device. The remote terminal device and the radio access network device are connected in an end-to-end manner at the PDCP layer on the Uu interface, and the relay terminal device relays the PDCP PDU between the remote terminal device and the radio access network device. The PDCP PDU on the Uu interface is transmitted on a PC5 interface by using the RLC layer, the MAC layer, and the PHY layer between the remote terminal device and the relay terminal. A DRB on the Uu interface corresponding to the remote terminal device is transmitted by using the PDCP layer on the Uu interface and by using an RLC layer, a MAC layer, and a PHY layer on the PC5 interface. In this embodiment of this application, a data packet transmitted between the remote terminal device and the radio access network device may also be referred to as a data packet on the Uu interface corresponding to the remote terminal device, and the data packet is forwarded by the relay terminal device. In embodiments of this application, the radio access network device may send user-plane data to the first terminal device by using the second terminal device in the protocol stack architecture shown in FIG. 6. The first terminal device can receive, by using the second terminal device, the user-plane data sent by the radio access network device in the protocol stack architecture shown in FIG. 6.

It should be understood that SL communication refers to direct communication between two terminal devices, and an interface (or a reference point) between the two terminal devices is referred to as a PC5 interface. In embodiments of this application, PC5 represents an interface or a reference point between the first terminal device and the second terminal device. In embodiments of this application. SL communication may also be referred to as PC5 communication. A PC5-RLC bearer represents an RLC bearer on a PC5 interface between the first terminal device (the remote terminal device) and the second terminal device (the relay terminal device), and the PC5-RLC bearer may also be referred to as an SL RLC bearer. A PC5-RLC entity may also be referred to as an SL RLC entity. A Uu-RLC bearer is established between the relay terminal device and the radio access network device, and an SL RLC bearer or a PC5-RLC bearer is established between the relay terminal device and the remote terminal device.

A radio bearer on a Uu interface corresponding to the remote terminal device includes a DRB used to transmit user-plane data and an SRB used to transmit control-plane data. The DRB on the Uu interface corresponding to the remote terminal device may be understood as a DRB between the remote terminal device and the network device. The DRB is used to carry user-plane data sent by the remote terminal device to the network device, or user-plane data sent by the network device to the remote terminal device. The SRB on the Uu interface corresponding to the remote terminal device may be understood as an SRB between the remote terminal device and the network device. The SRB is used to carry control signaling sent by the remote terminal device to the network device, or control signaling sent by the network device to the remote terminal device. In embodiments of this application, for ease of description, the SRB transmitted by the remote terminal device on the Uu interface may be referred to as a Uu SRB for short, and the DRB transmitted by the remote terminal device on the Uu interface may be referred to as a Uu DRB for short. In a scenario in which the remote terminal device communicates with the network device by using the relay terminal device, the SRB or the DRB on the Uu interface is first transmitted to the relay terminal device through the PC5 interface, and then forwarded by using the relay terminal device to the radio access network device. In other words, the SRB or the DRB of the remote terminal device on the Uu interface needs to be transmitted to the relay terminal device by using the RLC layer, the MAC layer, and the PHY layer on the PC5 interface between the remote terminal device and the relay terminal device, and then transmitted to the radio access network device by using the relay device.

A radio bearer on an SL between the remote terminal device and the relay terminal device also includes a DRB used to transmit user-plane data and an SRB used to transmit control-plane data. For differentiation, an SRB between the remote terminal device and the relay terminal device is referred to as an SL SRB, and a DRB between the remote terminal device and the relay terminal device is referred to as an SL DRB. The SL SRB is used to carry control signaling or control-plane data sent by the remote terminal device to the relay terminal device, or control signaling or control-plane data sent by the relay terminal device to the remote terminal device. The SL DRB is used to carry user-plane data sent by the remote terminal device to the relay terminal device, or user-plane data sent by the relay terminal device to the remote terminal device. The SL SRB or the SL DRB needs to be transmitted at the RLC layer, the MAC layer, and the PHY layer on the PC5 interface between the remote terminal device and the relay terminal device.

Currently, the Uu SRB or the Uu DRB of the remote terminal device uses a Uu RLC bearer. The Uu RLC bearer may be understood as an RLC bearer on the Uu interface between the network device and the remote terminal device. However, when there is the relay terminal device, the Uu SRB or the Uu DRB of the remote terminal device cannot use the Uu RLC bearer, that is, there is no peer RLC entity between the remote terminal device and the radio access network device on the Uu interface. For example, in the architecture shown in FIG. 5, the remote terminal device does not establish a Uu-RLC entity at the RLC layer. As a result, normal transmission of the control signaling on the Uu SRB or the user-plane data on the Uu DRB of the remote terminal device cannot be ensured, and efficiency of control signaling transmission or user-plane data transmission is relatively low.

In view of this, this application provides a signaling radio bearer configuration method or a data radio bearer configuration method. The SL RLC bearer is configured on the PC5 interface on the sidelink for the Uu SRB or the Uu DRB of the remote terminal device, so that the SL RLC bearer is established to transmit the Uu SRB or the Uu DRB. The SL RLC bearer between the remote terminal device and a relay terminal device is used to transmit control signaling carried by the Uu SRB or user-plane data carried by the Uu DRB. This can improve quality of the control signaling or the user-plane data, and improve transmission efficiency of the control signaling or the user-plane data.

Figure 7:
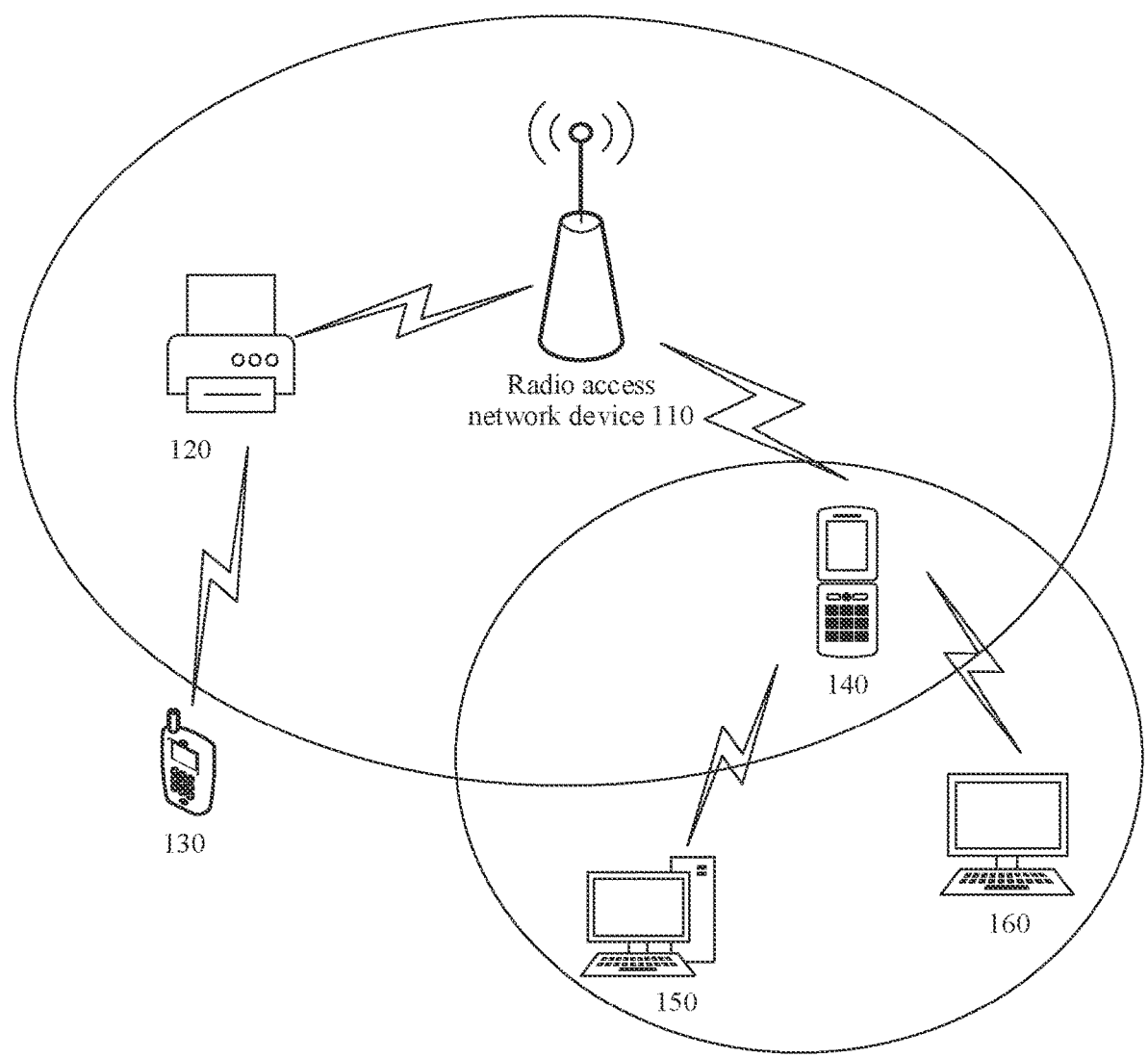
FIG. 7 is a schematic diagram of an example of a communications system to which an embodiment of this application is applicable according to this application.

The method provided in this application may be applied to a scenario shown in FIG. 4. Certainly, the method may also be applied to another scenario having a remote terminal device and a relay terminal device. FIG. 7 is a schematic diagram of an example of a communications system to which an embodiment of this application is applicable. As shown in FIG. 7, the mobile communications system may include at least one radio access network device 110 and at least one terminal device (terminal devices 120, 130, 140, 150, and 160 shown in FIG. 7). The terminal devices 130, 150, and 160 may be remote terminal devices, and the terminal device 130 communicates with the radio access network device 110 by using the relay terminal device 120. The terminal device 140 or the terminal device 160 communicates with the radio access network device 110 by using the relay terminal device 140. The radio access network device may be the foregoing network device. The at least one terminal device may send uplink data or information to the radio access network device, or the radio access network device 110 may send downlink data or information to the at least one terminal device. In addition, a plurality of terminal devices may form a communications system. For example, the terminal devices 140, 150, and 160 may form a communications system. The terminal device 140 may also send downlink data or information to the terminal devices 150 and 160, and the terminal devices 150 and 160 may also send uplink data or information to the terminal device 140.

It should be understood that, FIG. 7 is only a schematic diagram, and the communications system may further include another network device and/or another terminal device that are/is not shown in FIG. 7. Quantities of radio access network devices and terminals included in the mobile communications system are not limited in this embodiment of this application. In the mobile communications system, the radio access network device 110 may be the foregoing network device. In addition, communication between the network device and the terminal device complies with a specific protocol layer structure, for example, protocol layer architectures shown in FIG. 1 to FIG. 3 and FIG. 5 and FIG. 6. This is not limited herein in this embodiment of this application.

The following briefly describes a process of establishing a communication connection between the first terminal device (the remote terminal device) and the second terminal device (the relay terminal device). The first terminal device may transmit data or control signaling to the network device by using the second terminal device after the first terminal device establishes the communication connection to the second terminal device.

Figure 8A:
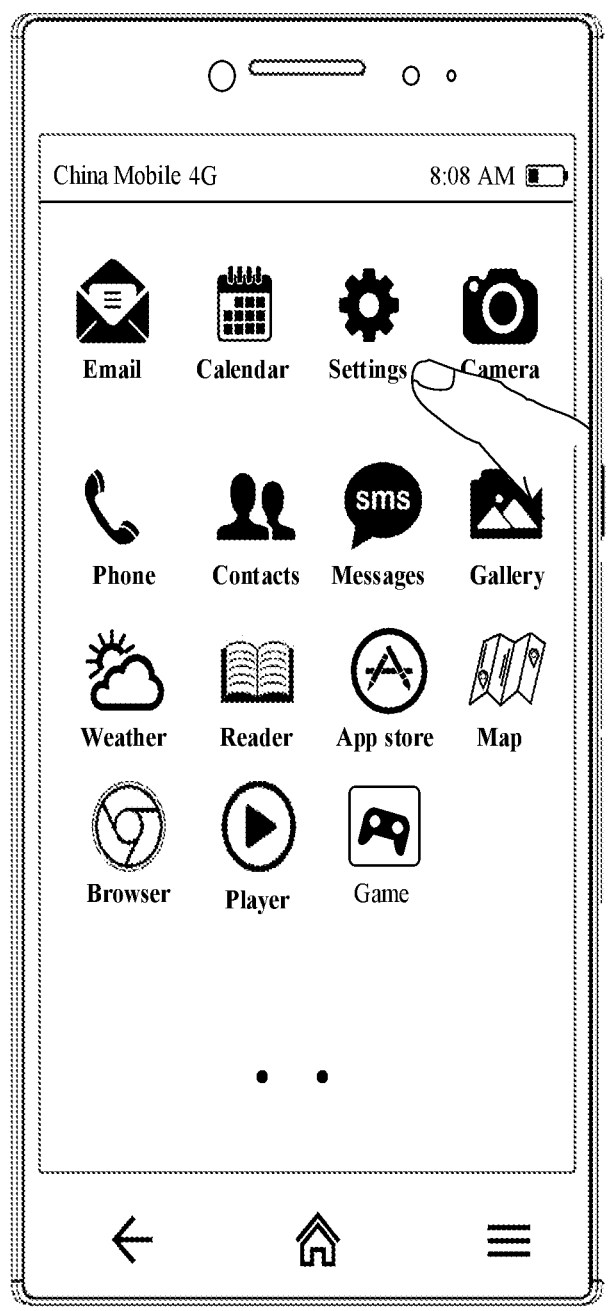
FIG. 8A to FIG. 8C are a schematic diagram of an example of a process of establishing a communication connection between two terminal devices according to an embodiment of this application.
Figure 8B:
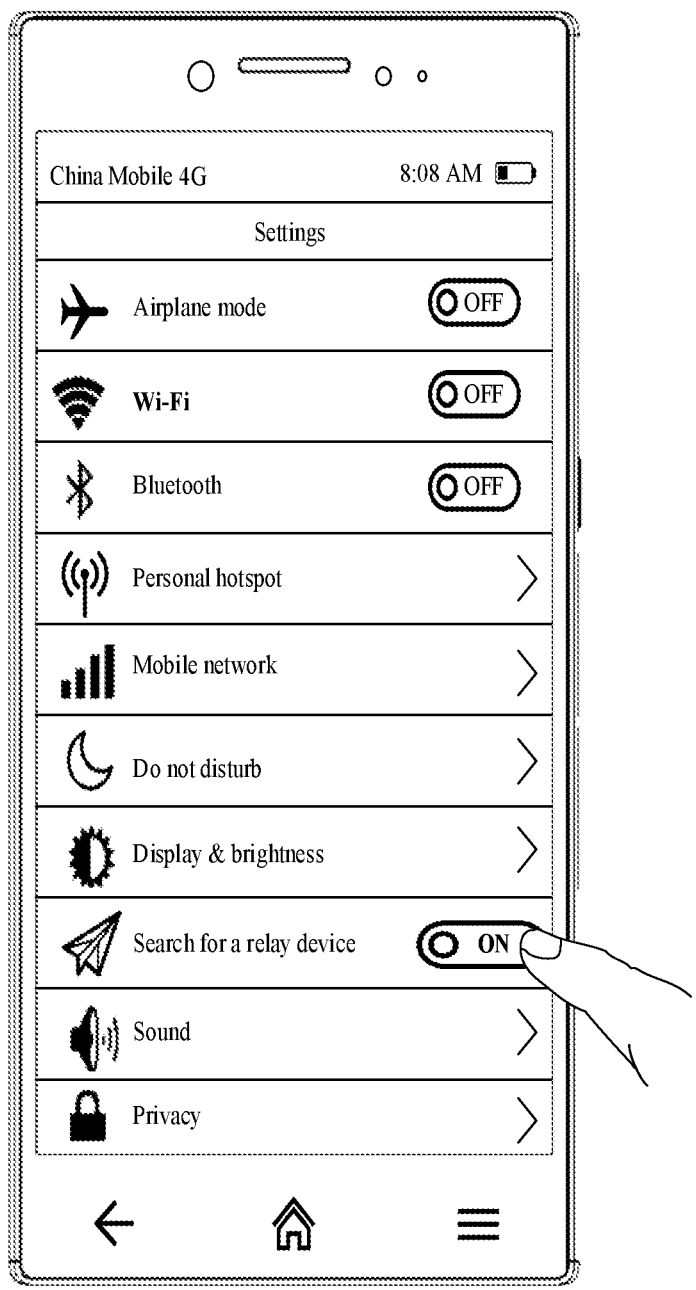
Figure 8C:
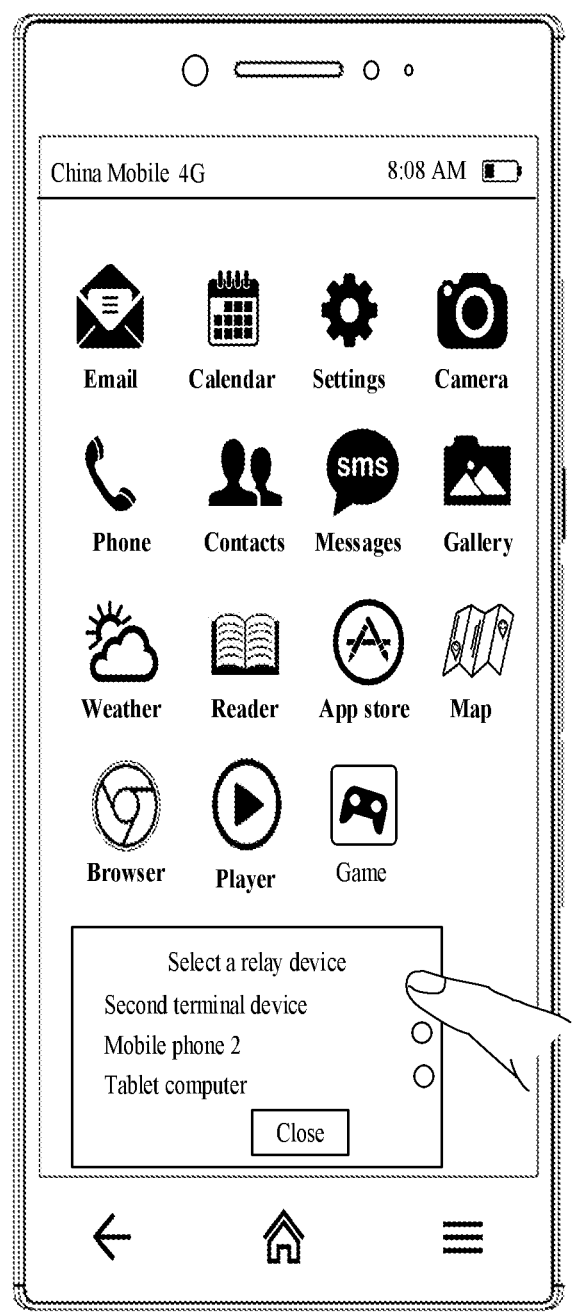

When the first terminal device is at an edge of a signal coverage area of the network device or is not in a signal coverage area of the network device, for example, when using the first terminal device, a user finds that a signal of the first terminal device is very poor and a data transmission delay is relatively long, the user may tap "Settings" menu in an interface of the first terminal device as shown in FIG. 8A, and an interface displaying a "Search for a relay device" menu is displayed as shown in FIG. 8B. "Search for a relay device" indicates that communication with the network device is expected to be performed by using another terminal device. After the user opens the "Search for a relay device" menu, as shown in FIG. 8C, information about another terminal device that can serve as the relay device may be displayed to the user in the interface of the first terminal device. For example, the first terminal device may search for the another device by using a conventional communications technology such as a wireless network communications protocol, and display, to the user, the information about the another device that can serve as the relay device of the first terminal device. The user may tap one of other devices that can be connected. After the user taps the terminal device (for example, the second terminal device), it indicates that the first terminal device determines to transmit the data and/or the control signaling to the network device by using the second terminal device. That is, the second terminal device is used as the relay device of the first terminal device.

Optionally, when the information about the another device that can serve as the relay device of the first terminal device is displayed to the user, an identifier, a serial number, a model, or the like of the another device may be displayed. For example, the serial number may be a network access license number. This is not limited herein in this embodiment of this application.

Figure 9A:
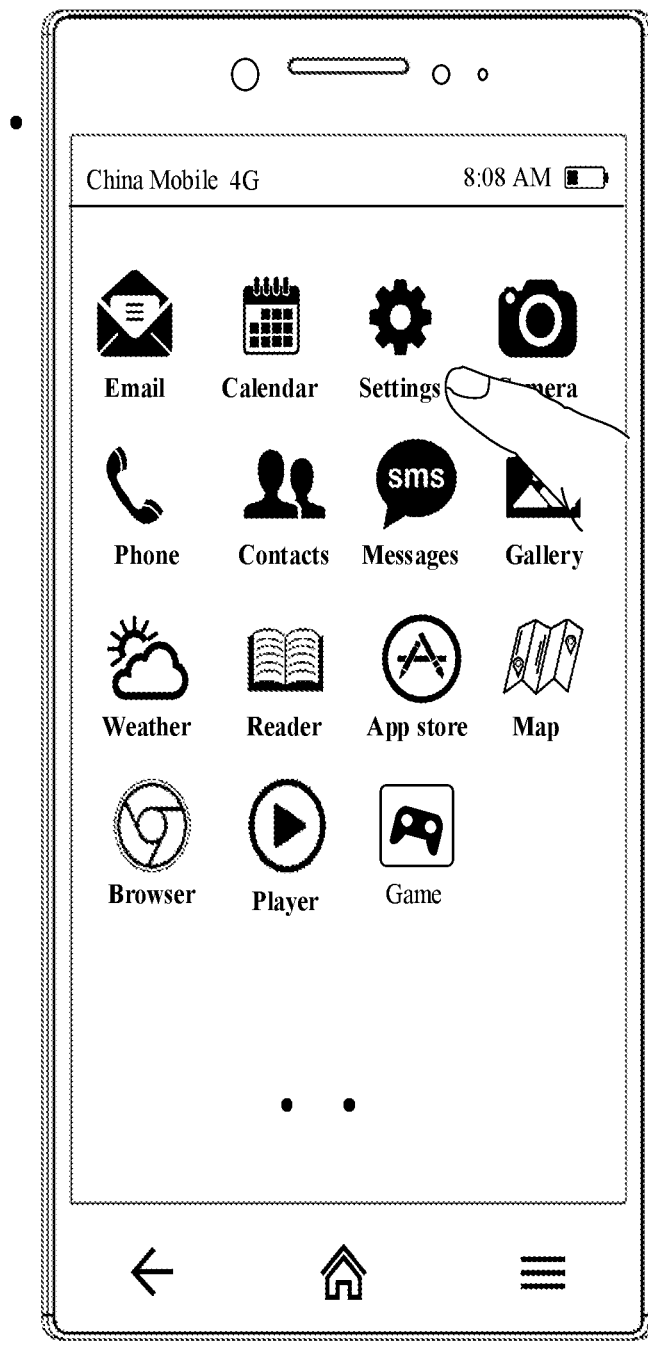
FIG. 9A to FIG. 9C are a schematic diagram of another example of a process of establishing a communication connection between two terminal devices according to this application.
Figure 9B:
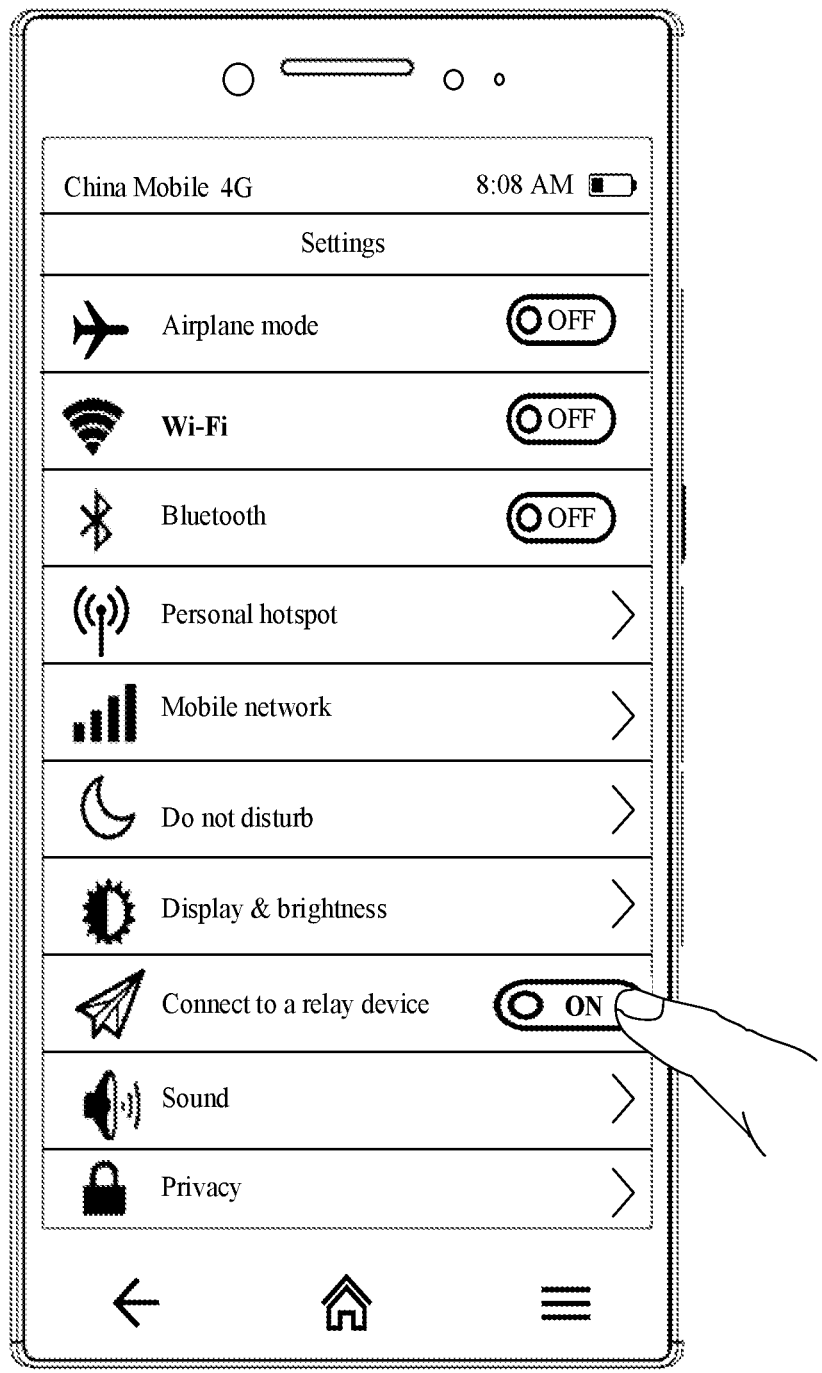
Figure 9C:
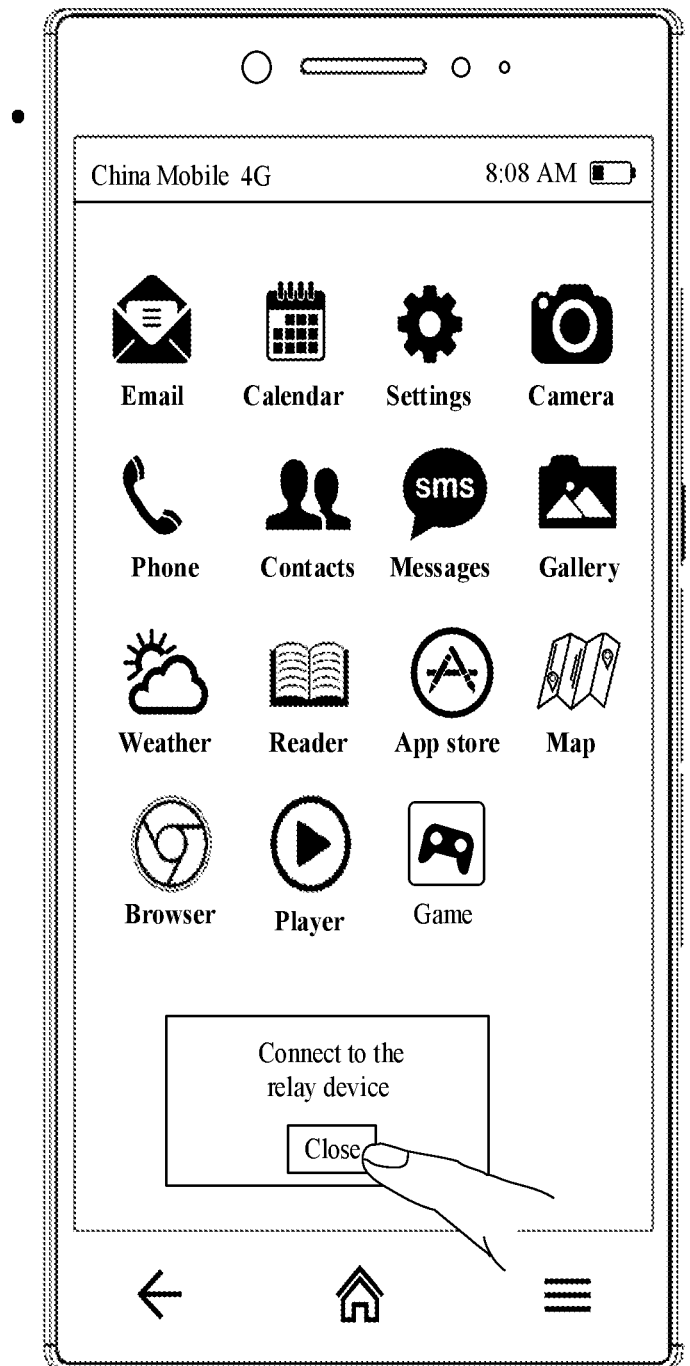

Optionally, in embodiments of this application, another process in which the first terminal device searches for the relay terminal device and establishes the connection to the relay terminal device is as follows: There is a menu in system settings of the first terminal device, for example, a name of the menu is "Connect to a relay device" or another name. FIG. 9A is a schematic diagram of a home screen displayed on the first terminal device. The user taps "Settings", and an interface is displayed as shown FIG. 9B. The user enables "Connect to a relay device". It means that the user needs to connect to the relay terminal device, and transmit the data and/or the control signaling to the network device by using the relay terminal device. After the user taps "Connect to a relay device", the first terminal device may automatically search for or connect to another nearby available terminal device. After the connection succeeds, as shown in FIG. 9C, the first terminal device may display a prompt "Connected to the relay device" to the user, to notify the user that a connection to the relay device is established. In this way, the connection to the relay terminal device can be established without being perceived by the user, thereby improving user experience.

Figure 10:
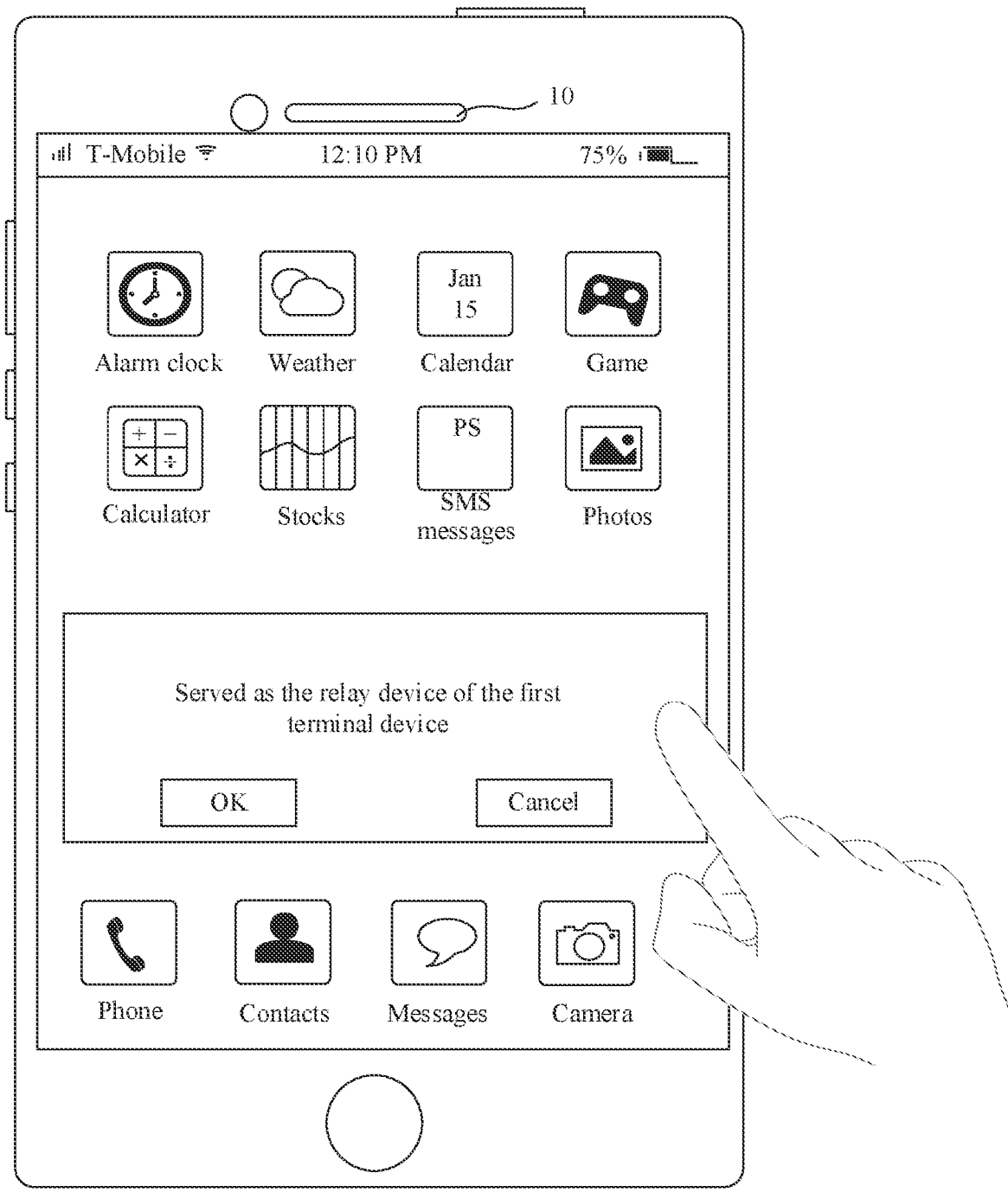
FIG. 10 is a schematic diagram of an interface displayed on a terminal device according to this application.

Optionally, when the user operates the first terminal device and expects the second terminal device to serve as the relay device of the first terminal device, further, in a display interface of the second terminal device, a prompt "Served as the relay device of the first terminal device" may be displayed to a user of the second terminal device. As shown in FIG. 10, if the user of the second terminal device taps "OK", it indicates that the second terminal device is allowed to serve as the relay device of the first terminal device. If the user does not agree, the user may tap "Cancel", and the first terminal device cannot use the second terminal device as the relay device.

Optionally, in embodiments of this application, the first terminal device may be an intelligent wearable device used by the user, for example, a smartwatch or a smart band, and the second terminal device may be a device used by the user, such as a mobile phone, a portable computer, a netbook, or a PDA. In this case, in the display interface of the second terminal device, prompt information "served as the relay device of the first terminal device" may be displayed to the user.

Optionally, in embodiments of this application, the first terminal device may search for, by using a wireless local area network (wireless local area network, WLAN) (for example, a wireless fidelity (wireless fidelity, Wi-Fi) network), Bluetooth (Bluetooth, BT), frequency modulation (frequency modulation, FM), near field communication (near field communication, NFC), an infrared (infrared. IR) technology, and the like, the another device that can serve as the relay device. This is not limited herein in this embodiment of this application.

Optionally, in embodiments of this application, when the first terminal device searches for and is connected to the relay device, some connection rules may be set as follows, for example, a mobile phone whose brand is the same as that of the first terminal device is automatically connected, or the first terminal device is automatically connected to a device that is the same as a device in a previous connection, to implement automatic connection.

Optionally, in a process in which the first terminal device automatically searches for and is connected to the another terminal device serving as the relay device, the first terminal device may further automatically recommend, to the user based on a previous connection status to the another device, the another device that can serve as the relay device. For example, assuming that after searching, the first terminal device finds that the another device that can be connected to the first terminal device and that can serve as the relay device is the same as the relay device used by the user last time, the first terminal device is automatically connected to the relay device that is the same as the relay device used last time, that is, implements automatic connection.

In embodiments of this application, signaling radio bearer configuration is used as an example for description. It may be understood that the method for configuring the RLC bearer for the Uu SRB of the remote terminal device on the PC5 interface provided in this application may also be applied to configuring the RLC bearer for the Uu DRB of the remote terminal device on the PC5 interface.

Figure 11:
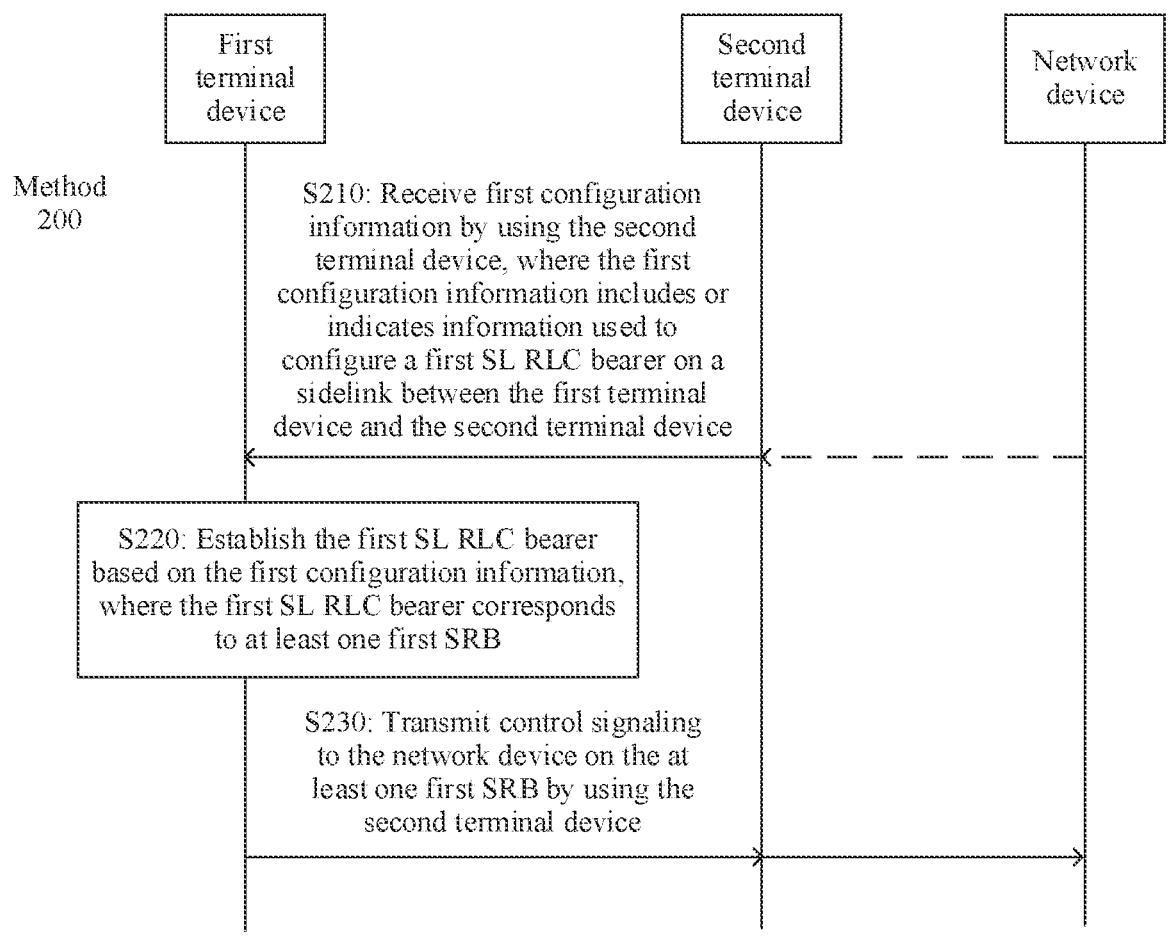
FIG. 11 is a schematic flowchart of an example of a signaling radio bearer configuration method according to an embodiment of this application.

The following describes in detail a communication method provided in this application with reference to FIG. 11. FIG. 11 is a schematic flowchart of a signaling radio bearer configuration method 200 according to an embodiment of this application. The method 200 may be applied to the scenario shown in FIG. 4 or FIG. 7 to FIG. 10. This is not limited in this embodiment of this application.

It should be understood that, in the following description, the method in embodiments is described by using an example in which the method in embodiments is performed by the first terminal device, the second terminal device, and the network device. The first terminal device may be the foregoing remote terminal device, the second terminal device may be the foregoing relay terminal device, and the network device may be the foregoing access network device. By way of example and not limitation, the method may alternatively be performed by chips applied to the first terminal device, the second terminal device, and the network device.

The method 200 shown in FIG. 11 may include steps S210 to S230.

S210: The first terminal device receives first configuration information by using the second terminal device, where the first configuration information includes or indicates information used to configure a first sidelink radio link control SL RLC bearer on a sidelink between the first terminal device and the second terminal device.

In this embodiment of this application, the first configuration information includes: one or more of SL RLC configuration information corresponding to the first SL RLC bearer, configuration information of a logical channel corresponding to the first SL RLC bearer, an index or identifier of the first SL RLC bearer, an identifier or index of at least one first SRB, an identifier or index of at least one first DRB (namely, a Uu DRB), or a logical channel identity (logical channel identity, LCID) corresponding to the first SL RLC bearer. The LCID is used to identify a logical channel corresponding to the first SL RLC bearer. The index or identifier of the first SL RLC bearer may be understood as an index or identifier of the first SL RLC bearer configuration, and is used to indicate or identify the first SL RLC bearer configuration. The identifier or index of the at least one first SRB may be understood as an index or identifier of the at least one first SRB configuration, and is used to indicate or identify the at least one first SRB configuration. The SL RLC configuration information is used to establish, configure, or reconfigure an RLC entity. The identifier or index of the at least one first DRB may be understood as an index or identifier of the at least one first DRB configuration, and is used to indicate or identify the at least one first DRB configuration.

The SL RLC configuration may include an RLC mode and a corresponding parameter. The RLC mode may include an acknowledged mode (acknowledged mode, AM), an unacknowledged mode (unacknowledged mod, UM), and the like. The corresponding parameter may include: a length of a sequence number (sequence number, SN) field, a timer (timer) used to retransmit a poll, a maximum quantity of retransmission times, or the like. Sidelink logical channel configuration may include an SL logical channel priority, a prioritized bit rate, or the like.

In S210, that the first terminal device receives the first configuration information by using the second terminal device may be understood as that the first configuration information is sent by the second terminal device to the first terminal device. This includes the following three cases:

Case 1: The first configuration information is determined and generated by the second terminal device, and then is sent to the first terminal device.

Case 2: The first configuration information may alternatively be determined by the network device, and the network device sends the first configuration information to the first terminal device by using the second terminal device. The first terminal device receives, by using the second terminal device, the first configuration information sent by the network device. The first configuration information is relayed by the second terminal device from the network device to the first terminal device. The network device first sends the first configuration information to the second terminal device, and the second terminal device directly forwards the first configuration information to the first terminal device. The second terminal device may not parse the first configuration information. The first configuration information may be included in an RRC message sent by the network device to the first terminal device. The RRC message may be relayed in the protocol stack architecture shown in FIG. 5, that is, relayed above the RLC layer. The RRC message is sent to the second terminal device by using the RLC bearer between the network device and the second terminal device, and then the second terminal device sends the RRC message to the first terminal device by using the RLC bearer between the second terminal device and the first terminal device. Optionally, the second terminal device may also parse the first configuration information, but does not modify the first configuration information. For example, after receiving the RRC message including the first configuration information, the second terminal device parses the RRC message, and sends the RRC message to the first terminal device by using the RLC bearer between the second terminal device and the first terminal device.

Case 3: The first configuration information is set by the second terminal device based on third configuration information sent by the network device to the second terminal device, and then sent to the first terminal device. The network device may send the third configuration information to the second terminal device by using first signaling (for example, RRC signaling). The second terminal device receives the signaling, parses the signaling, and then sets or determines the first configuration information based on the third configuration information; and sends the first configuration information to the first terminal device by using second signaling (for example, RRC reconfiguration signaling) different from the first signaling.

The second terminal device is a relay terminal device of the first terminal device, and the first terminal device transmits data or control signaling with the network device by using the second terminal device.

It should be understood that, in this embodiment of this application, in addition to a case in which the first configuration information is received by the first terminal device by using the second terminal device, the first configuration information may be predefined. In this case, the first terminal device may not obtain the first configuration information by using the second terminal device, the first terminal device may directly determine or obtain the first configuration information.

The first configuration information includes or indicates information used to configure a first SL RLC bearer on a sidelink between the first terminal device and the second terminal device, and the first SL RLC bearer corresponds to at least one first SRB. In this embodiment of this application, the first SRB may be understood as a Uu SRB, and the first SRB is used to transmit control signaling between the first terminal device and the network device.

In this embodiment of this application, the control signaling may also be understood as control-plane data, including an RRC message, a NAS message, or the like.

Optionally, in this embodiment of this application, the first SL RLC bearer may alternatively correspond to at least one first DRB, the first DRB may be understood as a Uu DRB, and the first DRB is used to transmit user-plane data between the first terminal device and the network device. In other words, the first SL RLC bearer may correspond to at least one first DRB, or the first SL RLC bearer corresponds to at least one first SRB.

It should be understood that, in this embodiment of this application, there may be a plurality of SL RLC bearers on the sidelink between the first terminal device and the second terminal device. In other words, the first terminal device and the second terminal device may establish a plurality of SL RLC bearers on the sidelink.

For example, the second terminal device may send the first configuration information to the first terminal device on a PC5 interface by using RRC signaling (for example, an RRC reconfiguration message RRCReconfigurationSidelink); or the second terminal device forwards RRC signaling (for example, an RRC setup (RRCSetup) message or an RRC reconfiguration (RRCReconfiguration) message) that is sent by the network device to the first terminal device and that includes the first configuration information.

S220: The first terminal device establishes the first SL RLC bearer based on the first configuration information, where the first SL RLC bearer corresponds to the at least one first signaling radio bearer SRB.

In S220, the first terminal device establishes the first SL RLC bearer based on the first configuration information. The first SL RLC bearer corresponds to the at least one first SRB. For example, when the first SL RLC bearer is configured, configuration information (for example, the first configuration information) of the first SL RLC bearer may carry the identifier or index of the at least one first SRB, to indicate a correspondence between the first SL RLC bearer and the at least one first SRB; the identifier or index of the first SL RLC bearer is carried in configuration information of the at least one first SRB, to indicate a correspondence between the first SL RLC bearer and the at least one first SRB; or a correspondence between the identifier or index of the at least one first SRB and the identifier and index of the first SL RLC bearer is configured.

Alternatively, the first SL RLC bearer corresponds to the at least one first DRB. For example, when the first SL RLC bearer is configured, configuration information (for example, the first configuration information) of the first SL RLC bearer may carry the identifier or index of the at least one first DRB, to indicate a correspondence between the first SL RLC bearer and the at least one first DRB; the identifier or index of the first SL RLC bearer is carried in configuration information of the at least one first DRB, to indicate a correspondence between the first SL RLC bearer and the at least one first DRB; or a correspondence between the identifier or index of the at least one first DRB and the identifier and index of the first SL RLC bearer is configured. That the first terminal device establishes the SL RLC bearer to the second terminal device may include that the first terminal device establishes an RLC entity, configures/establishes a logical channel, or the like. The first terminal device establishes the RLC entity based on the SL RLC configuration information in the first configuration information. The RLC entity processes an RLC SDU or an RLC PDU based on the SL RLC configuration information. The first terminal device establishes the logical channel based on the configuration information of the logical channel and/or the logical channel identity or index in the first configuration information. A MAC entity processes a MAC SDU or a MAC PDU based on the configuration information of the logical channel. Because the first SL RLC bearer corresponds to the at least one first SRB, the RLC entity and the logical channel that correspond to the first SL RLC bearer both correspond to the at least one first SRB.

Optionally, in this embodiment of this application, because the first SL RLC bearer corresponds to the at least one first DRB, the RLC entity and the logical channel that correspond to the first SL RLC bearer both correspond to the at least one first DRB.

In this embodiment of this application, the at least one first SRB may be understood as the at least one Uu SRB, and the at least one Uu SRB may include one or more of a Uu SRB 0, a Uu SRB 1, a Uu SRB 2, or a Uu SRB 3. The first SL RLC is used to carry one Uu SRB or a plurality of Uu SRBs. In other words, a corresponding first SL RLC bearer may be separately established for each Uu SRB, or a same first SL RLC bearer may be established for a plurality of different Uu SRBs.

Optionally, in this embodiment of this application, the first terminal device may separately establish one corresponding first SL RLC bearer for each Uu DRB, or may establish a same first SL RLC bearer for a plurality of different Uu DRBs.

It should be understood that, in this embodiment of this application, the second terminal device also needs to establish an SL RLC bearer corresponding to the first SL RLC bearer. In other words, both the first terminal device and the second terminal device each need to establish the first SL RLC bearer. For example, the second terminal device may establish an RLC entity, configure/establish a logical channel, or the like based on the first configuration information.

S230: The first terminal device transmits control signaling to the network device on the at least one first SRB by using the second terminal device.

In S230, after the first terminal device and the second terminal device each establish the first SL RLC bearer (including establishing the RLC entity and configuring the logical channel), and the first terminal device establishes a PDCP entity corresponding to the first SRB, the first terminal device may transmit the control signaling to the network device on the at least one first SRB by using the second terminal device. That the first terminal device transmits the control signaling to the network device on the first SRB by using the second terminal device may be understood as follows: The first terminal device sends the control signaling to the second terminal device on the first SRB on the PC5 interface between the first terminal device and the second terminal device, and then the second terminal device sends the control signaling to the network device. Therefore, the Uu SRB is transmitted on the SL RLC bearer on the sidelink between the first terminal device and the second terminal device. This can ensure normal transmission of the control signaling on the Uu SRB of the first terminal device, and improve quality and efficiency of the control signaling transmitted on the Uu SRB.

Optionally, in another possible implementation, in S230, after the first terminal device and the second terminal device each establish the first SL RLC bearer (including establishing the RLC entity and configuring the logical channel), and the first terminal device establishes a PDCP entity corresponding to the first DRB, the first terminal device may transmit the user-plane data to the network device on the at least one first DRB by using the second terminal device. This can ensure normal transmission of the data on the Uu DRB of the first terminal device, and improve quality and efficiency of the user-plane data transmitted on the Uu DRB.

In S230, for example, when the first terminal device needs to transmit the first SRB to the network device, the PDCP entity corresponding to the first SRB of the first terminal device receives an upper-layer SDU, and obtains a PDCP PDU through processing by the PDCP entity. Because in S220, the first terminal device establishes the first SL RLC bearer (including establishing the RLC entity and establishing or configuring the logical channel) corresponding to the first SRB, the first terminal device delivers the PDCP PDU to the RLC entity corresponding to the first SL RLC bearer, obtains an RLC PDU through processing by the RLC entity, and delivers the RLC PDU to the MAC entity. The MAC entity sends the RLC PDU to the second terminal device by using the SL logical channel corresponding to the first SL RLC bearer. Because the second terminal device establishes the first SL RLC bearer (including establishing the RLC entity and establishing or configuring the logical channel) corresponding to the first SRB, the second terminal device can determine, based on the SL logical channel, that the SRB corresponding to the SL logical channel is the first SRB. The second terminal device receives, on the SL logical channel, the RLC PDU sent by the first terminal device, and delivers the RLC PDU to the RLC entity corresponding to the first SL RLC bearer. The second terminal device obtains an RLC SDU through processing by the RLC entity. Because the RLC entity corresponds to the first SRB, and the first SRB is used to transmit control signaling between the first terminal device and the network device, the second terminal device sends the RLC SDU to the network device on the RLC bearer between the second terminal device and the network device. For example, when establishing an RLC bearer between the second terminal device and the network device, the second terminal device determines, based on configuration information, the RLC bearer that is between the second terminal device and the network device and that corresponds to the first SRB, that is, determines an RLC bearer corresponding to the first SRB. For example, the network device may configure a correspondence or a mapping relationship or an association relationship between the SRB or DRB and the RLC bearer. Therefore, when sending the first SRB to the network device, the second terminal device determines the corresponding RLC bearer based on the first SRB, and sends the first SRB to the network device on the corresponding RLC bearer.

When the network device needs to transmit the first SRB to the first terminal device, a PDCP entity of the network device receives an upper-layer SDU, and obtains a PDCP PDU through processing by the PDCP entity. The network device determines an RLC bearer corresponding to the first SRB, and sends the PDCP PDU to the second terminal device by using the RLC bearer between the second terminal device and the network device. The second terminal device may determine, based on the RLC bearer on which the PDCP PDU is received, that the PDCP PDU on the RLC bearer corresponds to the first SRB. After receiving the PDCP PDU, the second terminal device delivers the PDCP PDU to an RLC entity corresponding to the first SL RLC bearer, obtains an RLC PDU through processing by the RLC entity, and delivers the RLC PDU to a MAC entity. The MAC entity sends the RLC PDU to the first terminal device by using the SL logical channel corresponding to the first SL RLC bearer. The first terminal device receives, on the SL logical channel, the RLC PDU sent by the second terminal device, and the first terminal device may determine, based on the SL logical channel on which the RLC PDU is received, that the SRB corresponding to the SL logical channel is the first SRB. The first terminal device delivers the RLC PDU to an RLC entity corresponding to the first SL RLC bearer, and obtains an RLC SDU through processing by the RLC entity. The first terminal device determines that the RLC SDU corresponds to the first SRB, and therefore delivers the RLC SDU to a PDCP entity corresponding to the first SRB.

Optionally, in this embodiment of this application, the PC5 interface between the first terminal device and the second terminal device may simultaneously need to transmit the SL SRB, the Uu SRB, or the Uu DRB. The SL SRB is also carried on the SL RLC. Therefore, whether the SL SRB, the Uu SRB, or the Uu DRB is transmitted on the PC5 interface cannot be distinguished. As a result, confusion may occur during transmission of control signaling or data. For example, control signaling carried by the Uu SRB is originally sent by the first terminal device to the network device by using the second terminal device. After receiving the control signaling, the second terminal device cannot distinguish whether the control signaling is sent to the second terminal device or sent to the network device, and may not correctly parse the control signaling. As a result, the control signaling fails to be transmitted.

Therefore, in this embodiment of this application, the first SL RLC bearer established by the first terminal device is different from a second SL RLC bearer on the sidelink, the second SL RLC bearer corresponds to a second SRB, and the second SRB may be understood as an SL SRB. The first terminal device transmits control signaling or control-plane data to the second terminal device on the second SRB.

According to the signaling radio bearer configuration method provided in this application, the SL RLC bearer different from that of the SL SRB is configured for the Uu SRB. Because SL RLC bearers corresponding to the SL SRB (the second SRB) and the Uu SRB are different, the first terminal device and the second terminal device can distinguish between, based on the different SL RLC bearers, the Uu SRB and the SL SRB on the SL between the first terminal device and the second terminal device; and correctly distinguish between the control signaling carried on the Uu SRB and the control signaling carried on the SL SRB after distinguishing between the Uu SRB and the SL SRB. This can ensure accurate transmission of the control signaling, and improve data transmission efficiency and user experience.

In another implementation, in this embodiment of this application, the SL RLC bearer different from that of the SL DRB is configured for the Uu DRB. Because SL RLC bearers corresponding to the SL DRB (a second SRB) and the Uu DRB are different, the first terminal device and the second terminal device can distinguish between, based on the different SL RLC bearers, the Uu DRB and the SL DRB on the SL between the first terminal device and the second terminal device; and correctly distinguish between the control signaling carried on the Uu DRB and the control signaling carried on the SL DRB after distinguishing between the Uu DRB and the SL DRB. This can ensure accurate transmission of the data, and improve data transmission efficiency and user experience.

It should be understood that, in this embodiment of this application, when the SL RLC bearer different from that of the SL SRB is configured for the Uu SRB, or when the SL RLC bearer same as that of the SL SRB is configured for the Uu SRB, a possible implementation is as follows: SL RLC bearer configuration corresponding to a Uu SRB 0 is defined in a standard protocol. SL RLC bearer configuration corresponding to a Uu SRB 1/a Uu SRB 2/a Uu SRB 3 is defined by default in the standard protocol. The network device may further configure SL RLC bearer configuration corresponding to the Uu SRB 1/Uu SRB 2/Uu SRB 3. It should be understood that SL RLC bearers corresponding to the Uu SRB 1, the Uu SRB 2, and the Uu SRB 3 may be different RLC bearers. This is not limited herein in this embodiment of this application.

Figure 12:
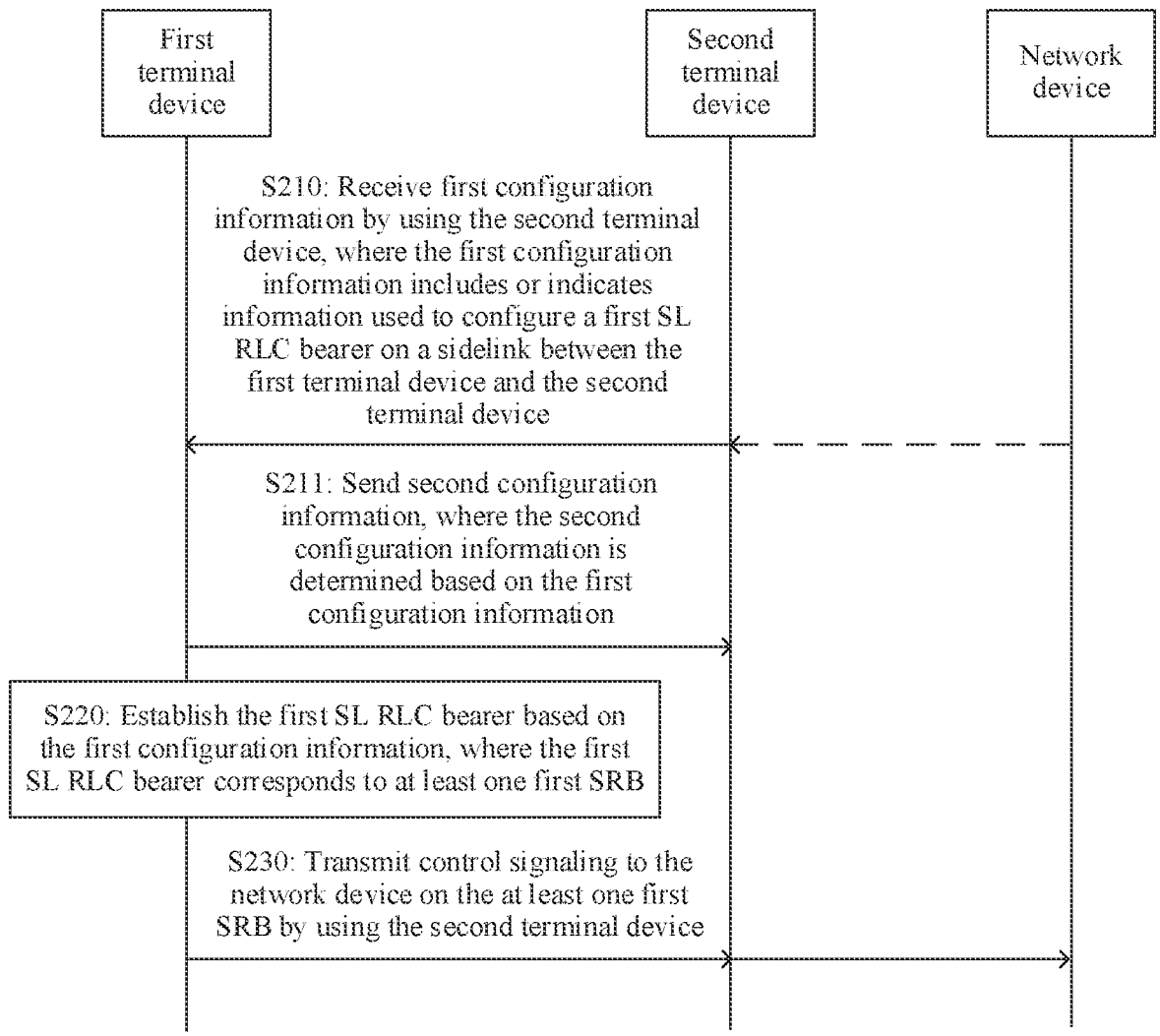
FIG. 12 is a schematic flowchart of another example of a signaling radio bearer configuration method according to an embodiment of this application.

Optionally, in some possible implementations of this application, FIG. 12 is a schematic flowchart of the signaling radio bearer configuration method according to some embodiments of this application. On the basis of the steps of the method shown in FIG. 11, the method 200 further includes S211.

S211: The first terminal device sends second configuration information to the second terminal device, where the second configuration information is determined based on the first configuration information.

For steps S210. S220, and S230 shown in FIG. 12, refer to the related descriptions of S210. S220, and S230. For brevity, details are not described herein again.

In S211, when the first configuration information is first sent by the network device to the second terminal device, and directly forwarded by the second terminal device to the first terminal device, the first terminal device can determine the second configuration information based on the first configuration information, where the second configuration information is used by the second terminal device to establish the first SL RLC bearer. Content included in the second configuration information may be the same as content included in the first configuration information, content included in the second configuration information may be a subset of content included in the first configuration information, content included in the second configuration information is content that is determined based on the first configuration information and that is different from that of the first configuration information, or partial content included in the second configuration information may be the same as partial content included in the first configuration information. After the first terminal device determines or generates the second configuration information, the first terminal device may send the second configuration information to the second terminal device. For example, the first terminal device may send the second configuration information to the second terminal device by using RRC signaling on a PC5 interface. For example, the RRC signaling may be an RRC reconfiguration message (RRCReconfiguration-Sidelink).

Optionally, in this embodiment of this application, in S210, if the first configuration information is first sent by the network device to the second terminal device, and directly forwarded by the second terminal device to the first terminal device, after the first terminal device receives the first configuration information, the first terminal device may also directly send the first configuration information to the second terminal device, instead of sending the second configuration information to the second terminal device.

In other words, in this embodiment of this application, the first terminal device may send the first configuration information or the second configuration information to the second terminal device.

Optionally, in this embodiment of this application, the second configuration information includes:

one or more of SL RLC configuration information corresponding to the first SL RLC bearer, configuration information of a logical channel corresponding to the first SL RLC bearer, an index or identifier of the first SL RLC bearer, an identifier or index of at least one first SRB, an identifier or index of at least one first DRB, or an LCID corresponding to the first SL RLC bearer.

The SL RLC configuration information and the configuration information of the logical channel in the first configuration information may include information specific to a transmit end and information shared by the transmit end and a receive end of the SL RLC bearer. The second configuration information may include the information shared by the transmit end and the receive end of the SL RLC bearer, so that after receiving the second configuration information, the second terminal device can determine information of the receive end of the first SL RLC bearer. Optionally, the second configuration information may further include the information specific to the transmit end of the SL RLC bearer. After receiving the second configuration information, the second terminal device may further determine the information of the transmit end of the first SL RLC bearer. Therefore, the second terminal device can transmit, to the first terminal device on the SL RLC bearer, the control signaling sent by a network to the first terminal device.

Optionally, the LCID in the second configuration information may be determined by the first terminal device based on the first configuration information, or may be determined by the first terminal device, that is, the first terminal device may not need the first configuration information when determining the LCID. When the first terminal device determines the LCID, the first terminal device may further indicate the LCID to the network device. The first terminal device may further indicate, to the network device, that the LCID corresponds to the first SL RLC bearer, the first SRB, or the first DRB. For example, the first terminal device sends indication information to the network device, where the indication information includes or indicates the LCID and the identifier or index of the first SL RLC bearer, or the indication information includes or indicates the LCID and the identifier or index of the first SRB. Alternatively, after the second terminal device receives the second configuration information and determines the LCID in the second configuration information, the second terminal device indicates the LCID to the network device. The second terminal device may further indicate, to the network device, that the LCID corresponds to the first SL RLC bearer, the first SRB, or the first DRB. For example, the second terminal device sends indication information to the network device, where the indication information includes or indicates the LCID and the identifier or index of the first SL RLC bearer, or the indication information includes or indicates the LCID and the identifier or index of the first SRB. When the first terminal device determines the LCID based on the first configuration information, the LCID is determined by the network device and sent to the first terminal device by using the first configuration information.

Optionally, the SL RLC configuration information in the second configuration information may be the same as the SL RLC configuration information in the first configuration information, and the configuration information of the logical channel in the second configuration information may be the same as the configuration information of the logical channel in the first configuration information. For example, in this case, the second configuration information may include the information specific to the transmit end, and the information shared by the transmit end and the receive end of the SL RLC bearer.

When the first configuration information is sent by the network device to the first terminal device by using the second terminal device, optionally, the SL RLC configuration information in the second configuration information may be different from the SL RLC configuration information in the first configuration information. The SL RLC configuration information in the second configuration information may be used to configure an SL RLC receive end parameter. The configuration information of the logical channel in the second configuration information may be different from the configuration information of the logical channel in the first configuration information. The configuration information of the logical channel in the second configuration information may be used to configure a logical channel receive end parameter.

Figure 13:
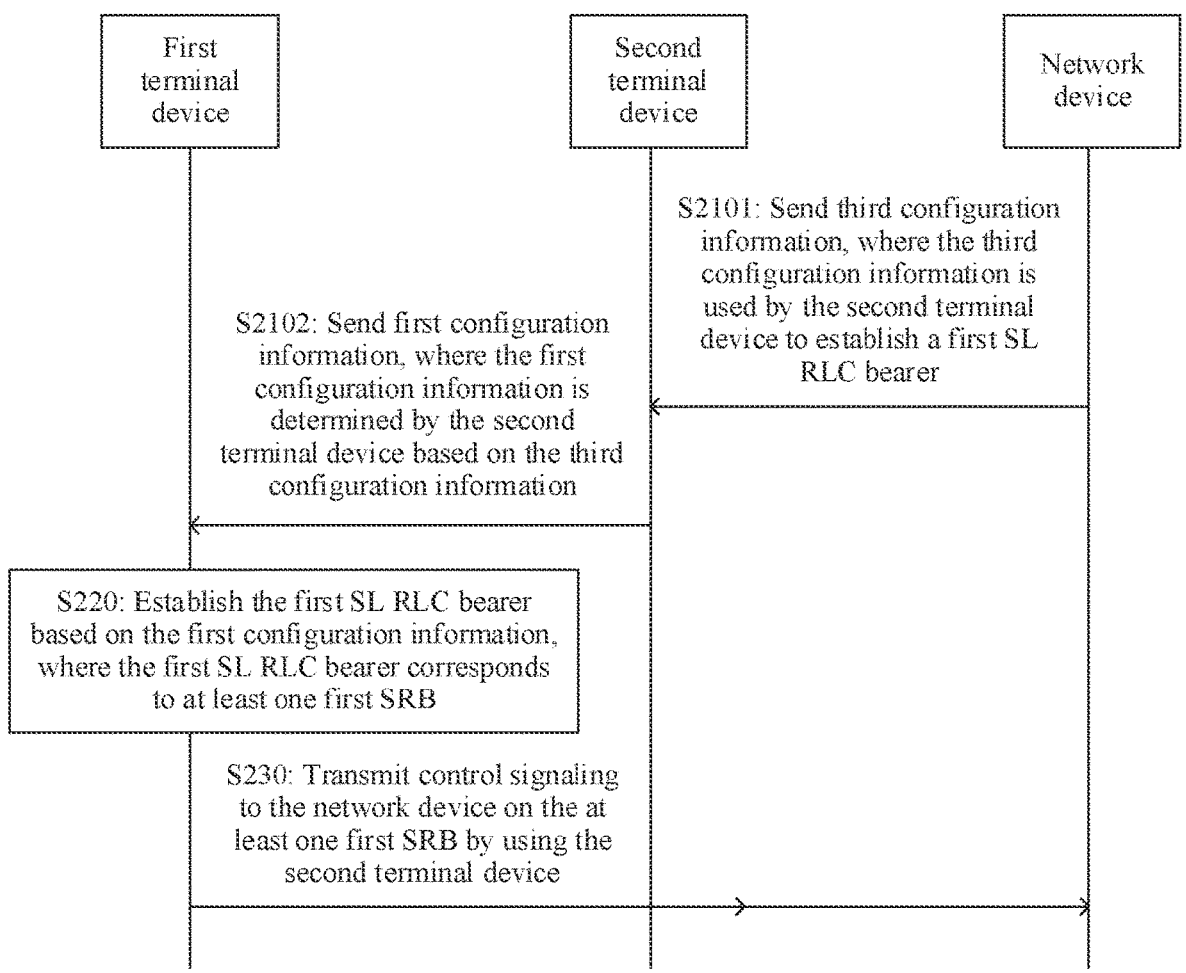
FIG. 13 is a schematic flowchart of another example of a signaling radio bearer configuration method according to an embodiment of this application.

Optionally, in some possible implementations of this application, if the first configuration information is set by the second terminal device based on third configuration information sent by the network device to the second terminal device, and then sent to the first terminal device, FIG. 13 is a schematic flowchart of the signaling radio bearer configuration method according to some embodiments of this application. As shown in FIG. 13, the method 200 includes S2101, S2102, S220, and S230.

S2101: The network device sends the third configuration information to the second terminal device, where the third configuration information is used by the second terminal device to establish the first SL RLC bearer.

S2102: The second terminal device sends the first configuration information to the first terminal device, where the first configuration information is determined by the second terminal device based on the third configuration information.

For steps S220 and S230 shown in FIG. 13, refer to the related descriptions of S220 and S230. For brevity, details are not described herein again.

In S2101, the network device sends the third configuration information to the second terminal device, where the third configuration information is used by the second terminal device to establish the first SL RLC bearer. For example, the third configuration information includes one or more of SL RLC configuration information corresponding to the first SL RLC bearer, configuration information of a logical channel corresponding to the first SL RLC bearer, an index or identifier of the first SL RLC bearer, an identifier or index of at least one first SRB, an identifier or index of at least one first DRB, or an LCID corresponding to the first SL RLC bearer.

Optionally, the third configuration information may be sent by using RRC signaling. For example, the network device may send the third configuration information to the second terminal device by using RRC setup (RRCSetup) signaling or RRC reconfiguration (RRCReconfiguration) signaling.

In S2102, the second terminal device sends the first configuration information to the first terminal device, where the first configuration information is determined by the second terminal device based on the third configuration information. Optionally, content included in the first configuration information may be the same as content included in the third configuration information, content included in the first configuration information may be a subset of content included in the third configuration information, content included in the first configuration information is content that is determined based on the third configuration information and that is different from that of the third configuration information, or partial content included in the first configuration information may be the same as partial content included in the third configuration information.

Optionally, the LCID in the first configuration information may be determined or selected by the second terminal device instead of being determined based on the third configuration information, or the LCID in the first configuration information may be determined or selected by the second terminal device based on the third configuration information. When the second terminal device determines or selects the LCID, the second terminal device may further indicate the LCID to the network device. The second terminal device may further indicate, to the network device, that the LCID corresponds to the first SL RLC bearer, the first SRB, or the first DRB. For example, the second terminal device sends indication information to the network device, where the indication information includes or indicates the LCID and the identifier or index of the first SL RLC bearer, or the indication information includes or indicates the LCID and the identifier or index of the first SRB. After the first terminal device receives the first configuration information and determines the LCID in the first configuration information, the first terminal device indicates the LCID to the network device. The first terminal device may further indicate, to the network device, that the LCID corresponds to the first SL RLC bearer, the first SRB, or the first DRB. For example, the first terminal device sends indication information to the network device, where the indication information includes or indicates the LCID and the identifier or index of the first SL RLC bearer, or the indication information includes or indicates the LCID and the identifier or index of the first SRB. When the second terminal device determines the LCID based on the third configuration information, the LCID is determined by the network device.

Optionally, the second terminal device may send the first configuration information to the first terminal device on the PC5 interface by using RRC signaling (for example, RRCReconfigurationSidelink).

Optionally, in some possible implementations of this application, in S210, if the first configuration information is determined by the network device and sent by using the second terminal device to the first terminal device, the network device may further send the third configuration information to the second terminal device. In this case, after receiving the third configuration information, the second terminal device may not need to send the first configuration information to the first terminal device. In addition, after receiving the first configuration information, the first terminal device may not need to send the second configuration information to the second terminal device. After the first terminal device receives the first configuration information, or after the first terminal device sends, to the network device, a response message corresponding to the first configuration information, the first terminal device may establish the first SL RLC bearer. After receiving the third configuration information, or after sending, to the network device, a response message corresponding to the third configuration information, the second terminal device may also establish the first SL RLC bearer. After the first terminal device and the second terminal device establish the first SL RLC bearer, the first terminal device may transmit the control signaling to the network device on the at least one first SRB, or transmit the user-plane data with the network device on the at least one first DRB by using the second terminal device. The SL RLC configuration information and the configuration information of the logical channel in the first configuration information may include the information specific to the transmit end and the information shared by the transmit end and the receive end of the SL RLC bearer. The first terminal device may determine the information of the transmit end and the information of the receive end of the first SL RLC bearer based on the first configuration information. The SL RLC configuration information and the configuration information of the logical channel in the third configuration information may include information specific to a transmit end and information shared by the transmit end and a receive end of the SL RLC bearer. The second terminal device may determine the information of the transmit end and the information of the receive end of the first SL RLC bearer based on the third configuration information. The first configuration information and the third configuration information may be the same, so that the first terminal device and the second terminal device each can determine the information of the transmit end and the information of the receive end, the information of the receive end determined by the first terminal device matches the information of the transmit end determined by the second terminal device, and the information of the receive end determined by the second terminal device matches the information of the transmit end determined by the first terminal device. Optionally, in a possible implementation of this application, the network device first sends the third configuration information to the second terminal device, and after determining that the second terminal device receives the third configuration information or receiving the response message that corresponds to the third configuration information and that is sent by the second terminal device, then, the network device sends the first configuration information to the first terminal device.

Figure 14:
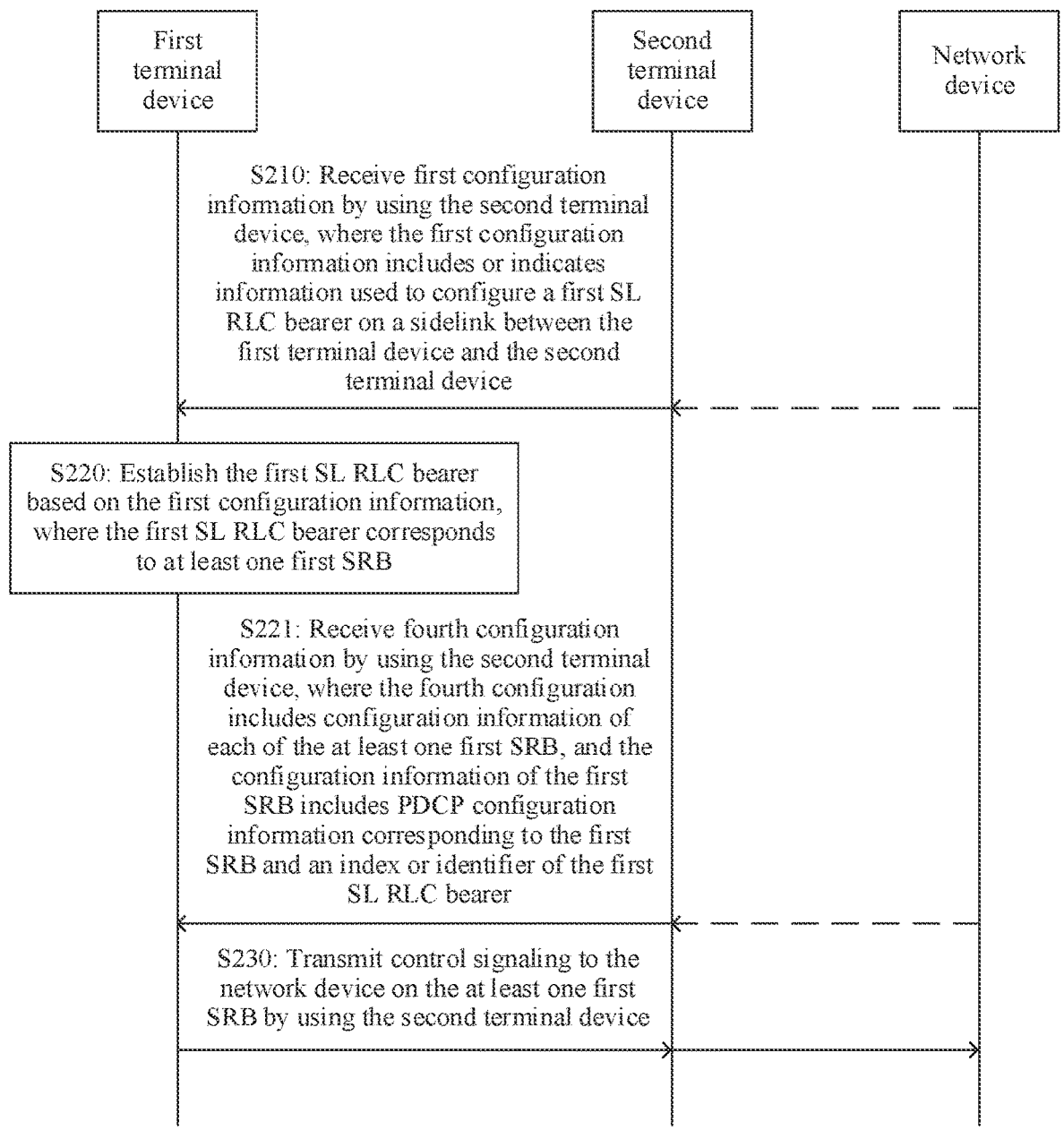
FIG. 14 is a schematic flowchart of still another example of a signaling radio bearer configuration method according to an embodiment of this application.

Optionally, in some possible implementations of this application, FIG. 14 is a schematic flowchart of the signaling radio bearer configuration method according to some embodiments of this application. On the basis of the steps of the method shown in FIG. 11, the method 200 further includes S221.

S221: The first terminal device receives fourth configuration information by using the second terminal device, where the fourth configuration information includes configuration information of one or more first SRBs in the at least one first SRB, and the configuration information of the first SRB includes at least one of PDCP configuration information corresponding to the first SRB, an identifier of the first SRB, or an index of the first SRB; or the fourth configuration information includes configuration information of one or more first DRBs in the at least one first DRB, and the configuration information of the first DRB includes at least one of PDCP configuration information corresponding to the first DRB, an identifier of the first DRB, or an index of the first DRB.

For steps S210, S220, and S230 shown in FIG. 14, refer to the related descriptions of S210, S220, and S230. For brevity, details are not described herein again.

Optionally, the fourth configuration information and the first configuration information are placed in a same information element (information element, IE), or the fourth configuration information and the first configuration information are placed in different information elements; or the fourth configuration information and the first configuration information are placed in a same message, or the fourth configuration information and the first configuration information are placed in different messages.

Optionally, the fourth configuration information or the configuration information of the first SRB may further include an index or identifier of the first SL RLC bearer.

Optionally, the fourth configuration information or the configuration information of the first DRB may further include an index or identifier of the first SL RLC bearer.

Optionally. PDCP configuration information corresponding to the first SRB or the first DRB and the index or identifier of the first SL RLC bearer may be placed in a same information element (information element, IE), or may be placed in different IEs. This is not limited in this embodiment of this application.

In S221, that the first terminal device receives the fourth configuration information by using the second terminal device may include the following three cases:

Case 1: The fourth configuration information is determined and generated by the second terminal device, and then is sent to the first terminal device.

Case 2: The fourth configuration may alternatively be determined by the network device, and the network device sends the fourth configuration information to the first terminal device by using the second terminal device. The first terminal device receives, by using the second terminal device, the fourth configuration information sent by the network device. The network device first sends the fourth configuration information to the second terminal device, and the second terminal device directly forwards the fourth configuration information to the first terminal device. The second terminal device may not parse the fourth configuration information. The fourth configuration information may be included in an RRC message sent by the network device to the first terminal device. The RRC message is sent to the second terminal device by using the RLC bearer between the network device and the second terminal device, and then the second terminal device sends the RRC message to the first terminal device by using the RLC bearer between the second terminal device and the first terminal device. Alternatively, the second terminal device may parse the fourth configuration information, but does not modify the fourth configuration information. For example, after receiving the RRC message including the fourth configuration information, the second terminal device parses the RRC message, and sends the RRC message to the first terminal device by using the RLC bearer between the second terminal device and the first terminal device.

Case 3: The fourth configuration information is set by the second terminal device based on other configuration information (for example, sixth configuration information) sent by the network device to the second terminal device, and then the second terminal device sends the fourth configuration information to the first terminal device. The network device may send the sixth configuration information to the second terminal device by using first signaling (for example, RRC signaling). The second terminal device receives the signaling, parses the signaling, and then sets or determines the fourth configuration information based on the sixth configuration information; and sends the fourth configuration information to the first terminal device by using second signaling (for example, RRC reconfiguration signaling) different from the first signaling.

After receiving the fourth configuration information, the first terminal device may determine the configuration information of the at least one first SRB or the at least one first DRB. The first terminal device may further determine, based on the fourth configuration information, one or more first SRBs or one or more first DRBs corresponding to the first SL RLC bearer, or determine that one or more first SRBs correspond to the first SL RLC bearer, or determine that one or more first DRBs correspond to the first SL RLC bearer. To be specific, the first terminal device may associate the first SL RLC bearer with the at least one first SRB or the first DRB based on the fourth configuration information. In other words, when the first SL RLC bearer corresponds to the one or more first SRBs or first DRBs, the fourth configuration information may be used to notify the first terminal device of a correspondence between the first SL RLC bearer and the one or more first SRBs or first DRBs. This ensures that the first terminal device can determine the one or more first SRBs or first DRBs corresponding to the first SL RLC bearer. Therefore, it can be ensured that the first terminal device transmits the control signaling to the network device on the one or more first SRBs by using the first SL RLC and the second terminal device. In addition, the fourth configuration information needs to include only the index or identifier of the first SL RLC bearer, and does not need to carry specific configuration information of the first SL RLC bearer. This can reduce signaling overheads and improve resource utilization.

It should be understood that, in this embodiment of this application, the fourth configuration information may be sent at a time, or may be separately sent by using different signaling.

That the fourth configuration information is sent by using different signaling may be understood as follows: One piece of signaling includes configuration information of one first SRB or one first DRB, and configuration information of a plurality of first SRBs or a plurality of first DRBs needs to be separately sent by using a plurality of pieces of signaling. Configuration of each first SRB or each first DRB is independent, and configuration information of each first SRB or each first DRB includes at least one of PDCP configuration information corresponding to the first SRB or the first DRB, an identifier of the first SRB or the first DRB, and an index of the first SRB or the first DRB. The configuration information of each first SRB or each first DRB may further include an index or identifier of the first SL RLC bearer. In other words, the fourth configuration information may be sent by using the plurality of pieces of signaling, and each piece of signaling includes PDCP configuration information corresponding to one first SRB or one first DRB. To be specific, configuration information of a plurality of first SRBs or a plurality of first DRBs is separately sent, and is not sent together.

One manner of sending the fourth configuration information at a time is that one piece of signaling includes configuration information of a plurality of first SRBs or a plurality of first DRBs. Configuration information of each first SRB or each first DRB includes at least one of PDCP configuration information corresponding to the first SRB or the first DRB, an identifier of the first SRB or an index of the first SRB, or an identifier of the first DRB or an index of the first DRB. To be specific, configuration information of the plurality of first SRBs or the plurality of first DRBs is sent together. The signaling may further include an index or identifier of the first SL RLC bearer.

Another manner of sending the fourth configuration information at a time is that one piece of signaling includes configuration information of a plurality of first SRBs or a plurality of first DRBs. Configuration information of each first SRB or each first DRB includes at least one of PDCP configuration information corresponding to the first SRB or the first DRB, an identifier of the first SRB or an index of the first SRB, or an identifier of the first DRB or an index of the first DRB. The configuration information of each first SRB or each first DRB may further include an index or identifier of the first SL RLC bearer.

Figure 15:
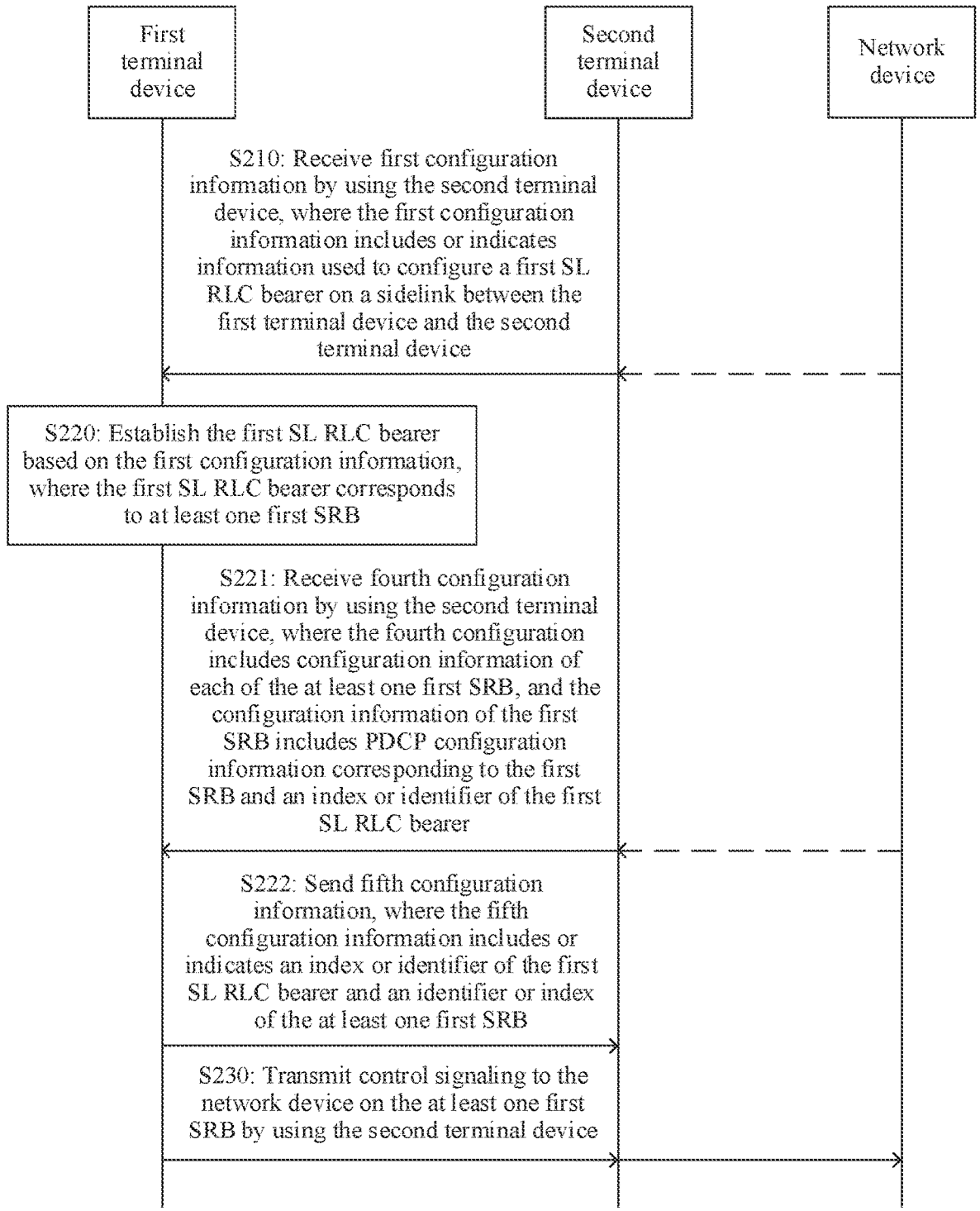
FIG. 15 is a schematic flowchart of still another example of a signaling radio bearer configuration method according to an embodiment of this application.

Optionally, in some possible implementations of this application. FIG. 15 is a schematic flowchart of the signaling radio bearer configuration method according to some embodiments of this application. On the basis of the steps of the method shown in FIG. 14, the method 200 further includes S222.

S222: The first terminal device sends fifth configuration information to the second terminal device, where the fifth configuration information includes or indicates an index or identifier of the first SL RLC bearer and an identifier or index of the at least one first SRB; or the fifth configuration information includes or indicates an index or identifier of the first SL RLC bearer and an identifier or index of the at least one first DRB.

For steps S210, S220, S221, and S230 shown in FIG. 15, refer to the related descriptions of S210. S220. S221, and S230. For brevity, details are not described herein again.

In S222, the first terminal device sends the fifth configuration information to the second terminal device, where the fifth configuration information may be used by the first terminal device to associate the first SL RLC with the at least one first SRB. In other words, when the first SL RLC bearer corresponds to one or more first SRBs, the fifth configuration information is used to notify the second terminal device of a correspondence between the first SL RLC bearer and one or more first SRBs. This ensures that the second terminal device can determine the one or more first SRBs corresponding to the first SL RLC bearer. Therefore, it can be ensured that the second terminal device transmits the control signaling between the first terminal device and the network device on the one or more first SRBs by using the first SL RLC.

Optionally, if the fourth configuration information is sent by the network device to the second terminal device by using first signaling (for example, RRC signaling), the second terminal device receives the signaling, and parses the fourth configuration information. When the fourth configuration information is sent to the first terminal device by using second signaling (for example, RRC reconfiguration signaling) different from the first signaling, the first terminal device may not need to send the fifth configuration information to the second terminal device.

Optionally, when the fourth configuration information is signaling that is sent by the network device and directly forwarded by the second terminal device to the first terminal device, and the second terminal device parses the fourth configuration information, the first terminal device may not need to send the fifth configuration information to the second terminal device.

It should be understood that, a sequence of performing S220 and S221 is not limited in the flowcharts shown in FIG. 14 and FIG. 15. For example, when a plurality of first SRBs correspond to a same SL RLC (the first SL RLC) bearer, in one case, after receiving configuration information of a $1^{st}$ first SRB and the first configuration information, the first terminal device establishes a $1^{st}$ first SRB bearer. The established 1 first SRB bearer includes the first SL RLC bearer. Then, the first terminal device receives configuration information of a $2^{nd}$ first SRB, and establishes a $2^{nd}$ first SRB bearer. The $2^{nd}$ first SRB bearer also corresponds to the first SL RLC bearer. In another case, after receiving configuration information of two first SRBs and the first configuration information, the first terminal device separately establishes two first SRB bearers, where the establishing the first SRB bearer includes establishing the first SL RLC bearer. A sequence of performing S210 and S221 is not limited, either, S210 may be performed before S221, S221 may be performed before S210, or S210 and S221 are performed at the same time.

It should be understood that in embodiments of this application, each piece of configuration information may be sent by using an RRC setup (RRCSetup) message or an RRC reconfiguration (RRCReconfiguration) message, or may be sent by using other signaling. This is not limited in embodiments of this application.

Optionally, in this embodiment of this application, in another possible implementation, the fifth configuration information includes an index or identifier of the first SL RLC bearer and an identifier or index information of the at least one first DRB.

Optionally, in this embodiment of this application, if the first SL RLC bearer corresponds to a plurality of first SRBs, that the first SL RLC bearer corresponds to the plurality of first SRBs may be understood as that the plurality of first SRBs are transmitted by using a same RLC entity and a same logical channel. For example, the first SL RLC bearer corresponds to at least two of a Uu SRB 0, a Uu SRB 1, a Uu SRB 2, or a Uu SRB 3. In this case, because the plurality of different Uu SRBs all correspond to the first SL RLC, control signaling (control-plane data packets) carried by the plurality of different Uu SRBs needs to be distinguished between in this case.

For distinguishing between the control signaling (control-plane data packets) carried by the plurality of different Uu SRBs, a possible implementation is as follows: PDCP layers (PDCP layer entities) in protocol stacks of the remote terminal device and the relay terminal device may add first indication information to packet data convergence protocol data units PDCP PDUs of the plurality of Uu SRBs, for example, one or several reserved bits in a conventional PDCP PDU may be used to indicate or represent the first indication information. The first indication information is used to indicate a Uu SRB to which a PDCP PDU of the plurality of Uu SRBs respectively corresponds (or belongs). In other words, the PDCP entities of the first terminal device and the second terminal device may add the first indication information to the PDCP PDU and parse the first indication information. For example, the first indication information may be specifically included in a PDCP PDU header.

For example, assuming that the first SL RLC bearer corresponds to the Uu SRB 1 and the Uu SRB 2. PDCP PDUs of the Uu SRB 1 and the Uu SRB 2 may separately include indication information, where the indication information in the PDCP PDU of the Uu SRB 1 is used to indicate that the PDCP PDU corresponds to the Uu SRB 1, and the indication information in the PDCP PDU of the Uu SRB 2 is used to indicate that the PDCP PDU corresponds to the Uu SRB 2. In this way, the first terminal device and the second terminal device may distinguish the Uu SRB corresponding to the PDCP PDU is the Uu SRB. This can correctly distinguish between the data packets carried by the different Uu SRBs, and improve data transmission quality and efficiency.

For example, it is assumed that the Uu SRB 1 and the Uu SRB 2 share one SL RLC bearer.

When the remote terminal device needs to transmit the Uu SRB 1 or the Uu SRB 2 to the network device, if the Uu SRB 1 is transmitted, the PDCP entity corresponding to the Uu SRB 1 of the remote terminal device receives an upper-layer SDU, and the PDCP entity adds indication information to a PDCP PDU to indicate the Uu SRB 1; or if the Uu SRB 2 is transmitted, the PDCP entity corresponding to the Uu SRB 2 receives an upper-layer SDU, and the PDCP entity adds indication information to a PDCP PDU to indicate the Uu SRB 2. Then, the PDCP entity corresponding to the Uu SRB 1 or the PDCP entity corresponding to the Uu SRB 2 sends the PDCP PDU to the relay terminal device on the SL RLC bearer corresponding to the Uu SRB 1 and the Uu SRB 2. Specifically, the PDCP entity delivers the PDCP PDU to an RLC entity corresponding to the SL RLC bearer. The RLC entity obtains an RLC PDU after processing, and delivers the RLC PDU to a MAC entity. The MAC entity sends the RLC PDU to the relay terminal device on an SL logical channel corresponding to the SL RLC bearer. The relay terminal device receives, on the SL logical channel, the RLC PDU sent by the remote terminal device, delivers the RLC PDU to the RLC entity corresponding to the SL RLC bearer, and obtains an RLC SDU through processing by the RLC entity; and the relay terminal device sends the RLC SDU to the network device by using the RLC bearer between the relay terminal device and the network device. After receiving the RLC SDU, the network device determines, based on the indication information in the RLC SDU, whether the RLC SDU corresponds to the Uu SRB 1 or the Uu SRB 2. For example, the RLC SDU corresponds to the Uu SRB 1. After determining that the RLC SDU corresponds to the Uu SRB 1, the network device may deliver the RLC SDU to the PDCP entity corresponding to the Uu SRB 1. Alternatively, the network device separately delivers the RLC SDU to the PDCP entity corresponding to the Uu SRB 1 and the PDCP entity corresponding to the Uu SRB 2, and the PDCP entity corresponding to the Uu SRB 1 determines, based on the indication information, that the RLC SDU corresponds to the Uu SRB 1. The PDCP entity corresponding to the Un SRB 2 determines, based on the indication information, that the RLC SDU does not correspond to the Uu SRB 2, and the PDCP entity corresponding to the Uu SRB 2 may discard the RLC SDU.

When the network device needs to transmit the Uu SRB 1 or the Uu SRB 2 to the remote terminal device, if the Uu SRB 1 is transmitted, a PDCP entity corresponding to the Uu SRB 1 of the network device receives an upper-layer SDU, and the PDCP entity adds indication information to a PDCP PDU to indicate the Uu SRB 1; or if the Uu SRB 2 is transmitted, a PDCP entity corresponding to the Uu SRB 2 receives an upper-layer SDU, and the PDCP entity adds indication information to a PDCP PDU to indicate the Uu SRB 2. Then, the PDCP entity corresponding to the Uu SRB 1 or the PDCP entity corresponding to the Uu SRB 2 sends the PDCP PDU to the relay terminal device by using the RLC bearer between the network device and the relay terminal device. After receiving the PDCP PDU, the relay terminal device sends the PDCP PDU to the remote terminal device on the SL RLC bearer corresponding to the Uu SRB 1 and the Uu SRB 2. Specifically, the relay terminal device delivers the PDCP PDU to an RLC entity corresponding to the SL RLC bearer, obtains an RLC PDU through processing by the RLC entity, and delivers the RLC PDU to a MAC entity. The MAC entity sends the RLC PDU to the remote terminal device on the SL logical channel corresponding to the SL RLC bearer. The remote terminal device receives, on the SL logical channel, the RLC PDU sent by the relay terminal device, delivers the RLC PDU to an RLC entity corresponding to the SL RLC bearer, and obtains an RLC SDU through processing by the RLC entity. The remote terminal device determines, based on the indication information in the RLC SDU, whether the RLC SDU corresponds to the Uu SRB 1 or the Uu SRB 2. For example, the RLC SDU corresponds to the Uu SRB 1. After determining that the RLC SDU corresponds to the Uu SRB 1, the remote terminal device may deliver the RLC SDU to the PDCP entity corresponding to the Uu SRB 1. Alternatively, the remote terminal device separately delivers the RLC SDU to the PDCP entity corresponding to the Uu SRB 1 and the PDCP entity corresponding to the Uu SRB 2, and the PDCP entity corresponding to the Uu SRB 1 determines, based on the indication information, that the RLC SDU corresponds to the Uu SRB 1. The PDCP entity corresponding to the Uu SRB 2 determines, based on the indication information, that the RLC SDU does not correspond to the Uu SRB 2, and the PDCP entity corresponding to the Uu SRB 2 may discard the RLC SDU.

For example, the first indication information may be located on one or more bits in a first octet (Oct, octet) included in the PDCP PDU, for example, a second bit and/or a third bit in an Oct 1.

Figure 16:
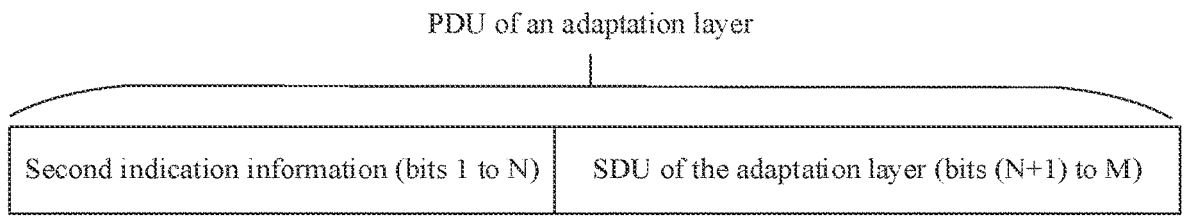
FIG. 16 is a schematic diagram of an example of a structure of a PDU of an adaptation layer according to an embodiment of this application.

For distinguishing between the control signaling (control-plane data packets) carried by the plurality of different Uu SRBs, another possible implementation is as follows: An adaptation (Adaptation) layer may be separately added to the protocol stacks of the first terminal device and the second terminal device. Optionally, the adaptation layer is located between the RLC layer and the PDCP layer. The adaptation layer is used to add second indication information to a PDU of the adaptation layer or parse the second indication information, where the second indication information indicates a Uu SRB corresponding to (or to belonging to) the PDU of the adaptation layer. The PDU of the adaptation layer includes the second indication information and the SDU received by the adaptation layer from a higher layer. For example, FIG. 16 is a schematic diagram of a structure of the PDU of the adaptation layer. As shown in FIG. 16, the PDU of the adaptation layer includes two parts. Bits (bits 1 to N) included in a first part indicate the second indication information, and bits (bits (N+1) to M) included in a second part indicate the SDU of the adaptation layer, where N and M each are a positive integer, and M−N≥1.

For example, it is assumed that the Uu SRB 1 and the Uu SRB 2 share one SL RLC bearer.

When the remote terminal device needs to transmit the Uu SRB 1 or the Uu SRB 2 to the network device, the PDCP entity corresponding to the Uu SRB 1 or the PDCP entity corresponding to the Uu SRB 2 receives the upper-layer SDU, and the PDCP entity processes the SDU and delivers the PDCP PDU to the adaptation layer. If the PDCP PDU is the PDU from the PDCP entity corresponding to the Uu SRB 1, the adaptation layer sets the indication information to indicate the Uu SRB 1; or if the PDCP PDU is the PDU from the PDCP entity corresponding to the Uu SRB 2, the adaptation layer sets the indication information to indicate the Uu SRB 2. The adaptation layer adds the indication information to the SDU received from the upper layer to form the PDU of the adaptation layer. The remote terminal device sends the PDU of the adaptation layer to the relay terminal device on the SL RLC bearer corresponding to the Uu SRB 1 and the Uu SRB 2. The adaptation layer delivers the PDU to the RLC entity corresponding to the SL RLC bearer, the RLC entity obtains the RLC PDU after processing and delivers the RLC PDU to the MAC entity, and the MAC entity sends the RLC PDU to the relay terminal device on the SL logical channel corresponding to the SL RLC bearer. The relay terminal device receives, on the SL logical channel, the RLC PDU sent by the remote terminal device, delivers the RLC PDU to the RLC entity corresponding to the SL RLC bearer, and obtains the RLC SDU through processing by the RLC entity. The relay terminal device sends the RLC SDU to the network device by using the RLC bearer between the relay terminal device and the network device. After receiving the RLC SDU, the network device delivers the RLC SDU to an adaptation layer. The adaptation layer determines, based on the indication information in the PDU, whether the PDU corresponds to the Uu SRB 1 or the Uu SRB 2, and further delivers the SDU at the adaptation layer to the corresponding PDCP entity. The PDCP entity processes the SDU, and delivers a PDCP SDU to an upper layer.

When the network device needs to transmit the Uu SRB 1 or the Uu SRB 2 to the remote terminal device, the PDCP entity corresponding to the Uu SRB 1 or the PDCP entity corresponding to the Uu SRB 2 receives the upper-layer SDU, and the PDCP entity processes the SDU and deliverers the PDCP PDU to the adaptation layer. If the PDCP PDU is the PDU from the PDCP entity corresponding to the Uu SRB 1, the adaptation layer sets the indication information to indicate the Uu SRB 1; or if the PDCP PDU is the PDU from the PDCP entity corresponding to the Uu SRB 2, the adaptation layer sets the indication information to indicate the Uu SRB 2. The adaptation layer adds the indication information to the SDU received from the upper layer to form the PDU of the adaptation layer. The network device sends the PDU of the adaptation layer to the relay terminal device by using the RLC bearer between the network device and the relay terminal device. After receiving the PDU of the adaptation layer, the relay terminal device sends the PDU of the adaptation layer to the remote terminal device on the SL RLC bearer corresponding to the Uu SRB 1 and the Uu SRB 2. Specifically, the relay terminal device delivers the PDU of the adaptation layer to an RLC entity corresponding to the SL RLC bearer, obtains an RLC PDU through processing by the RLC entity, and delivers the RLC PDU to a MAC entity. The MAC entity sends the RLC PDU to the remote terminal device on an SL logical channel corresponding to the SL RLC bearer, and the remote terminal device may receive, on the SL logical channel, the RLC PDU sent by the relay terminal device. The remote terminal device delivers the RLC PDU to the RLC entity corresponding to the SL RLC bearer, obtains an RLC SDU through processing by the RLC entity, and delivers the RLC SDU to an adaptation layer. The adaptation layer determines, based on the indication information in the RLC SDU, whether the RLC SDU corresponds to the Uu SRB 1 or the Uu SRB 2, and the adaptation layer obtains the SDU of the adaptation layer after processing, and then delivers the SDU of the adaptation layer to the corresponding PDCP entity. After processing, the PDCP entity delivers the PDCP SDU to an upper layer.

It should be understood that, because a data packet carried by a Uu SRB 0 does not pass through the PDCP layer, when the Uu SRB 0 and another Uu SRB share one SL RLC bearer, indication information may be added to the data packet at an adaptation layer, where the indication information is used to indicate that the Uu SRB corresponding to (or belonging to) the data packet is which Uu SRB.

It should be understood that, in this embodiment of this application, when the first SL RLC bearer corresponds to a plurality of first SRBs, in addition to the foregoing two manners for distinguishing between the data packets carried by the plurality of different Uu SRBs, the data packets carried by the plurality of different Uu SRBs may be distinguished between in another manner. This is not limited in this embodiment of this application.

When the different Uu SRBs share one SL RLC bearer, a Uu SRB corresponding to a data packet can be accurately distinguished by adding indication information to the data packet. This can improve data packet transmission quality and efficiency.

It should be understood that, in this embodiment of this application, if the first SL RLC bearer corresponds to a plurality of first DRBs, that the first SL RLC bearer corresponds to the plurality of first DRBs may be understood as that the plurality of first DRBs are transmitted by using a same RLC entity on a same logical channel. In this case, because the plurality of different Uu DRBs all correspond to the first SL RLC, user-plane data carried by the plurality of different Uu DRBs needs to be distinguished between. For distinguishing between the user-plane data carried by the plurality of different Uu DRBs, the user-plane data carried by the plurality of different Uu DRBs may also be distinguished between in a similar manner of distinguishing between the control signaling carried by the plurality of different Uu SRBs. For similar descriptions, refer to the foregoing descriptions. For brevity, details are not described herein again.

The following describes, with reference to a specific example, a method for establishing a first SL RLC bearer corresponding to a Uu SRB.

It should be understood that in this application, for sending or receiving of signaling/messages/information, in similar expressions, such as, an RRC reconfiguration (RRCReconfiguration) message, an RRC setup (RRCSetup) message, radio bearer configuration (radioBearerConfig), SL RLC bearer configuration (SL-RLC-BearerConfig), SL RLC configuration (SL-RLC-ConfigPC5), SL logical channel configuration (SL-LogicalChannelConfig), or SL media access control logical channel configuration (sl-MAC-LogicalChannelConfig), content in parentheses indicates an example of an IE of the corresponding signaling/messages/information.

Figure 17:
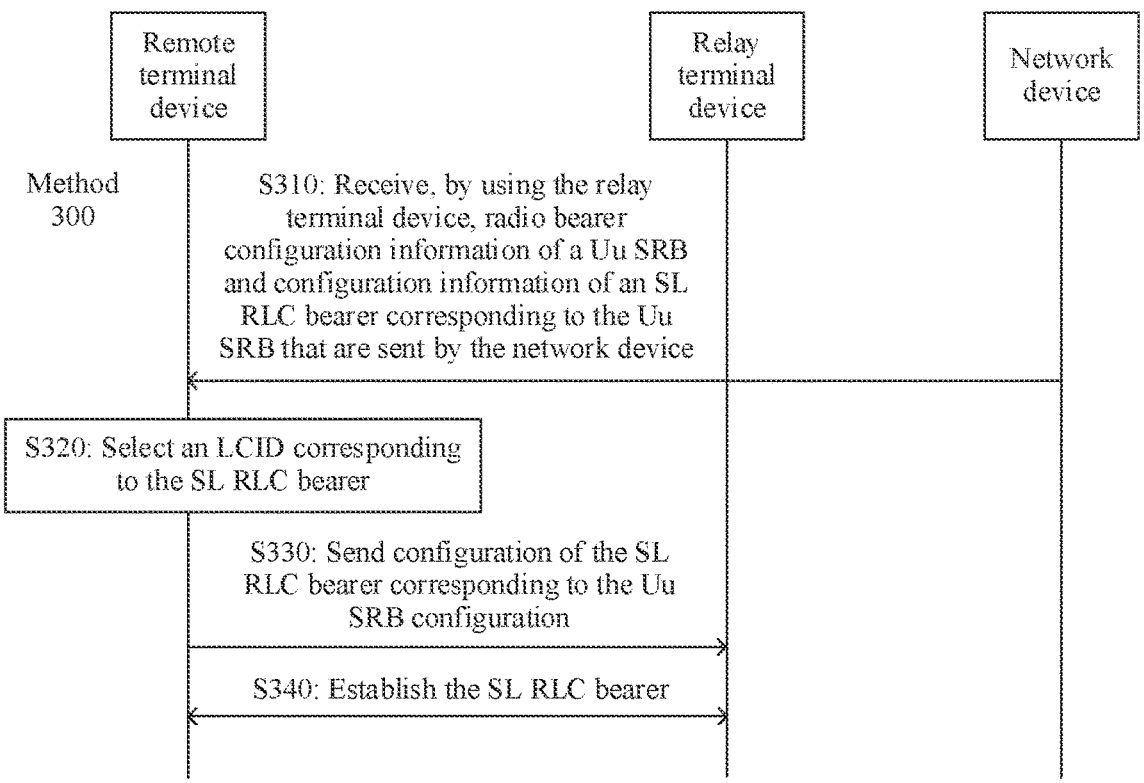
FIG. 17 is a schematic flowchart of another example of a signaling radio bearer configuration method according to an embodiment of this application.

FIG. 17 is a schematic flowchart of a signaling radio bearer configuration method 300 according to some embodiments of this application. The method 300 shown in FIG. 17 may include steps S310 to S340.

S310: A network device sends, to a remote terminal device (namely, a first terminal device) by using a relay terminal device (namely, a second terminal device), configuration (radioBearerConfig) information of a Uu SRB (namely, a first SRB) radio bearer and configuration information of an SL RLC (namely, a first SL RLC) bearer corresponding to the Uu SRB.

Optionally, the network device may send the information by using an RRC message. The RRC message may be an RRC setup (RRCSetup) message or an RRC reconfiguration (RRCReconfiguration) message. It should be understood that the network device may alternatively send, to the remote terminal device by using another signaling and by using the relay terminal device, the radio bearer configuration information of the Uu SRB and the configuration information of the SL RLC bearer corresponding to the Uu SRB. This is not limited herein in this embodiment of this application.

SL RLC bearer configuration (SL-RLC-BearerConfig) may include:

one or more of SL RLC configuration (sl-RLC-Config), sidelink logical channel configuration (SL-LogicalChannel-Config), or sidelink media access control logical channel configuration (sl-MAC-LogicalChannelConfig), where an SL is a sidelink between the remote terminal device and the relay terminal device.

The SL RLC configuration may include an RLC mode and a corresponding parameter. The RLC mode may include an acknowledged mode (acknowledged mode, AM), an unacknowledged mode (unacknowledged mod, UM), and the like. The corresponding parameter may include a length of a sequence number (sequence number, SN) field, a timer (timer) used to retransmit a poll, a maximum quantity of retransmission times, or the like. The sidelink logical channel configuration may include an SL logical channel priority, a prioritized bit rate, or the like.

Optionally, the SL RLC bearer configuration may further include:

one or more of an identifier or index of the SL RLC bearer configuration, an identifier or index of the Uu SRB, or an LCID corresponding to the SL RLC bearer, where the LCID is used to identify a logical channel corresponding to the SL RLC bearer, the index or identifier of the SL RLC bearer may be understood as the index or identifier of the SL RLC bearer configuration, and is used to indicate or identify the SL RLC bearer configuration, and the identifier or index of the Uu SRB may be understood as an index or identifier of the Uu SRB configuration, and is used to indicate or identify Uu SRB configuration.

Optionally, the SL RLC bearer configuration may be directly included in an RRC message, may be included in cell group configuration (CellGroupConfig) in the RRC message, or may be included in radio bearer configuration of the Uu SRB. This is not limited herein in this embodiment of this application.

The radio bearer configuration information of the Uu SRB may include:

one or more of PDCP configuration of the Uu SRB bearer, an index of the Uu SRB radio bearer, or an identifier of the Uu SRB radio bearer.

Optionally, the radio bearer configuration information may further include an identifier or index of the SL RLC bearer corresponding to the Uu SRB radio bearer.

For the step in which the network device sends, to the remote terminal device (namely, the first terminal device) by using the relay terminal device (namely, the second terminal device), the configuration information of the SL RLC (namely, the first SL RLC) bearer corresponding to the Uu SRB, refer to the related descriptions in S210 in which the first terminal device receives the first configuration information by using the second terminal device in the method 200. For the configuration information of the SL RLC bearer, refer to the related descriptions of the first configuration information in S210.

For the step in which the network device sends, to the remote terminal device (namely, the first terminal device) by using the relay terminal device (namely, the second terminal device), the radio bearer configuration (radioBearerConfig) information of the Uu SRB (namely, the first SRB), refer to the related descriptions in S221 in which the first terminal device receives the fourth configuration information by using the second terminal device in the method 200. For the radio bearer configuration information of the Uu SRB, refer to the related descriptions of the fourth configuration information in S221 in the method 200.

S320: The remote terminal device selects the LCID corresponding to the SL RLC bearer. Optionally, the LCID may be determined by the network device, and may be included in the SL RLC bearer configuration received by the remote terminal device in S310. The LCID may be used to identify the SL RLC bearer or used to identify the logical channel corresponding to the SL RLC bearer.

S330: The remote terminal device sends, to the relay terminal device, configuration of the SL RLC bearer corresponding to the Uu SRB. For example, the remote terminal device may send the information to the relay terminal device by using an SL RRC message (an RRC message on a PC5 interface between the remote terminal device and the relay terminal device). Optionally, the SL RRC message may be SL RRC reconfiguration information (RRC ReconfigurationSidelink message).

For the step in which the remote terminal device sends the configuration of the SL RLC bearer corresponding to the Uu SRB to the relay terminal device, refer to the related descriptions in S211 in which the first terminal device sends the second configuration information to the second terminal device in the method 200. For the configuration of the SL RLC bearer, refer to the related descriptions of the second configuration information in S211 in the method 200.

All or some content included in the configuration of the SL RLC bearer in S330 may be determined based on the SL RLC bearer configuration in S310. For example, content included in the configuration of the SL RLC bearer m S330 may be the same as content included in the SL RLC bearer configuration in S310, or is a subset of content included in the SL RLC bearer configuration in S310; or some content included in the configuration of the SL RLC bearer in S330 is the same as some content included in the SL RLC bearer configuration in S310.

For example, the configuration of the SL RLC bearer in S330 may include configuration information (for example, a length of an SN field) of a common (or public) SL RLC bearer of a transmit end and a receive end on the sidelink. The configuration of the SL RLC bearer in S330 may further include configuration information (for example, a timer used to retransmit a poll, and a maximum quantity of retransmission times) of an SL RLC bearer required by the transmit end on the sidelink. The relay terminal device may establish the same SL RLC bearer based on the configuration of the SL RLC bearer.

The remote terminal device may further send an index or identifier of the Uu SRB to the relay terminal device, so that the relay terminal device determines a Uu SRB corresponding to the configuration of the SL RLC bearer. The index or identifier of the Uu SRB may be included in the configuration of the SL RLC bearer, or may not be included in the configuration of the SL RLC bearer.

After S330, the remote terminal device and the relay terminal device obtain the radio bearer configuration information of the Uu SRB and the configuration of the SL RLC bearer corresponding to the Uu SRB. In S340, the relay terminal device and the remote terminal device may establish the SL RLC bearer, where the SL RLC bearer corresponds to at least one Uu SRB. For example, after S330, the relay terminal device may send a reply message to the remote terminal device, where the reply message may be a sidelink RRC configuration complete message (RRCReconfigurationCompleteSidelink). After receiving the message, the remote terminal device establishes the SL RLC bearer. The relay terminal device may establish the SL RLC bearer after S330. Alternatively, the remote terminal device establishes the SL RLC bearer after S330 without waiting for the reply message from the relay terminal device. Alternatively, the remote terminal device establishes the SL RLC bearer before S330. For example, after determining the LCID (after S320), the remote terminal device establishes the SL RLC bearer. Alternatively, the remote terminal device establishes the SL RLC bearer after S310. The Uu SRB is transmitted on the SL RLC bearer. This can improve quality of control signaling transmitted on the Uu SRB, and improve control signaling transmission efficiency.

Figure 18:
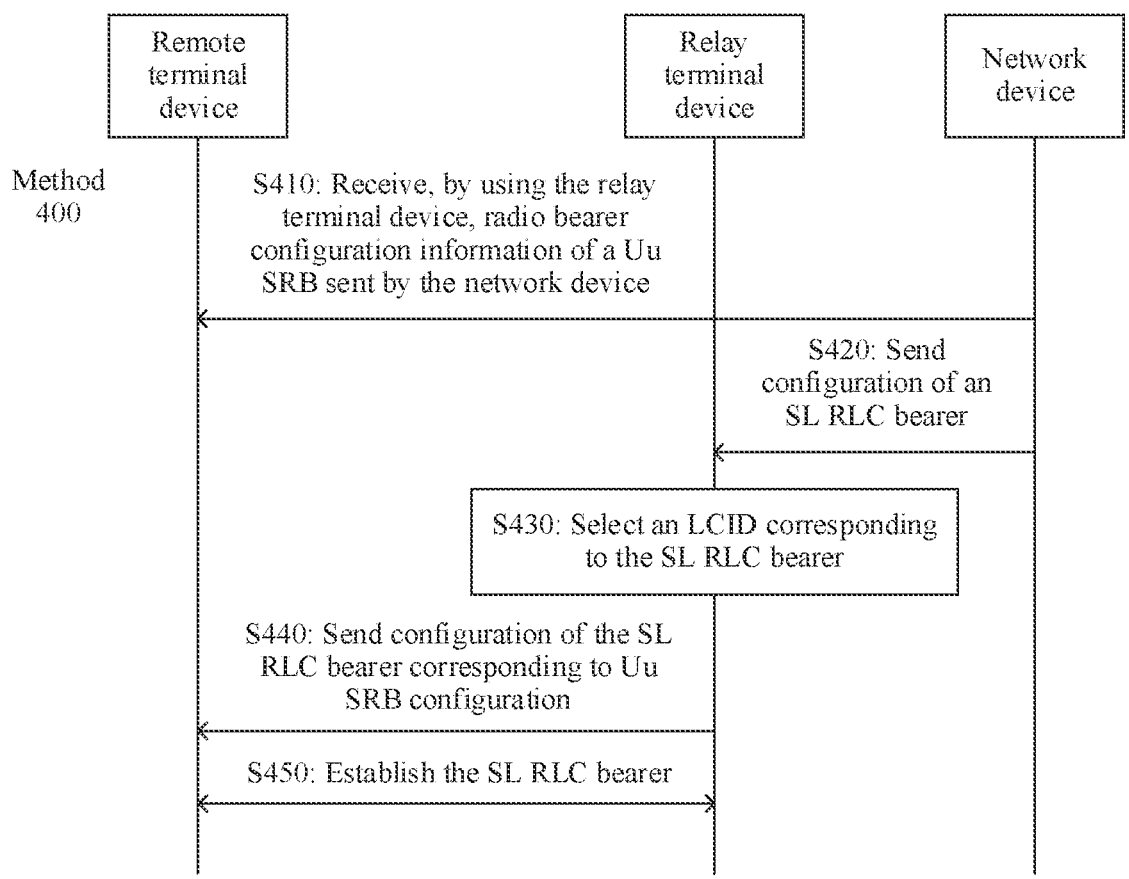
FIG. 18 is a schematic flowchart of still another example of a signaling radio bearer configuration method according to an embodiment of this application.

FIG. 18 is a schematic flowchart of a signaling radio bearer configuration method 400 according to some embodiments of this application. The method 400 shown in FIG. 17 may include steps S410 to S450.

S410: A network device sends radio bearer configuration information of a Uu SRB to a remote terminal device by using a relay terminal device. For example, the network device may send the information by using an RRC message. The RRC message may be an RRC setup (RRCSetup) message or an RRC reconfiguration (RRCReconfiguration) message.

The radio bearer configuration information of the Uu SRB may include:

one or more of PDCP configuration of the Uu SRB radio bearer, an index of the Uu SRB radio bearer, or an identifier of the Uu SRB radio bearer.

Optionally, the radio bearer configuration information of the Uu SRB may further include an identifier or index of the SL RLC bearer corresponding to the Uu SRB radio bearer.

For the step in which the network device sends the radio bearer configuration information of the Uu SRB to the remote terminal device by using the relay terminal device, refer to the related descriptions in S221 in which the first terminal device receives the fourth configuration information by using the second terminal device in the method 200. For the radio bearer configuration information of the Uu SRB, refer to the related descriptions of the fourth configuration information in S221 in the method 200.

S420: The network device sends SL RLC bearer configuration to the relay terminal device. Optionally, the network device may send the SL RLC bearer configuration to the relay terminal device by using an RRC message. The RRC message may be an RRC setup (RRCSetup) message or an RRC reconfiguration (RRCReconfiguration) message.

The SL RLC bearer configuration (SL-RLC-BearerConfig) may include:

one or more of SL RLC configuration (sl-RLC-Config), sidelink logical channel configuration (SL-LogicalChannelConfig), or sidelink media access control logical channel configuration (sl-MAC-LogicalChannelConfig), where an SL is a sidelink between the remote terminal device and the relay terminal device.

The SL RLC configuration may include an RLC mode and a corresponding parameter. The RLC mode may include an AM mode and a UM mode. The corresponding parameter may include a length of an SN field, a timer (timer) used to retransmit a poll, a maximum quantity of retransmission times, or the like. The sidelink logical channel configuration may include an SL logical channel priority, a prioritized bit rate, or the like.

Optionally, the SL RLC bearer configuration may further include:

one or more of an identifier or index of the SL RLC bearer configuration, an identifier or index of the Uu SRB, or an LCID corresponding to the SL RLC bearer, where the LCID is used to identify a logical channel corresponding to the SL RLC bearer, the index or identifier of the RLC bearer may be understood as the index or identifier of the SL RLC bearer configuration, and is used to indicate or identify the SL RLC bearer configuration, and the identifier or index of the Uu SRB may be understood as an index or identifier of the Uu SRB configuration, and is used to indicate or identify Uu SRB configuration.

For S420, refer to the related description of S2101 in the method 200. For configuration information of the SL RLC bearer, refer to the related descriptions of the third configuration information in S2101 in the method 200.

S430: The relay terminal device selects the LCID corresponding to the SL RLC bearer. Optionally, the LCID may also be determined by the network device, and may be included in the SL RLC bearer configuration received by the relay terminal device in S420.

S440: The relay terminal device sends, to the remote terminal device, configuration of the SL RLC bearer corresponding to the Uu SRB. For example, the relay terminal device may send the information to the remote terminal device by using an SL RRC message (an RRC message on a PC5 interface between the relay terminal device and the remote terminal device).

All or some content included in the configuration of the SL RLC bearer in S440 may be determined based on the SL RLC bearer configuration in S420. For example, content included in the configuration of the SL RLC bearer in S440 may be the same as content included in the SL RLC bearer configuration in S420, or is a subset of content included in the SL RLC bearer configuration in S420; or some content included in the configuration of the SL RLC bearer in S440 is the same as some content included in the SL RLC bearer configuration in S420.

For example, the configuration of the SL RLC bearer in S440 may include configuration information (for example, a length of an SN field) of a common (or public) SL RLC bearer of a transmit end and a receive end on the sidelink. The configuration of the SL RLC bearer in S330 may further include configuration information (for example, a tinier used to retransmit a poll, and a maximum quantity of retransmission times) of an SL RLC bearer required by the transmit end on the sidelink. The relay terminal device and the relay terminal device may establish the same SL RLC bearer based on the configuration of the SL RLC bearer.

The relay terminal device may further send an index or identifier of the Uu SRB to the remote terminal device, so that the remote terminal device determines the Uu SRB corresponding to the configuration of the SL RLC bearer. The index or identifier of the Uu SRB may be included in the configuration of the SL RLC bearer, or may not be included in the configuration of the SL RLC bearer.

For the step in which the relay terminal device sends the configuration of the SL RLC bearer corresponding to the Uu SRB to the remote terminal device, refer to the related descriptions of S2102 in which the second terminal device sends the first configuration information to the first terminal device in the method 200. For the configuration information of the SL RLC bearer, refer to the related descriptions of the first configuration information in S2102 in the method 200.

After S440, the remote terminal device and the relay terminal device obtain the radio bearer configuration information of the Uu SRB and the configuration of the SL RLC bearer corresponding to the Uu SRB. In S450, the relay terminal device and the remote terminal device may establish the SL RLC bearer, where the SL RLC bearer corresponds to at least one Uu SRB. For example, the remote terminal device may establish the SL RLC bearer after S440. For the relay terminal device, the remote terminal device may send a reply message to the relay terminal device after S440, where the reply message may be a sidelink RRC configuration complete message (RRCReconfigurationCompleteSidelink); and after receiving the message, the relay terminal device establishes the SL RLC bearer. Alternatively, the relay terminal device establishes the SL RLC bearer after S440 without waiting for the reply message from the remote terminal device. Alternatively, the relay terminal device establishes the SL RLC bearer before S440. For example, after determining the LCID (after S430), the relay terminal device establishes the SL RLC bearer. Alternatively, the relay terminal device establishes the SL RLC bearer after S420. The Uu SRB is transmitted on the SL RLC bearer. This can improve quality of control signaling transmitted on the Uu SRB, and improve control signaling transmission efficiency.

Figure 19:
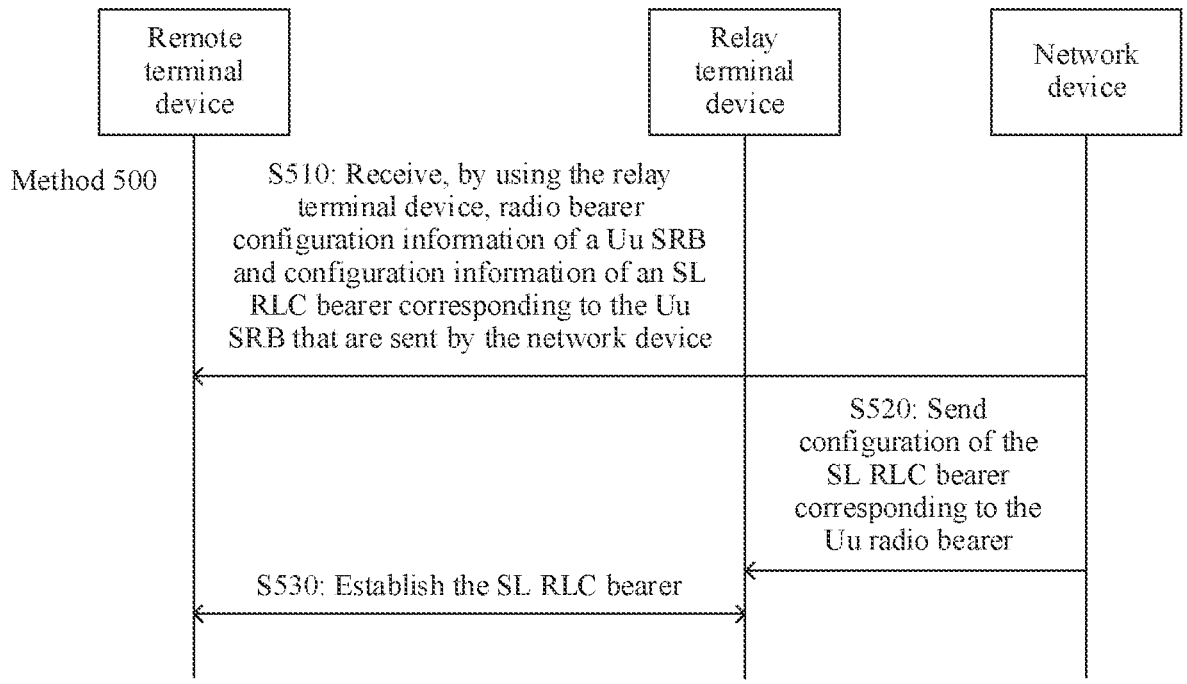
FIG. 19 is a schematic flowchart of still another example of a signaling radio bearer configuration method according to an embodiment of this application.

FIG. 19 is a schematic flowchart of a signaling radio bearer configuration method 500 according to some embodiments of this application. The method 500 shown in FIG. 18 may include steps S510 to S530.

S510: A network device sends, to a remote terminal device by using a relay terminal device, radio bearer configuration (radioBearerConfig) information of a Uu SRB and configuration information of an SL RLC bearer corresponding to the Uu SRB. For example, the network device may send the information by using an RRC message. The RRC message may be an RRC setup (RRCSetup) message or an RRC reconfiguration (RRCReconfiguration) message.

SL RLC bearer configuration (SL-RLC-BearerConfig) may include:

one or more of SL RLC configuration (sl-RLC-Config), sidelink logical channel configuration (SL-LogicalChannelConfig), or sidelink media access control logical channel configuration (sl-MAC-LogicalChannelConfig), where an SL is a sidelink between the remote terminal device and the relay terminal device.

The SL RLC configuration may include an RLC mode and a corresponding parameter. The RLC mode may include an AM mode, a UM mode, and the like. The corresponding parameter may include a length of an SN field, a timer (timer) used to retransmit a poll, a maximum quantity of retransmission times, or the like. The sidelink logical channel configuration may include an SL logical channel priority, a prioritized bit rate, or the like.

Optionally, the SL RLC bearer configuration may further include:

one or more of an identifier or index of the SL RLC bearer configuration, an identifier or index of the Uu SRB, or an LCID corresponding to the SL RLC bearer, where the LCID is used to identify a logical channel corresponding to the SL RLC bearer, the index or identifier of the RLC bearer may be understood as the index or identifier of the SL RLC bearer configuration, and is used to indicate or identify the SL RLC bearer configuration, and the identifier or index of the Uu SRB may be understood as an index or identifier of the Uu SRB configuration, and is used to indicate or identify Uu SRB configuration.

The radio bearer configuration information of the Uu SRB may include:

one or more of PDCP configuration of the Uu SRB radio bearer, an index of the Uu SRB radio bearer, or an identifier of the Uu SRB radio bearer.

Optionally, the radio bearer configuration information of the Uu SRB may further include an identifier or index of the SL RLC bearer corresponding to the Uu SRB radio bearer.

For the step in which the network device sends, to the remote terminal device (namely, the first terminal device) by using the relay terminal device (namely, the second terminal device), the configuration information of the SL RLC (namely, the first SL RLC) bearer corresponding to the Uu SRB, refer to the related descriptions in S210 in which the first terminal device receives the first configuration information by using the second terminal device in the method 200. For the configuration information of the SL RLC bearer, refer to the related descriptions of the first configuration information in S210 in the method 200.

For the step in which the network device sends, to the remote terminal device (namely, the first terminal device) by using the relay terminal device (namely, the second terminal device), the radio bearer configuration (radioBearerConfig) information of the Uu SRB (namely, the first SRB), refer to the related descriptions in S221 in which the first terminal device receives the fourth configuration information by using the second terminal device in the method 200. For the radio bearer configuration information of the Uu SRB, refer to the related descriptions of the fourth configuration information in S221 in the method 200.

S520: The network device sends, to the relay terminal device, the configuration information of the SL RLC bearer corresponding to the Uu SRB. For example, optionally, the network device may send the configuration of the SL RLC bearer to the relay terminal device by using an RRC message. The RRC message may be an RRC setup (RRCSetup) message or an RRC reconfiguration (RRCReconfiguration) message.

All or some content included in the configuration of the SL RLC bearer in S520 may be determined based on the SL RLC bearer configuration in S510. For example, content included in the configuration of the SL RLC bearer in S520 may be the same as content included in the SL RLC bearer configuration in S510, or is a subset of content included in the SL RLC bearer configuration in S510; or some content included in the configuration of the SL RLC bearer in S520 is the same as some content included in the SL RLC bearer configuration in S510.

The network device may further send an index or identifier of the Uu SRB to the relay terminal device, so that the relay terminal device determines the Uu SRB corresponding to the configuration of the SL RLC bearer. The index or identifier of the Uu SRB may be included in the configuration of the SL RLC bearer, or may not be included in the configuration of the SL RLC bearer.

For the step in which the network device sends, to the relay terminal device, the configuration information of the SL RLC bearer corresponding to the Uu SRB, refer to the related descriptions in S2101 in which the network device sends the third configuration information to the second terminal device in the method 200. For the configuration information of the SL RLC bearer, refer to the related descriptions of the third configuration information in S2101 in the method 200.

After S520, the remote terminal device and the relay terminal device obtain the radio bearer configuration information of the Uu SRB and the configuration of the SL RLC bearer corresponding to the Uu SRB. In S530, the relay terminal device and the remote terminal device may establish the SL RLC bearer, where the SL RLC bearer corresponds to at least one Uu SRB. For example, the remote terminal device may establish the SL RLC bearer after receiving the radio bearer configuration (radioBearerConfig) information of the Uu SRB and the configuration information of the SL RLC bearer corresponding to the Uu SRB. Alternatively, the relay terminal device establishes the SL RLC bearer after S520. The Uu SRB is transmitted on the SL RLC bearer. This can improve quality of control signaling transmitted on the Uu SRB, and improve control signaling transmission efficiency. Optionally, in this embodiment of this application, in addition to the foregoing manner of configuring the SL RLC bearer configuration corresponding to the Uu SRB, another configuration procedure may be used to establish the configuration of the SL RLC bearer corresponding to the Uu SRB. This is not limited herein in this embodiment of this application.

Optionally, in some other possible implementations of this application, in configuration of the SL RLC bearer corresponding to the Uu SRB, in a possible case, one type of SL RLC may be separately configured for each Uu SRB, that is, different Uu SRBs correspond to different SL RLC bearers. In another possible case, different Uu SRBs may share one SL RLC bearer, that is, a same SL RLC bearer is configured for different Uu SRBs. For example, at least two Uu SRBs in a Uu SRB 0, a Uu SRB 1, a Uu SRB 2 and a Uu SRB 3 share one SL RLC bearer. In this case, when an SL RLC bearer corresponding to the Uu SRB is reconfigured, configuration information of the SL RLC bearer may include only an identifier or index of the SL RLC bearer configuration, and specific configuration information of the SL RLC bearer configuration does not need to be reconfigured. This can reduce signaling overheads.

For example, it is assumed that radio bearer configuration (radioBearerConfig) of a Uu SRB 1 is configured in the method 300 to the method 500. The Uu SRB 1 and the Uu SRB 2 share one SL RLC bearer. Therefore, when radio bearer configuration (radioBearerConfig) of the Uu SRB 2 and configuration information of the SL RLC bearer corresponding to the Uu SRB 2 are reconfigured in the method 300 to the method 500, corresponding steps in the method 300 to the method 500 may be modified as the following steps:

In the method 300, in S310, the SL RLC bearer configuration (SL-RLC-BearerConfig) may include radio bearer configuration of the Uu SRB 1 and the index or identifier of corresponding SL RLC bearer configuration (radioBearerConfig). In S330, the remote terminal device sends, to the relay terminal device, an index or identifier of the SL RLC bearer configuration corresponding to Uu SRB 2 configuration.

In the method 400, in S410, the SL RLC bearer configuration that the network device sends to the relay terminal device may include an index or identifier of the SL RLC bearer configuration corresponding to Uu SRB 2 configuration. In S440, in the SL RLC bearer configuration corresponding to the Uu SRB 2 configuration sent by the relay terminal device to the remote terminal device, the SL RLC bearer configuration corresponding to the Uu SRB 2 configuration may be the index or identifier of the SL RLC bearer configuration corresponding to the Uu SRB 2 configuration.

In the method 500, in S510, the network device sends, to the remote terminal device, radio bearer configuration information of the Uu SRB 2 and configuration information of the SL RLC bearer corresponding to the Uu SRB 2. The configuration information of the SL RLC bearer corresponding to the Uu SRB 2 may be an index or identifier of SL RLC bearer configuration corresponding to Uu SRB 2 configuration. In S520, the network device sends an identifier or index of the Uu SRB 2 radio bearer and the configuration of the SL RLC bearer corresponding to the Uu SRB 2 radio bearer to the relay terminal device. The configuration of the SL RLC bearer corresponding to the Uu SRB 2 radio bearer may be the index or identifier of the SL RLC bearer configuration corresponding to the Uu SRB 2 configuration.

It should be understood that, in this embodiment of this application, if the first SL RLC bearer corresponds to a plurality of first DRBs, in this case, a specific process of a method in which the remote terminal device and the relay terminal device establish the first SL RLC bearer corresponding to the Uu DRBs is similar to the method for establishing the first SL RLC bearer corresponding to the Uu SRB in the method 300 to the method 500. For similar descriptions, refer to the foregoing descriptions. For brevity, details are not described herein again.

Figure 20:
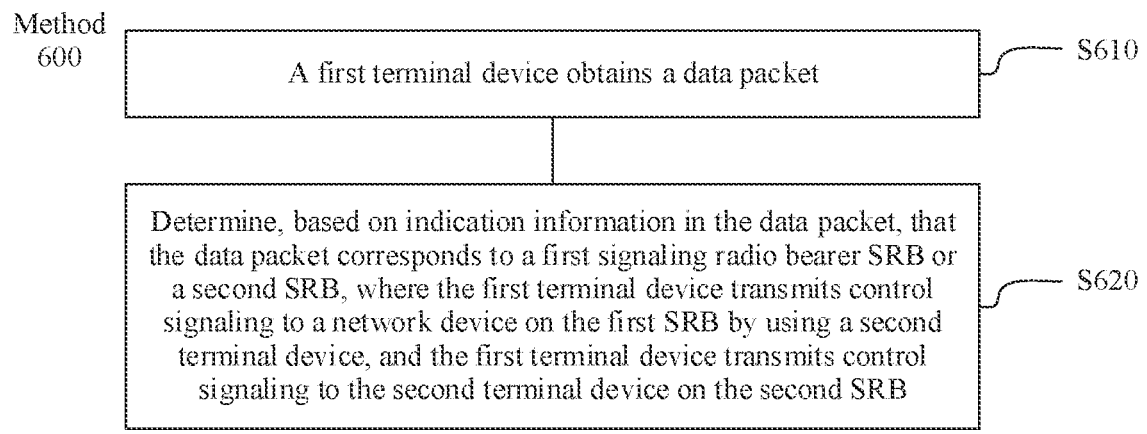
FIG. 20 is a schematic flowchart of an example of a sidelink data packet transmission method according to an embodiment of this application.

FIG. 20 is a schematic flowchart of a sidelink data packet transmission method according to this application. When control-plane data carried by a Uu SRB (a first SRB) and control-plane data carried by an SL SRB (a second SRB) each are transmitted on a sidelink between a first terminal device and a second terminal device, indication information carried in a data packet is used to determine that an SRB corresponding to (or belonging to) the data packet is the SL SRB or the SL SRB, so that a data packet carried by the Uu SRB and a data packet carried by the SL SRB can be distinguished between. This ensures accurate transmission of the data packet, and improves data transmission efficiency and user experience.

The method 600 shown in FIG. 20 may include steps S610 and S620.

S610: The first terminal device obtains the data packet.

In S610, the first terminal device (a remote terminal device) can obtain the data packet, where the data packet may be a control-plane data packet, and the data packet includes control signaling. For example, the data packet may be a PDCP PDU, an SDU, or the like.

The data packet obtained by the first terminal device may include two cases.

In one case, the first terminal device receives the data packet sent by the second terminal device (a relay terminal device), where the data packet may be sent by a network device to the first terminal device by using the second terminal device, that is, the data packet is used to transmit the control signaling between the first terminal device and the network device; or the data packet is generated by the second terminal device and sent to the first terminal device, that is, the data packet is used to transmit the control signaling between the first terminal device and the second terminal device.

In the other case, the first terminal device obtains the data packet that needs to be sent, where the data packet may be a data packet sent by the first terminal device to a network device by using the second terminal device, or the data packet may be a data packet sent by the first terminal device to the second terminal device.

Because the data packet carried by the Uu SRB (namely, the first SRB) and the data packet carried by the SL SRB (namely, the second SRB) each are transmitted on the sidelink between the first terminal device and the second terminal device, the data packet that needs to be sent or received by the first terminal device can include the indication information, where the indication information is used to indicate that the SRB corresponding to (or belonging to) the data packet is the SL SRB or the Uu SRB.

S620: The first terminal device determines, based on the indication information in the data packet, that the data packet corresponds to the first signaling radio bearer SRB or the second SRB, the first terminal device transmits the control signaling to the network device on the first SRB by using the second terminal device, and the first terminal device transmits the control signaling to the second terminal device on the second SRB.

In S620, the first terminal device can determine, based on the indication information in the data packet, that the data packet corresponds to the first SRB or the second SRB. The first terminal device transmits the control signaling to the network device on the first SRB by using the second terminal device, and the first terminal device transmits the control signaling to the second terminal device on the second SRB.

After determining that the data packet corresponds to the first SRB or the second SRB, the first terminal device can correctly receive the data packet, or correctly send the data packet to the second terminal device, or send the data packet to the network device by using the second terminal device.

According to the sidelink data packet transmission method provided in this application, when the data packet carried by the first SRB and the data packet carried by the second SRB each are transmitted on the sidelink between the first terminal device and the second terminal device, the indication information carried in the data packet is parsed, and whether the data packet is the data packet carried by the first SRB or the data packet carried by the second SRB is determined based on the indication information, so that the data packet carried by the first SRB and the data packet carried by the second SRB can be distinguished between. This ensures accurate transmission of the data packet, and improves data transmission efficiency and user experience.

Optionally, in this embodiment of this application, in another possible implementation, because a data packet carried by a Uu DRB (namely, a first DRB) and a data packet carried by an SL DRB each are transmitted on a sidelink between a first terminal device and a second terminal device, the data packet that needs to be sent or received by the first terminal device can include indication information, where the indication information is used to indicate that the data packet corresponds to (or belongs to) the Uu DRB or the SL DRB. In S620, the first terminal device may also determine, based on the indication information in the data packet, that the data packet corresponds to or belongs to the first DRB or a second DRB (namely, the SL DRB), the first terminal device transmits control signaling to a network device on the first DRB by using the second terminal device, and the first terminal device transmits user-plane data with the second terminal device on the second DRB.

Optionally, in this embodiment of this application, in another possible implementation, because a data packet carried by a Uu SRB (namely, a first SRB) and a data packet carried by an SL DRB (namely, a second DRB) each are transmitted on a sidelink between a first terminal device and a second terminal device, the data packet that needs to be sent or received by the first terminal device can include indication information, where the indication information is used to indicate that the data packet corresponds to (or belongs to) the Uu SRB or the SL DRB. In S620, the first terminal device may also determine, based on the indication information in the data packet, that the data packet corresponds to or belongs to the first SRB or the second DRB (namely, the SL DRB), the first terminal device transmits control signaling to a network device on the first SRB by using the second terminal device, and the first terminal device transmits user-plane data with the second terminal device on the second DRB.

It should be understood that the second terminal device also parses the indication information in the obtained data packet, and determines, based on the indication information in the data packet, whether the data packet corresponds to the first SRB or the second SRB. The data packet obtained by the second terminal device may also include two cases.

In one case, the second terminal device receives the data packet sent by the first terminal device (a relay terminal device), where the data packet may be sent by the first terminal device to the network device by using the second terminal device, that is, the data packet is used to transmit the control signaling between the first terminal device and the network device; or the data packet may be sent by the first terminal device to the second terminal device, that is, the data packet is used to transmit the control signaling between the first terminal device and the second terminal device. In this case, the second terminal device can parse the indication information carried in the data packet and determine, based on the indication information, whether the data packet is the data packet carried by the first SRB or the data packet carried by the second SRB.

In the other case, the second terminal device obtains the data packet that needs to be sent, where the data packet may be a data packet sent by the network device to the first terminal device by using the second terminal device, or the data packet may be a data packet sent by the second terminal device to the first terminal device. In this case, the second terminal device may add the indication information to the data packet, to indicate, to the first terminal device, whether the data packet is the data packet carried by the first SRB or the data packet carried by the second SRB, and then send the data packet to the first terminal device, so that the first terminal device parses the indication information in the data packet.

Optionally, in a possible implementation of this application, a first SL RLC bearer is different from a second SL RLC bearer on the sidelink, and the second SL RLC bearer corresponds to a second SRB. That is, the first SRB and the second SRB correspond to different SL RLC bearers.

Optionally, in another possible implementation, the first SL RLC bearer is the same as a second SL RLC bearer on the sidelink, and the second SL RLC bearer corresponds to the second SRB. That is, the first SRB and the second SRB each correspond to the same SL RLC bearer on the sidelink between the first terminal device and the second device, and the first SRB and the second SRB may share the same SL RLC bearer.

Optionally, in still another possible implementation of this application, the first SL RLC bearer is the same as a second SL RLC bearer on the sidelink, and the second SL RLC bearer corresponds to the second DRB. That is, the first SRB and the second DRB each correspond to the same SL RLC bearer on the sidelink between the first terminal device and the second device, the first SRB and the second DRB may share the same SL RLC bearer, and the second DRB may be understood as the SL DRB.

Optionally, in still another possible implementation of this application, the SL RLC bearer may further correspond to a first DRB and a second DRB. The second DRB may be understood as an SL DRB, and the SL DRB is used to transmit user-plane data between the first terminal device and the second terminal device. The first DRB may be understood as a Uu DRB, and the Uu DRB is configured to transmit user-plane data between the first terminal device and the network device.

Optionally, in still another possible implementation of this application, the SL RLC bearer may further correspond to a first DRB and a second SRB. The first DRB may be understood as a Uu DRB, and the Uu DRB is configured to transmit user-plane data between the first terminal device and the network device.

In other words, in this embodiment of this application, the SL RLC bearer corresponds to the first SRB and the second SRB (the first SRB and the second SRB share the same SL RLC bearer); the SL RLC bearer corresponds to the first SRB and the second DRB (the first SRB and the second DRB share the same SL RLC bearer); the SL RLC bearer corresponds to the first DRB and the second DRB (the first DRB and the second DRB share the same SL RLC bearer); or the SL RLC bearer corresponds to the first DRB and the second SRB (the first DRB and the second SRB share the same SL RLC bearer).

Figure 21:
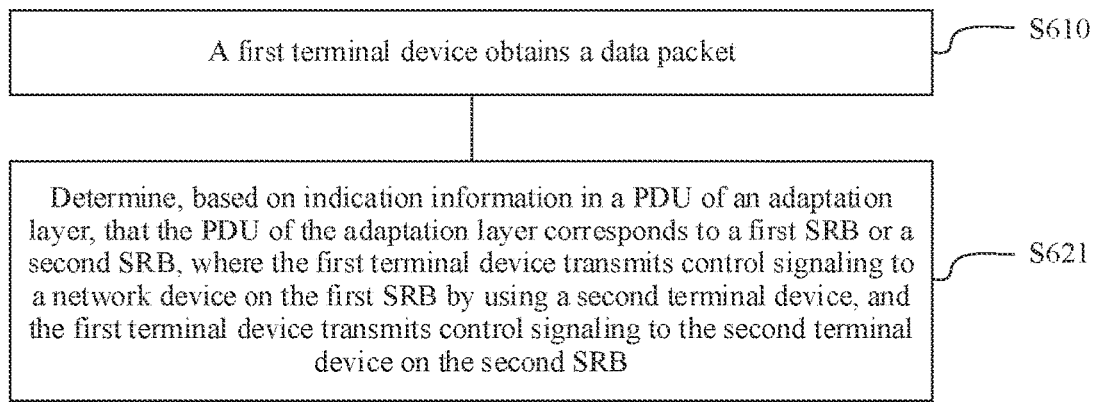
FIG. 21 is a schematic flowchart of another example of a sidelink data packet transmission method according to an embodiment of this application.

In some possible implementations of this application, protocol stacks of the first terminal device and the second terminal device may include an adaptation (Adaptation) layer, and the adaptation layer is located between an RLC layer and a PDCP layer. The adaptation layer is used to add indication information to a PDU of the adaptation layer or parse the indication information, where the indication information indicates a first SRB or a second SRB corresponding to (or belonging to) the PDU of the adaptation layer, and the PDU of the adaptation layer includes the indication information and an SDU received by the adaptation layer from a higher layer. For example, a structure of the adaptation layer PDU may be shown in FIG. 16. FIG. 21 is a schematic flowchart of the sidelink data packet transmission method according to some embodiments of this application. The step S620 in the method shown in FIG. 20 may include S621.

S621: The terminal device determines, based on the indication information in the protocol data unit PDU of the adaptation layer, that the PDU of the adaptation layer corresponds to the first SRB or the second SRB.

For step S620 shown in FIG. 21, refer to the related descriptions of S620. For brevity, details are not described herein again.

Figure 22:
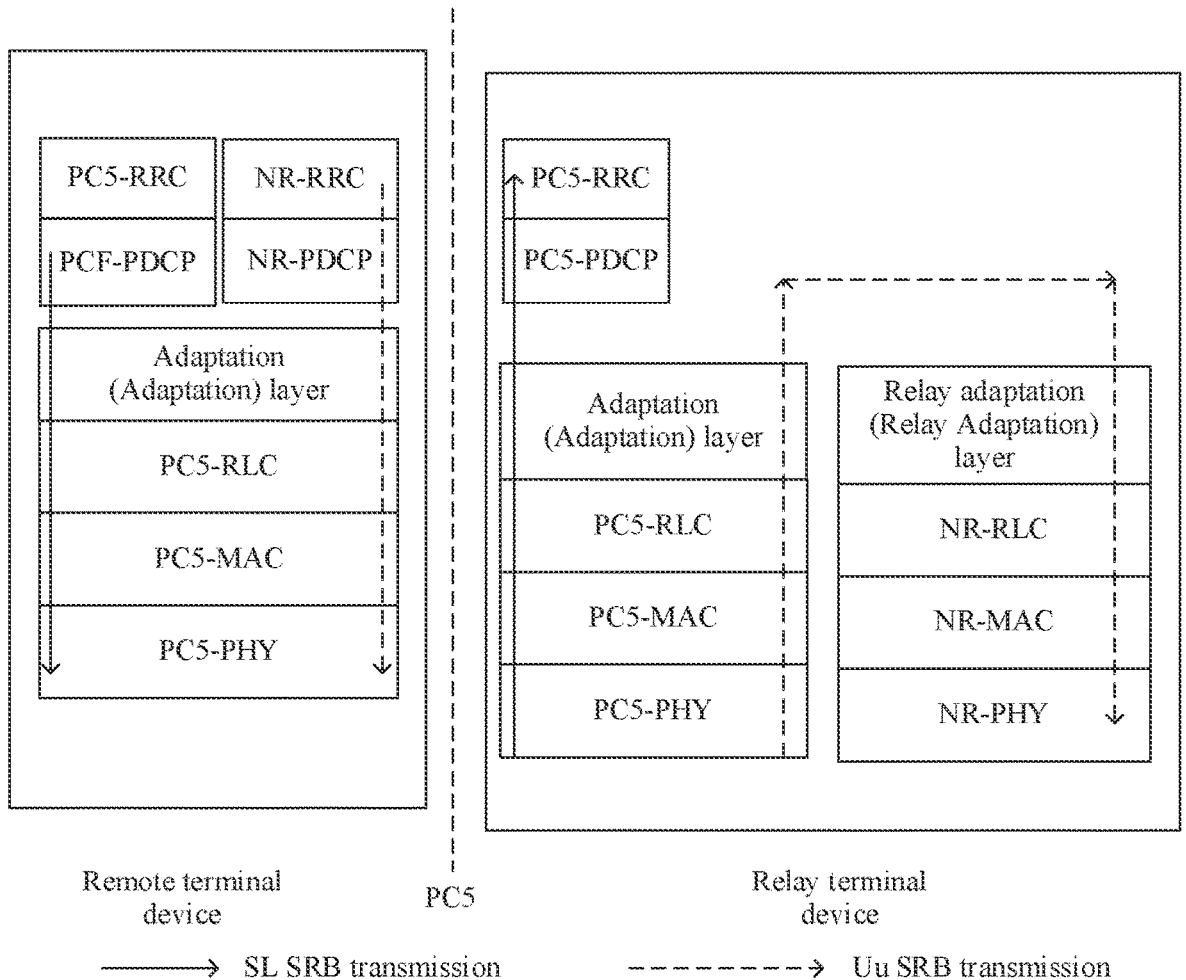
FIG. 22 is a schematic diagram of a structure of a protocol stack including an adaptation layer according to an embodiment of this application.

In S621, for example, when the Uu SRB (namely, the first SRB) and the SL SRB (namely, the second SRB) correspond to the same SL RLC bearer, the adaptation (Adaptation) layer may be separately added to the protocol stacks of the remote terminal device (namely, the first terminal device) and the relay terminal device (namely, the second terminal device). The adaptation layer (an entity corresponding to the adaptation layer) is used to add the indication information to the data packet (for example, a PDCP PDU or an RLC SDU) or parse the indication information, where the indication information is used to indicate whether the data packet corresponds to (or belongs to) the Uu SRB or the SL SRB. As shown in FIG. 22, the adaptation layer may be located between the RLC layer and the PDCP layer. In FIG. 22, solid arrows are used to indicate SL SRB transmission, and dashed arrows are used to indicate Uu SRB transmission.

Optionally, the remote terminal device and the relay terminal device may also determine, based on the indication information in the protocol data unit PDU of the adaptation layer, that the PDU of the adaptation layer corresponds to the first SRB or the second DRB.

Optionally, the remote terminal device and the relay terminal device may also determine, based on the indication information in the protocol data unit PDU of the adaptation layer, that the PDU of the adaptation layer corresponds to the first DRB or the second DRB.

A possible implementation is as follows: When the Uu SRB and the SL SRB use the same SL RLC bearer, for example, a Uu SRB 1 and one SL SRB 1 share one SL RLC bearer, and a Uu SRB 2 and one SL SRB 2 share another SL RLC bearer, the adaptation layer may add the indication information to the data packet, where a length of the indication information may be 1 bit, and the indication information is used to indicate whether the data packet corresponds to the Uu SRB or the SL SRB. For example, if a value of a bit of the indication information is set to 1, it indicates that the data packet corresponds to the Uu SRB. After receiving the data packet, the relay terminal device parses the indication information, and determines that the data packet needs to be sent to the network device.

For example, it is assumed that a Uu SRB 1 and an SL SRB share one SL RLC bearer.

When the remote terminal device needs to transmit the Uu SRB 1 to the network device, or the remote terminal device needs to transmit the SL SRB to the relay terminal device, a PDCP entity corresponding to the Uu SRB 1 or a PDCP entity corresponding to the SL SRB receives an upper-layer SDU. The PDCP entity delivers a PDCP PDU to an adaptation layer after processing. If the PDCP PDU is a PDU from the PDCP entity corresponding to the Uu SRB 1, the adaptation layer sets indication information to indicate the Uu SRB 1; or if the PDCP PDU is the PDU from the PDCP entity corresponding to the SL SRB, the adaptation layer sets indication information to indicate the SL SRB. To be specific, the adaptation layer adds the indication information to the SDU received from the upper layer to form the PDU of the adaptation layer. The remote terminal device sends the PDU of the adaptation layer to the relay terminal device on the SL RLC bearer corresponding to the Uu SRB 1 and the SL SRB. For example, the adaptation layer of the remote terminal device delivers the PDU to an RLC entity corresponding to the SL RLC bearer. The RLC entity obtains an RLC PDU after processing and delivers the RLC PDU to a MAC entity. The MAC entity sends the RLC PDU to the relay terminal device on an SL logical channel corresponding to the SL RLC bearer. The relay terminal device receives, on the SL logical channel, the RLC PDU sent by the remote terminal device, delivers the RLC PDU to an RLC entity corresponding to the SL RLC bearer, obtains an RLC SDU through processing by the RLC entity, and delivers the RLC SDU to an adaptation layer. The adaptation layer determines, based on the indication information in the PDU, whether the PDU corresponds to the Uu SRB 1 or the SL SRB. If the PDU corresponds to the Uu SRB 1, the relay terminal device sends the SDU of the adaptation layer to the network device by using the RLC bearer between the relay terminal device and the network device. If the PDU corresponds to the SL SRB, the relay terminal device delivers the SDU of the adaptation layer to a PDCP entity corresponding to the SL SRB. This can distinguish between data packets corresponding to different SRBs.

When the network device needs to transmit a Uu SRB 1 to the remote terminal device, or the relay terminal device needs to transmit an SL SRB to the remote terminal device, a PDCP entity corresponding to the Uu SRB 1 of the network device receives an upper-layer SDU, and after processing, the PDCP entity sends a PDCP PDU to the relay terminal device by using an RLC bearer between the network device and the relay terminal device. After receiving the PDCP PDU, the relay terminal device delivers the PDCP PDU to an adaptation layer. The adaptation layer sets indication information to indicate the Uu SRB 1, and adds the indication information to the PDCP PDU to form a PDU of the adaptation layer. If the SL SRB is transmitted, a PDCP entity corresponding to the SL SRB of the relay terminal device receives an upper-layer SDU, and delivers a PDCP PDU to an adaptation layer after processing of the PDCP entity. The adaptation layer sets indication information to indicate the SL SRB, and adds the indication information to the PDCP PDU to form a PDU of the adaptation layer. The relay terminal device sends the PDU of the adaptation layer to the remote terminal device on an SL RLC bearer corresponding to the Uu SRB 1 and the SL SRB. Specifically, the relay terminal device delivers the PDU of the adaptation layer to an RLC entity corresponding to the SL RLC bearer, obtains an RLC PDU through processing by the RLC entity, and delivers the RLC PDU to a MAC entity. The MAC entity sends the RLC PDU to the remote terminal device on an SL logical channel corresponding to the SL RLC bearer, and the remote terminal device may receive, on the SL logical channel, the RLC PDU sent by the relay terminal device. The remote terminal device delivers the RLC PDU to the RLC entity corresponding to the SL RLC bearer, obtains an RLC SDU through processing by the RLC entity, and delivers the RLC SDU to an adaptation layer. The adaptation layer determines, based on the indication information in the RLC SDU, whether the RLC SDU corresponds to the Uu SRB 1 or the SL SRB, and the adaptation layer obtains the SDU of the adaptation layer after processing, and then delivers the SDU of the adaptation layer to the corresponding PDCP entity. After processing, the PDCP entity delivers the PDCP SDU to an upper layer.

Another possible implementation is as follows: When a plurality of different Uu SRBs and one SL SRB use a same SL RLC bearer, for example, a Uu SRB 1, a Uu SRB 2, and one SL SRB 1 share one SL RLC bearer, or a Uu SRB 0, a Uu SRB 2, a Uu SRB 3, and one SL SRB 1 share one SL RLC bearer, in this case, a length of the indication information added by the adaptation layer to the data packet (for example, a PDCP PDU or an RLC SDU) may be greater than or equal to 2 bits. The indication information may be used to indicate whether the data packet corresponds to the Uu SRB or the SL SRB, and when it is used to indicate that the data packet corresponds to the Uu SRB, further indicate a Uu SRB to which the data packet corresponds. In other words, the indication information may indicate an SRB in the plurality of Uu SRBs and one SL SRB is the SRB corresponding to the data packet.

For example, assuming that the Uu SRB 1, the Uu SRB 2, and an SL SRB 1 share one SL RLC bearer, the adaptation layer may add 2-bit indication information to the data packet, and may predefine or configure correspondences between different SRBs and different values of indication information, for example, a 2-bit indicator bit "00" is used to indicate that the data packet corresponds to the SL SRB, a 2-bit indicator bit "10" is used to indicate that the data packet corresponds to the Uu SRB 1, and a 2-bit indicator bit "11" is used to indicate that the data packet corresponds to the Uu SRB 2. Alternatively, in the foregoing example, a first bit in the 2-bit indicator bit is used to indicate whether the data packet corresponds to an SL SRB or a Uu SRB. When it is determined that the first bit indicates that the data packet corresponds to the Uu SRB, a second bit is further read, and the second bit is used to indicate whether the Uu SRB is the Uu SRB 1 or the Uu SRB 2.

It should be understood that, in this embodiment of this application, the indication information may be defining some bits (for example, conventional reserved bits) included in the data packet to indicate the SRB corresponding to the data packet. This is not limited herein in this embodiment of this application.

It should be further understood that, when the plurality of different Uu SRBs and one SL SRB use the same SL RLC bearer, and when one Uu SRB and one SL SRB use the same SL RLC bearer, indication information separately included in data packets may be different in the two cases. For example, the indication information in the two cases may be respectively located in different fields in the data packets, and may have different lengths.

In some other possible implementations of this application, in addition to the foregoing manner of adding the adaptation layer to the protocol stacks of the remote terminal device and the relay terminal device, the remote terminal device and the relay terminal device may use one or more bits in the data packet (for example, the PDCP PDU or the RLC SDU) to indicate whether the data packet corresponds to (or belongs to) the Uu SRB or the SL SRB, without adding the adaptation layer. For example, the PDCP layer entities of the remote terminal device and the relay terminal device each may use one or more bits in a header (header) of the PDCP PDU as indication information to indicate whether the data packet corresponds to the Uu SRB or the SL SRB, or parse the indication information. It should be understood that, because the data packet carried by the Uu SRB 0 does not pass through the PDCP layer, an RLC bearer different from that of the SL SRB may be configured for the Uu SRB 0.

Figure 23:
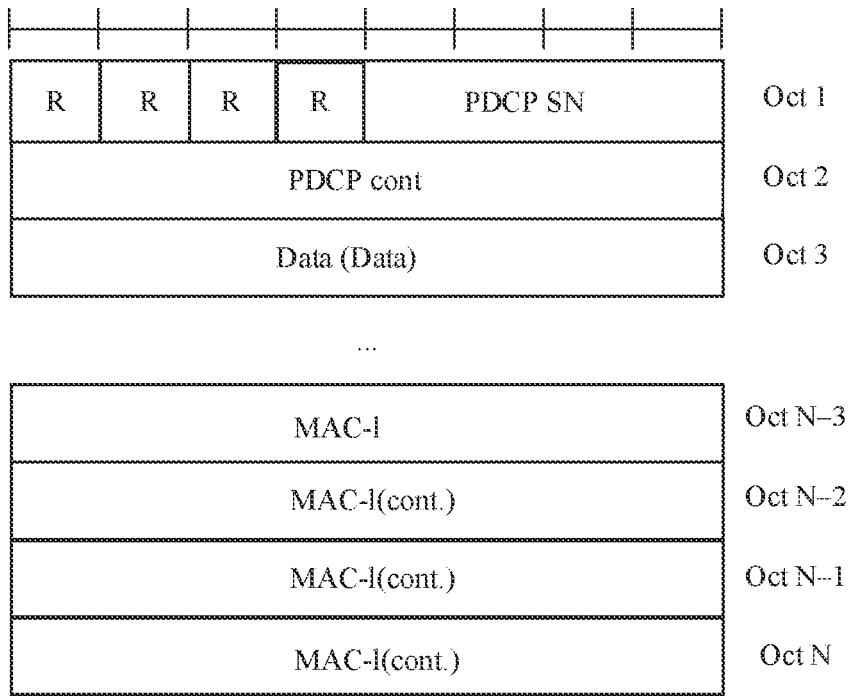
FIG. 23 is a schematic diagram of a format of a PDCP PDU carried by a Uu SRB according to an embodiment of this application.
Figure 24:
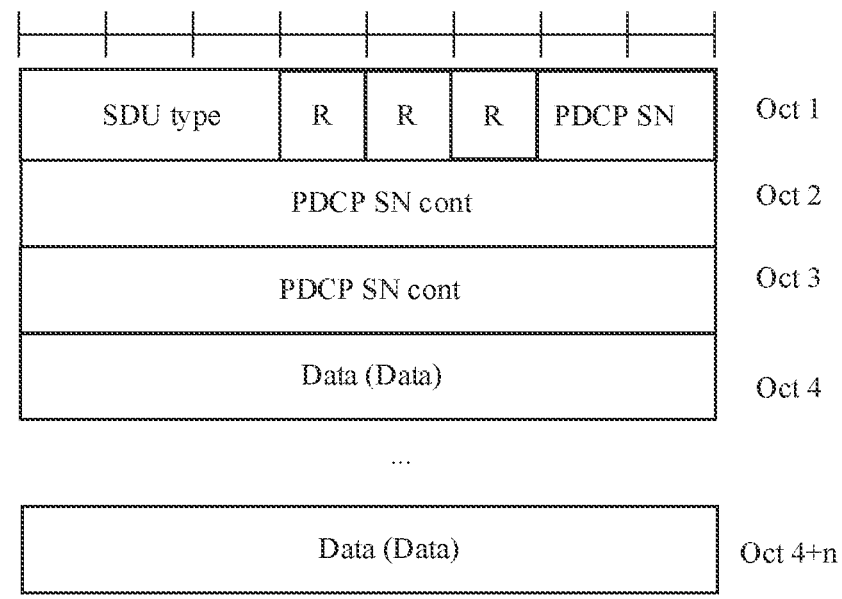
FIG. 24 is a schematic diagram of a format of a PDU carried by an SL SRB according to an embodiment of this application.

FIG. 23 is a schematic diagram of a format of a PDCP PDU carried by the Uu SRB in the conventional technology. FIG. 24 is a schematic diagram of a format of a PDU carried by the SL SRB in the conventional technology. In FIG. 23 and FIG. 24, R represents a reserved bit, and an octet (Oct, octet) in the figure indicates a byte (byte) formed by 8 bits (bits). In the formats of the two PDUs, a fourth bit in Oct 1 is R. Therefore, the fourth bit in Oct 1 may be used to indicate whether the PDU corresponds to the Uu SRB or the SL SRB.

A possible implementation is as follows: When the Uu SRB and the SL SRB use a same SL RLC bearer, a PDCP layer may use the fourth bit in Oct 1 to indicate whether a data packet corresponds to the Uu SRB or the SL SRB, and correspondences between different values of the indication information and the Uu SRB and between different values of the indication information and the SL SRB may be predefined or preconfigured. For example, if a value of the fourth bit in Oct 1 is 1, it indicates that the data packet corresponds to the Uu SRB; or when a value of the fourth bit in Oct 1 is 0, it indicates that the data packet corresponds to the SL SRB.

For example, it is assumed that a Uu SRB 1 and an SL SRB share one SL RLC bearer:

When the remote terminal device needs to transmit the Uu SRB 1 to the network device, or the remote terminal device needs to transmit the SL SRB to the relay terminal device, if the Uu SRB 1 is transmitted, a PDCP entity corresponding to the Uu SRB 1 of the remote terminal device receives an upper-layer SDU. The PDCP entity sets indication information in a PDCP PDU to indicate the Uu SRB 1. If the SL SRB is transmitted, a PDCP entity corresponding to the SL SRB receives an upper-layer SDU, and the PDCP entity sets indication information in a PDCP PDU to indicate the SL SRB. Then, the PDCP entity corresponding to the Uu SRB 1 or the PDCP entity corresponding to the SL SRB sends the PDCP PDU to the relay terminal device on the SL RLC bearer corresponding to the Uu SRB 1 and the SL SRB. Specifically, the PDCP entity delivers the PDCP PDU to an RLC entity corresponding to the SL RLC bearer. The RLC entity obtains an RLC PDU after processing, and delivers the RLC PDU to a MAC entity. The MAC entity sends the RLC PDU to the relay terminal device on an SL logical channel corresponding to the SL RLC bearer. The relay terminal device receives, on the SL logical channel, the RLC PDU sent by the remote terminal device, delivers the RLC PDU to an RLC entity corresponding to the SL RLC bearer, obtains an RLC SDU through processing by the RLC entity. When determining, based on the indication information (for example, the fourth bit m Oct 1) in the RLC SDU, that the indication information indicates the Uu SRB, the relay terminal device sends the RLC SDU to the network device, or when the indication information indicates the SL SRB, the relay terminal device delivers the RLC SDU to a PDCP entity corresponding to the SL SRB. Alternatively, the RLC entity delivers the RLC SDU to a PDCP entity corresponding to the SL SRB. The PDCP entity corresponding to the SL SRB determines, based on the indication information in the RLC SDU, whether the indication information indicates the SL SRB; and if the indication information does not indicate the SL SRB, discards the RLC SDU; or if the indication information indicates the SL SRB, processes the RLC SDU. The relay terminal device further sends the RLC SDU to the network device. The PDCP entity corresponding to the Uu SRB of the network device determines, based on the indication information in the RLC SDU, whether the indication information indicates the Uu SRB; and if the indication information does not indicate the Uu SRB, discards the RLC SDU; or if the indication information indicates the Uu SRB, processes the RLC SDU.

When the network device needs to transmit a Uu SRB 1 to the remote terminal device, a PDCP entity corresponding to the Uu SRB 1 of the network device receives an upper-layer SDU, and the PDCP entity sets indication information in a PDCP PDU to indicate the Uu SRB 1. Then, the network device sends the PDCP PDU to the relay terminal device by using an RLC bearer between the network device and the relay terminal device. When the relay terminal device needs to send an SL SRB to the remote terminal device, a PDCP entity corresponding to the SL SRB of the relay terminal device receives an upper-layer SDU, and the PDCP entity sets indication information in a PDCP PDU to indicate the SL SRB. The relay terminal device sends the PDCP PDU to the remote terminal device on the SL RLC bearers corresponding to the Uu SRB 1 and the SL SRB. Specifically, the relay terminal device delivers the PDCP PDU to an RLC entity corresponding to the SL RLC bearer, obtains an RLC PDU through processing by the RLC entity, and delivers the RLC PDU to a MAC entity. The MAC entity sends the RLC PDU to the remote terminal device on the SL logical channel corresponding to the SL RLC bearer. The remote terminal device receives, on the SL logical channel, the RLC PDU sent by the relay terminal device, delivers the RLC PDU to an RLC entity corresponding to the SL RLC bearer, and obtains an RLC SDU through processing by the RLC entity. The remote terminal device determines, based on the indication information in the RLC SDU, whether the RLC SDU corresponds to the Uu SRB 1 or the SL SRB. For example, the RLC SDU corresponds to the Uu SRB 1. After determining that the RLC SDU corresponds to the Uu SRB 1, the remote terminal device may deliver the RLC SDU to the PDCP entity corresponding to the Uu SRB 1. Alternatively, the remote terminal device separately delivers the RLC SDU to the PDCP entity corresponding to the Uu SRB 1 and the PDCP entity corresponding to the SL SRB. The PDCP entity corresponding to the Uu SRB 1 determines, based on the indication information, that the RLC SDU corresponds to the Uu SRB 1. The PDCP entity corresponding to the SL SRB determines, based on the indication information, that the RLC SDU does not correspond to the Uu SRB 1, and the PDCP entity corresponding to the SL SRB may discard the RLC SDU.

Another possible implementation is as follows: When a plurality of different Uu SRBs and one SL SRB use a same SL RLC bearer, for example, a Uu SRB 1, a Uu SRB 2, and one SL SRB 1 share one SL RLC bearer, in this case, the indication information may have a length of a plurality of bits, and is used to indicate whether the data packet corresponds to a Uu SRB or an SL SRB, and indicate a specific Uu SRB. Alternatively, correspondences between different SRBs and different values of the indication information may be predefined or configured.

For example, when the Uu SRB 1, the Uu SRB 2, and the SL SRB 1 share the SL RLC bearer, a fourth bit and a third bit in Oct 1 may be jointly used as the indication information. For example, a 2-bit indicator bit "00" is used to indicate that the data packet corresponds to the SL SRB, a 2-bit indicator bit "01" is used to indicate that the data packet corresponds to the Uu SRB 1, and a 2-bit indicator bit "10" is used to indicate that the data packet corresponds to the Uu SRB 2.

A protocol layer (for example, the PDCP entity corresponding to the PDCP layer) existing in the protocol stacks of the remote terminal device and the relay terminal device sets one or more bits in the data packet to indicate whether the data packet corresponds to the Uu SRB or the SL SRB, or further indicate the specific Uu SRB, without adding a new protocol layer. This is easy to implement, has low complexity, and can further improve utilization of a logical channel resource.

That the first SRB and the second SRB correspond to the same SL RLC bearer may be predefined. For example, that the first SRB and the second SRB correspond to the same SL RLC bearer/a same LCID is defined in a standard protocol. For example, that a Uu SRB 0 and an SL SRB 0 correspond to a same SL RLC bearer/a same LCID, or a Uu SRB 1 and an SL SRB 1 correspond to a same SL RLC bearer/a same LCID, or a Uu SRB 2 and an SL SRB 2 correspond to a same SL RLC bearer/a same LCID is defined. Alternatively, it is stipulated in the standard protocol that the first SRB corresponds to a first SL RLC bearer/a first LCID, and it is stipulated that the second SRB also corresponds to the first SL RLC bearer/the first LCID. For example, it is stipulated that a Uu SRB 0 corresponds to a first SL RLC bearer/a first LCID, and it is stipulated that an SL SRB 0 also corresponds to the first SL RLC bearer/the first LCID.

Alternatively, a network may configure that the first SRB and the second SRB correspond to the same SL RLC bearer. The network configures that the first SRB and the second SRB correspond to the same SL RLC bearer/a same LCID. For example, configuration information of the first SRB includes identifier or index of the second SRB. Alternatively, the network configures that the first SRB corresponds to a first SL RLC bearer/a first LCID, and configures that the second SRB also corresponds to the first SL RLC bearer/the first LCID. The method in embodiments of this application may be used in a method in which the network configures the first SL RLC bearer and the first SRB.

The SRB or DRB transmitted between the first terminal device and the network device is further transmitted by using the RLC bearer between the second terminal device and the network device. The network device may configure a correspondence or a mapping relationship or an association relationship between the SRB or DRB and the RLC bearer. For example, the network device sends information to the second terminal device, where the information includes or indicates an identifier or index of the first SRB and an identifier or index of the corresponding RLC bearer between the second terminal device and the network device; or the network device sends information to the second terminal device, where the information includes or indicates an identifier or index of the first SRB and an identifier of the corresponding logical channel between the second terminal device and the network device.

The network device may further configure a correspondence or a mapping relationship or an association relationship between the RLC bearer (the first SL RLC bearer) that is between the first terminal device and the second terminal device and that corresponds to the SRB or the DRB, and the RLC bearer between the second terminal device and the network device. For example, the network device sends information to the second terminal device, where the information includes or indicates an identifier or index of the first SL RLC bearer and an identifier or index of the corresponding RLC bearer between the second terminal device and the network device; the network device sends information to the second terminal device, where the information includes or indicates an identifier or index of the first SL RLC bearer and a corresponding logical channel identity between the second terminal device and the network device; the network device sends information to the second terminal device, where the information includes or indicates a logical channel identity corresponding to the first SL RLC bearer and an identifier or index of the corresponding RLC bearer between the second terminal device and the network device; or the network device sends information to the second terminal device, where the information includes or indicates a logical channel identity corresponding to the first SL RLC bearer and an identity of a corresponding logical channel between the second terminal device and the network device.

It should be further understood that the foregoing descriptions are merely intended to help a person skilled in the art better understand embodiments of this application, but are not intended to limit the scope of embodiments of this application. It is apparent that a person skilled in the art may make various equivalent modifications or changes according to the examples provided above. For example, some steps in embodiments in the method 200 to the method 600 may be unnecessary, or some steps may be newly added. Alternatively, any two or more of the foregoing embodiments are combined. A modified, changed, or combined solution also falls within the scope of embodiments of this application.

It should be further understood that the foregoing descriptions of embodiments of this application emphasize differences between embodiments. For same or similar parts that are not mentioned, refer to embodiments. For brevity, details are not described herein again.

It should be further understood that a value of a sequence number of each of the foregoing processes does not mean an order of an execution sequence. The execution sequence of each process should be determined based on a function and internal logic of each process, and should not be construed as any limitation on the implementation processes of embodiments of this application.

It should be further understood that in embodiments of this application, "presetting" and "predefinition" may be implemented by pre-storing corresponding code or a corresponding table in a device (including, for example, a terminal or a network device) or in another manner that can be used to indicate related information. A specific implementation is not limited in this application.

It should be further understood that division into the manners, cases, categories, and embodiments in embodiments of this application is merely intended for ease of description, and should not constitute a particular limitation. The features in the manners, categories, cases, and embodiments may be combined without contradiction.

It should be further understood that in embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

The foregoing describes in detail the method provided in embodiments of this application with reference to FIG. 1 to FIG. 24. The following describes in detail communications apparatuses in embodiments of this application with reference to FIG. 25 to FIG. 27.

Figure 25:
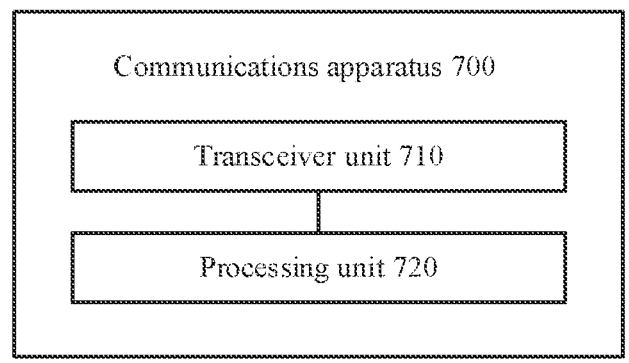
FIG. 25 is a schematic block diagram of another example of a structure of a communications apparatus according to an embodiment of this application.

FIG. 25 is a schematic block diagram of a communications apparatus 700 according to an embodiment of this application.

In a possible implementation, the communications apparatus 700 may correspond to the first terminal device (remote terminal device) described in the method 200 to the method 500, or may be a chip or component used in the first terminal device, and modules or units in the communications apparatus 700 are separately configured to perform actions or processing processes performed by the first terminal device in the method 200 to the method 500. As shown in FIG. 25, the communications apparatus 700 includes a transceiver unit 710 and a processing unit 720. The transceiver unit 710 is configured to specifically receive or send signals under driving of the processing unit 720.

The transceiver unit 710 is configured to receive first configuration information by using a second terminal device, where the first configuration information includes or indicates information used to configure a first sidelink radio link control SL RLC bearer on a sidelink between the communications apparatus and the second terminal device.

The processing unit 720 is configured to establish the first SL RLC bearer based on the first configuration information, where the first SL RLC bearer corresponds to at least one first signaling radio bearer SRB.

The transceiver unit 710 is further configured to transmit control signaling to a network device on the at least one first SRB by using the second terminal device.

According to the communications apparatus provided in this application, the communications apparatus can establish the first SL RLC, so that the second terminal device can transmit the control signaling to the network device on the at least one first SRB. Therefore, the Uu SRB is transmitted on the SL RLC bearer on the sidelink between the communications apparatus and the second terminal device. This can ensure normal transmission of the control signaling on the Uu SRB of the communications apparatus, and improve quality and efficiency of the control signaling transmitted on the Uu SRB.

Optionally, in some embodiments of this application, the first SL RLC bearer is different from a second SL RLC bearer on the sidelink, the second SL RLC bearer corresponds to a second signaling radio bearer SRB, and the communications apparatus transmits control signaling to the second terminal device on the second SRB.

Optionally, in some embodiments of this application, the first configuration information includes:

one or more of SL RLC configuration information corresponding to the first SL RLC bearer, configuration information of a logical channel corresponding to the first SL RLC bearer, an index or identifier of the first SL RLC bearer, an identifier or index of the at least one first SRB, or logical channel identity LCID corresponding to the first SL RLC bearer.

Optionally, in some embodiments of this application, the transceiver unit 710 is further configured to send second configuration information to the second terminal device, where the second configuration information is determined based on the first configuration information.

Optionally, in some embodiments of this application, the second configuration information includes:

a logical channel identity LCID corresponding to the first SL RLC bearer, where the LCID is used to identify a logical channel corresponding to the first SL RLC bearer.

Optionally, in some embodiments of this application, the first configuration information is determined by the second terminal device based on third configuration information, the third configuration information is sent by the network device to the second terminal device, and the third configuration information is used by the second terminal device to establish the first SL RLC bearer.

Optionally, in some embodiments of this application, the transceiver unit 710 is further configured to receive fourth configuration information by using the second terminal device, where the fourth configuration includes configuration information of each of the at least one first SRB, and the configuration information of the first SRB includes packet data convergence protocol PDCP configuration information corresponding to the first SRB, and an index or identifier of the first SL RLC bearer.

Optionally, in some embodiments of this application, the transceiver unit 710 is further configured to send fifth configuration information to the second terminal device, where the fifth configuration information includes or indicates an index or identifier of the first SL RLC bearer and an identifier or index of the at least one first SRB.

Optionally, in some embodiments of this application, a packet data convergence protocol data unit PDCP PDU of the at least one first SRB includes first indication information, and the first indication information is used to indicate a first SRB corresponding to the PDCP PDU.

Optionally, in some embodiments of this application, a protocol stack of the communications apparatus includes an adaptation layer, the adaptation layer is located between a radio link control RLC layer and a packet data convergence protocol PDCP layer, a protocol data unit PDU of the adaptation layer of the at least one first SRB includes second indication information, and the second indication information is used to indicate a first SRB corresponding to the PDU of the adaptation layer.

Optionally, in some embodiments of this application, the at least first SRB includes at least one of a first SRB 0, a first SRB 1, a first SRB 2, and a first SRB 3.

Optionally, in some embodiments of this application, the first configuration information is determined by the network device. The network device sends the first configuration information to the communications apparatus by using the second terminal device. For example, the first configuration information is first sent by the network device to the second terminal device, and then forwarded by the second terminal device to the communications apparatus. That is, the communications apparatus receives, by using the second terminal device, the first configuration information sent by the network device.

In another possible implementation, the communications apparatus 700 includes a transceiver unit 710 and a processing unit 720. The transceiver unit 710 is configured to specifically receive or send signals under driving of the processing unit 720.

The processing unit 720 is configured to obtain first configuration information, where the first configuration information is predefined, and the first configuration information includes or indicates information to configure a first sidelink radio link control SL RLC bearer on a sidelink between a first terminal device and a second terminal device (namely, a relay terminal device). The processing unit 720 is further configured to establish the first SL RLC bearer based on the first configuration information, where the first SL RLC bearer corresponds to at least one first signaling radio bearer SRB. The first terminal device transmits control signaling to a network device on the at least one first SRB by using the second terminal device.

Optionally, in this embodiment of this application, the first SL RLC bearer may alternatively correspond to at least one first DRB, the first DRB may be understood as a Uu DRB, and the first DRB is used to transmit user-plane data between the first terminal device and the network device. In other words, the first SL RLC bearer corresponds to at least one first DRB, or the first SL RLC bearer corresponds to at least one first SRB.

In another possible implementation, the communications apparatus 700 may correspond to the first terminal device (remote terminal device) described in the method 600, or may be a chip or component used in the first terminal device, and modules or units in the communications apparatus 700 are separately configured to perform actions or processing processes performed by the first terminal device in various embodiments of the method 600. The communications apparatus 700 includes a transceiver unit 710 and a processing unit 720. The transceiver unit 710 is configured to specifically receive or send signals under driving of the processing unit 720.

The transceiver unit 710 is configured to obtain a data packet.

The processing unit 720 is configured to determine, based on indication information in the data packet, that the data packet corresponds to a first signaling radio bearer SRB or a second SRB, where the communications apparatus transmits control signaling to a network device on the first SRB by using a second terminal device, and the communications apparatus transmits control signaling to the second terminal device on the second SRB.

According to the communications apparatus provided in this application, when the data packet carried by the first SRB and the data packet carried by the second SRB each are transmitted on a sidelink between the communications apparatus and the second terminal device, the indication information carried in the data packet is parsed, and whether the data packet is the data packet carried by the first SRB or the data packet carried by the second SRB is determined based on the indication information, so that the data packet carried by the first SRB and the data packet carried by the second SRB can be distinguished between. This ensures accurate transmission of the data packet, and improves data transmission efficiency and user experience.

Optionally, in some embodiments of this application, both the first SRB and the second SRB correspond to a same sidelink radio link control SL RLC bearer on the sidelink between the communications apparatus and the second terminal device.

Optionally, in some embodiments of this application, a protocol stack of the communications apparatus includes an adaptation layer, and the adaptation layer is located between a radio link control RLC layer and a packet data convergence protocol PDCP layer. The processing unit is further configured to determine, based on indication information in a protocol data unit PDU of the adaptation layer, that the PDU of the adaptation layer corresponds to the first SRB or the second SRB.

Optionally, in some embodiments of this application, the processing unit 720 is further configured to determine, based on indication information in a packet data convergence protocol data PDCP PDU, that the PDCP PDU corresponds to the first SRB or the second SRB.

Optionally, in some embodiments of this application, the first SRB is a plurality of first SRBs, and the indication information is further used to indicate a first SRB corresponding to the data packet in the plurality of first SRBs.

Optionally, in some embodiments of this application, the indication information is located in a fourth bit and/or a third bit in a first octet oct in the data packet.

Optionally, in some embodiments of this application, the plurality of first SRBs include at least two of a first SRB 0, a first SRB 1, a first SRB 2, and a first SRB 3.

In another possible implementation, the communications apparatus 700 may correspond to the second terminal device (relay terminal device) described in the method 200 to the method 500, or may be a chip or component used in the second terminal device, and modules or units in the communications apparatus 700 are separately configured to perform actions or processing processes performed by the second terminal device in various embodiments of the method 20) to the method 500. The communications apparatus 7A) includes a transceiver unit 710 and a processing unit 720. The transceiver unit 710 is configured to specifically receive or send signals under driving of the processing unit 720.

The processing unit 720 is configured to obtain first configuration information, where the first configuration information includes or indicates information used to configure a first sidelink radio link control SL RLC bearer on a sidelink between a first terminal device (remote terminal device) and the communications apparatus. The processing unit 720 is further configured to establish the first SL RLC bearer based on the first configuration information, where the first SL RLC bearer corresponds to at least one first signaling radio bearer SRB.

Optionally, in some embodiments of this application, the transceiver unit 710 is configured to receive the first configuration information sent by a network device. Optionally, the transceiver unit 710 is further configured to directly forward the first configuration information to the first terminal device. The processing unit 720 does not parse the first configuration information. The transceiver unit 710 is further configured to receive second configuration information sent by the first terminal device, where the second configuration information is determined based on the first configuration information.

Optionally, in some embodiments of this application, the transceiver unit 710 is configured to receive third configuration information sent by the network device. The processing unit 720 is further configured to determine the first configuration information based on the third configuration information, where the third configuration information is used by a second terminal device to establish the first SL RLC bearer. The transceiver unit 710 is further configured to send the first configuration information to the first terminal device.

Optionally, in some embodiments of this application, the transceiver unit 710 is configured to receive third configuration information sent by the network device, where the third configuration information is used by a second terminal device to establish the first SL RLC bearer, and the third configuration information is determined based on the first configuration information.

In another possible implementation, the communications apparatus 700 may correspond to the network device described in the method 200 to the method 500, or may be a chip or component used in the network device, and modules or units in the communications apparatus 700 are separately configured to perform actions or processing processes performed by the network device in various embodiments of the method 200 to the method 500. The communications apparatus 700 includes a transceiver unit 710 and a processing unit 720. The transceiver unit 710 is configured to specifically receive or send signals under driving of the processing unit 720.

Further, the communications apparatus 700 may further include a storage unit, and the transceiver unit 710 may be a transceiver, an input/output interface, or an interface circuit. The storage unit is configured to store instructions executed by the transceiver unit 710 and the processing unit 720. The transceiver unit 710, the processing unit 720, and the storage unit are coupled to each other. The storage unit stores instructions. The processing unit 720 is configured to execute the instructions stored in the storage unit. The transceiver unit 710 is configured to perform specific signal receiving and sending under driving of the processing unit 720.

It should be understood that, for a specific process in which the units in the communications apparatus 700 perform the foregoing corresponding steps, refer to the foregoing descriptions related to the first terminal device in the related embodiments shown in FIG. 11 to FIG. 15, and FIG. 17 to FIG. 21 with reference to the method 200 to the method 600. For brevity, details are not described herein again.

Optionally, the transceiver unit 710 may include a receiving unit (module) and a sending unit (module), configured to perform the steps of receiving information and sending information by the first terminal device (remote terminal device) in embodiments of the method 200 to the method 600 shown in FIG. 11 to FIG. 15 and FIG. 17 to FIG. 21.

It should be understood that, the transceiver unit 710 may be a transceiver, an input/output interface, or an interface circuit. The storage unit may be a memory. The processing unit 720 may be implemented by a processor. As shown m FIG. 26, a communications apparatus 800 may include a processor 810, a memory 820, a transceiver 830, and a bus system 840. Components of the communications apparatus 800 are coupled together by using the bus system 840. Besides including a data bus, the bus system 840 may further include a power bus, a control bus, a status signal bus, and the like. However, for clear description, various buses are marked as the bus system 840 in the FIG. 25. For ease of illustration, FIG. 26 merely shows an example of the bus system 840.

Figure 26:
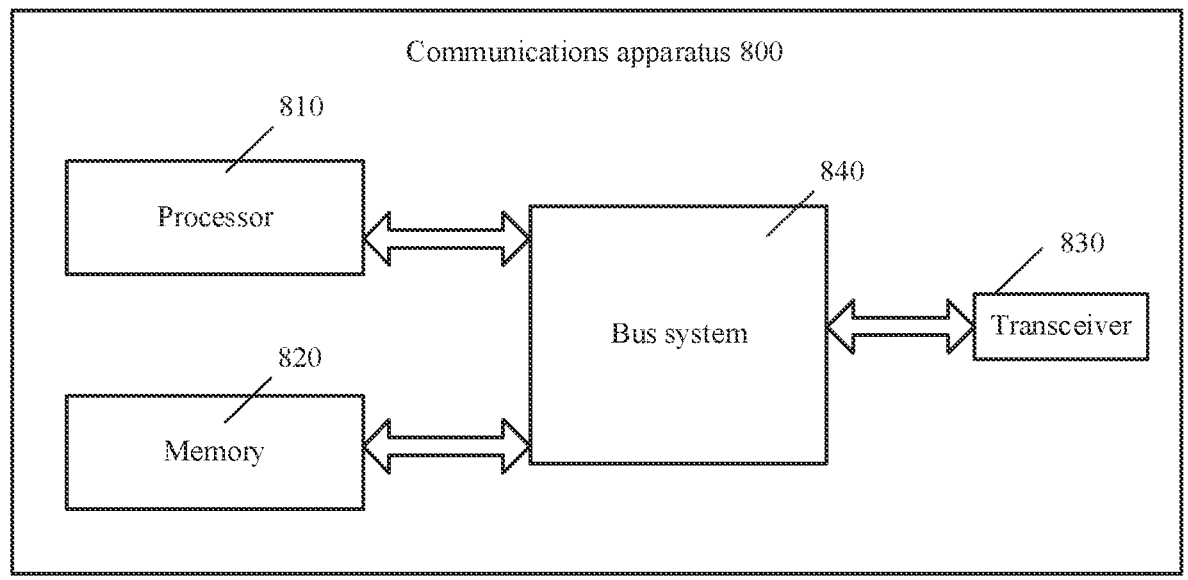
FIG. 26 is a schematic block diagram of still another example of a structure of a communications apparatus according to an embodiment of this application.

The communications apparatus 700 shown in FIG. 25 or the communications apparatus 800 shown in FIG. 26 can implement the steps performed by the first terminal device (remote terminal device) in various embodiments of the method provided in this application. For similar descriptions, refer to the descriptions in the foregoing corresponding methods. To avoid repetition, details are not described herein again.

It should be further understood that the communications apparatus 700 shown in FIG. 25 or the communications apparatus 800 shown in FIG. 26 may be a terminal device.

It should be further understood that division into the units in the communications apparatus is merely logical function division. In an actual implementation, all or some of the units may be integrated into one physical entity, or may be physically separated. In addition, all the units in the communications apparatus may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. The processing element herein may also be referred to as a processor, and may be an integrated circuit having a signal processing capability. During implementation, the steps in the foregoing methods or the foregoing units may be implemented by using a hardware integrated logic circuit in a processor element, or may be implemented in the form of software invoked by the processing element.

For example, units in any one of the foregoing communications apparatuses may be configured as one or more integrated circuits for implementing the foregoing method, for example, one or more application-specific integrated circuits (application-specific integrated circuits, ASICs), one or more digital signal processors (digital signal processors, DSPs), one or more field programmable gate arrays (field programmable gate arrays. FPGAs), or a combination of at least two of these integrated circuit forms. For another example, when the units in the apparatus may be implemented in a form of scheduling a program by the processing element, the processing element may be a general-purpose processor, for example, a central processing unit (central processing unit, CPU) or another processor that can invoke the program. For still another example, the units may be integrated and implemented in a form of a system-on-a-chip (system-on-a-chip, SOC).

Figure 27:
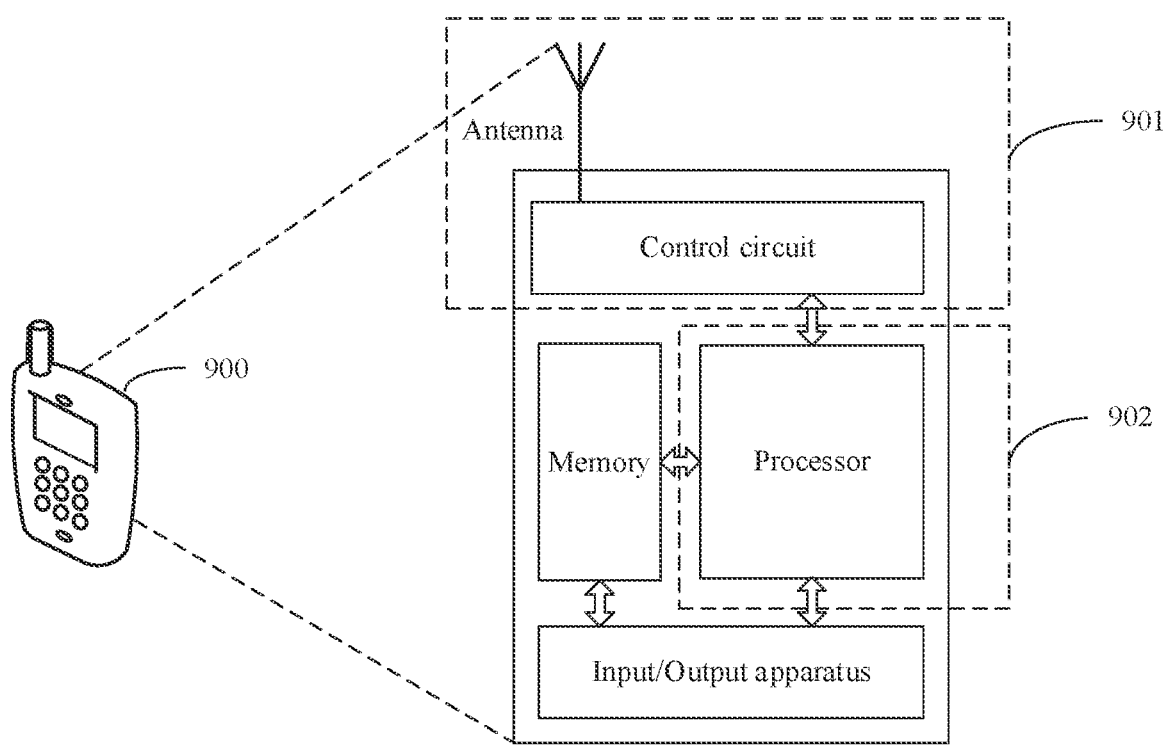
FIG. 27 is a schematic block diagram of another example of a structure of a terminal device according to an embodiment of this application.

FIG. 27 is a schematic diagram of a structure of a terminal device 900 according to this application. The communications apparatus 700 or 800 may be configured in the terminal device 900, or the communications apparatus 700 or 800 may be the terminal device 900. In other words, the terminal device 900 may perform actions performed by the first terminal device in the method 200 to the method 600.

For case of description, FIG. 27 shows only main components of the terminal device. As shown in FIG. 27, the terminal device 900 includes a processor, a memory, a control circuit, an antenna, and an input/output apparatus.

The processor is mainly configured to process a communication protocol and communication data, control the entire terminal device, execute a software program, and process data of the software program, for example, is configured to support the terminal device in performing the actions described in the foregoing embodiments of the indication method for transmitting a precoding matrix. The memory is mainly configured to store the software program and the data, for example, store a codebook described in the foregoing embodiments. The control circuit is mainly configured to convert a baseband signal and a radio frequency signal and process the radio frequency signal. The control circuit and the antenna together may also be referred to as a transceiver, and are mainly configured to receive and send a radio frequency signal in a form of an electromagnetic wav. The input/output apparatus, for example, a touchscreen, a display, or a keyboard, is mainly configured to receive data input by a user, and output data to the user.

After the terminal device is powered on, the processor may read the software program in the storage unit, interpret and execute instructions of the software program, and process data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends outside, by using the antenna, a radio frequency signal in an electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 27 shows only one memory and one processor. In an actual terminal device, there may be a plurality of processors and memories. The memory may also be referred to as a storage medium, a storage device, or the like. This is not limited in this embodiment of this application.

For example, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 27 integrates functions of the baseband processor and the central processing unit. A person skilled in the art may understand that the baseband processor and the central processing unit may be independent processors, and are connected to each other by using technologies such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected through various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor, or may be stored in the storage unit in a form of a software program, and the processor executes the software program to implement a baseband processing function.

For example, in this embodiment of this application, the antenna and the control circuit that have sending and receiving functions may be considered as a transceiver unit 901 of the terminal device 900, and the processor having a processing function may be considered as a processing unit 902 of the terminal device 900. As shown in FIG. 27, the terminal device 900 includes the transceiver unit 901 and the processing unit 902. The transceiver unit may also be referred to as a transceiver machine, a transceiver, a transceiver apparatus, or the like. Optionally, a component that is in the transceiver unit 901 and that is configured to implement a receiving function may be considered as a receiving unit, and a component that is in the transceiver unit 901 and that is configured to implement a sending function may be considered as a sending unit. In other words, the transceiver unit 501 includes the receiving unit and the sending unit. For example, the receiving unit may also be referred to as a receiver, a receive machine, or a receiving circuit, and the sending unit may also be referred to as a transmitter, a transmit machine, or a transmitting circuit.

It should be understood that, in embodiments of this application, the processor may be a central processing unit (central processing unit, CPU), or the processor may be another general-purpose processor, a digital signal processor (digital signal processor. DSP), an application-specific integrated circuit (application-specific integrated circuit. ASIC), a field programmable gate array (field programmable gate array, FPGA), or another programmable logic device, discrete gate or transistor logic device, discrete hardware component, or the like. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By way of example and not limitation, random access memories (random access memories, RAMs) m many forms may be used, for example, a static random access memory (static RAM. SRAM), a dynamic random access memory (dynamic random access memory. DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented using software, hardware, firmware, or any combination thereof. When software is used to implement embodiments, all or some of the foregoing embodiments may be implemented in a form of a computer program product. The computer program product includes one or more computer instructions or computer programs. When the program instructions or the computer programs are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

An embodiment further provides a computer storage medium. The computer storage medium stores computer instructions. When the computer instructions are run on a communications apparatus, the communications apparatus is enabled to perform the foregoing related method steps to implement the signaling radio bearer configuration method and the sidelink data packet transmission method in the foregoing embodiments.

An embodiment further provides a computer program product. When the computer program product runs on a computer, the computer is enabled to perform the foregoing related steps, so as to implement the signaling radio bearer configuration method and the sidelink data packet transmission method in the foregoing embodiments.

In addition, an embodiment of this application further provides an apparatus. The apparatus may be specifically a chip, a component, or a module, and the apparatus may include a processor and a memory that are connected with each other. The memory is configured to store computer-executable instructions. When the apparatus runs, the processor may execute the computer-executable instructions stored in the memory, so that the chip performs the signaling radio bearer configuration method and the sidelink data packet transmission method in the foregoing method embodiments.

The communications apparatus, the computer storage medium, the computer program product, or the chip provided in embodiments is configured to perform the corresponding method provided above. Therefore, for beneficial effects that can be achieved by the communications apparatus, the computer storage medium, the computer program product, or the chip, refer to beneficial effects of the corresponding method provided above. Details are not described herein again.

With reference to the foregoing descriptions, this application further provides the following embodiments.

Embodiment 1: A radio bearer configuration method is provided. The method includes:

A first terminal device receives first configuration information by using a second terminal device, where the first configuration information includes or indicates information used to configure a first sidelink radio link control SL RLC bearer on a sidelink between the first terminal device and the second terminal device.

The first terminal device establishes the first SL RLC bearer based on the first configuration information, where the first SL RLC bearer corresponds to at least one first radio bearer RB.

The first terminal device transmits control signaling or data to a network device on the at least one first RB by using the second terminal device.

Embodiment 2: In the radio bearer configuration method according to Embodiment 1, the first SL RLC bearer is different from a second SL RLC bearer on the sidelink, the second SL RLC bearer corresponds to a second radio bearer RB, and the first terminal device transmits control signaling or data to the second terminal device on the second RB.

Embodiment 3: In the radio bearer configuration method according to Embodiment 1 or Embodiment 2, the first configuration information includes:

one or more of SL RLC configuration information corresponding to the first SL RLC bearer, configuration information of a logical channel corresponding to the first SL RLC bearer, an index or identifier of the first SL RLC bearer, an identifier or index of the at least one first RB, or a logical channel identity LCID corresponding to the first SL RLC bearer.

Embodiment 4: In the radio bearer configuration method according to any one of Embodiment 1 to Embodiment 3, the radio bearer configuration method further includes:

The first terminal device sends second configuration information to the second terminal device, where the second configuration information is determined based on the first configuration information.

Embodiment 5: In the radio bearer configuration method according to Embodiment 4, the second configuration information includes:

a logical channel identity LCID corresponding to the first SL RLC bearer, where the LCID is used to identify a logical channel corresponding to the first SL RLC bearer.

Embodiment 6: In the radio bearer configuration method according to any one of Embodiment 1 to Embodiment 3, the first configuration information is determined by the second terminal device based on third configuration information, the third configuration information is sent by the network device to the second terminal device, and the third configuration information is used by the second terminal device to establish the first SL RLC bearer.

Embodiment 7: In the radio bearer configuration method according to any one of Embodiment 1 to Embodiment 6, the radio bearer configuration method further includes:

The first terminal device receives fourth configuration information by using the second terminal device, where the fourth configuration includes configuration information of each of the at least one first RB, and the configuration information of the first RB includes packet data convergence protocol PDCP configuration information corresponding to the first RB, and an index or identifier of the first SL RLC bearer.

Embodiment 8: In the radio bearer configuration method according to Embodiment 7, the radio bearer configuration method further includes:

The first terminal device sends fifth configuration information to the second terminal device, where the fifth configuration information includes or indicates an index or identifier of the first SL RLC bearer and an identifier or index of the at least one first RB.

Embodiment 9: In the radio bearer configuration method according to Embodiment 7 or Embodiment 8, a packet data convergence protocol data unit PDCP PDU of the at least one first RB includes first indication information, and the first indication information is used to indicate a first RB corresponding to the PDCP PDU.

Embodiment 10: In the radio bearer configuration method according to Embodiment 7 or Embodiment 8, a protocol stack of the first terminal device includes an adaptation layer, the adaptation layer is located between a radio link control RLC layer and a packet data convergence protocol PDCP layer, a protocol data unit PDU of the adaptation layer of the at least one first RB includes second indication information, and the second indication information is used to indicate a first RB corresponding to the PDU of the adaptation layer.

Embodiment 11: In the radio bearer configuration method according to any one of Embodiment 1 to Embodiment 10, the at least one first RB includes at least one of a first RB 0, a first RB 1, a first RB 2, and a first RB 3.

Embodiment 12: In the radio bearer configuration method according to any one of Embodiment 1 to Embodiment 11, the RB is a signaling radio bearer SRB or a data radio bearer DRB.

Embodiment 13: A sidelink data packet transmission method is provided. The method includes:

A first terminal device obtains a data packet.

The first terminal device determines, based on indication information in the data packet, that the data packet corresponds to a first radio bearer RB or a second RB, where the first terminal device transmits control signaling or data to a network device on the first RB by using a second terminal device, and the first terminal device transmits control signaling or data to the second terminal device on the second RB.

Embodiment 14: In the sidelink data packet transmission method according to Embodiment 13, both the first RB and the second RB correspond to a same sidelink radio link control SL RLC bearer on a sidelink between the first terminal device and the second terminal device.

Embodiment 15: In the sidelink data packet transmission method according to Embodiment 13 or Embodiment 14, a protocol stack of the first terminal device includes an adaptation layer, the adaptation layer is located between a radio link control RLC layer and a packet data convergence protocol PDCP layer, and that the first terminal device determines, based on indication information in the data packet, that the data packet corresponds to a first radio bearer RB or a second RB includes:

The terminal device determines, based on indication information in a protocol data unit PDU of the adaptation layer, that the PDU of the adaptation layer corresponds to the first RB or the second RB.

Embodiment 16: In the sidelink data packet transmission method according to Embodiment 13 or Embodiment 14, that the first terminal device determines, based on indication information in the data packet, that the data packet corresponds to a first radio bearer RB or a second RB includes:

The first terminal device determines, based on indication information in a packet data convergence protocol data unit PDCP PDU, that the PDCP PDU corresponds to the first RB or the second RB.

Embodiment 17: In the sidelink data packet transmission method according to any one of Embodiment 13 to Embodiment 16, the first RB is a plurality of first RBs, and the indication information is further used to indicate a first RB corresponding to the data packet in the plurality of first RBs.

Embodiment 18: In the sidelink data packet transmission method according to any one of Embodiment 13 to Embodiment 17, the indication information is located in a fourth bit and/or a third bit in a first octet oct in the data packet.

Embodiment 19: In the sidelink data packet transmission method according to Embodiment 17, the plurality of first RBs include at least two of a first RB 0, a first RB 1, a first RB 2, and a first RB 3.

Embodiment 20: In the sidelink data packet transmission method according to any one of Embodiment 13 to Embodiment 19, the RB is a signaling radio bearer SRB or a data radio bearer DRB.

Embodiment 21: A communications apparatus is provided. The communications apparatus includes a processing unit and a transceiver unit.

The transceiver unit is configured to receive first configuration information by using a second terminal device, where the first configuration information includes or indicates information used to configure a first sidelink radio link control SL RLC bearer on a sidelink between the communications apparatus and the second terminal device.

The processing unit is configured to establish the first SL RLC bearer based on the first configuration information, where the first SL RLC bearer corresponds to at least one first radio bearer RB.

The transceiver unit is further configured to transmit control signaling or data to a network device on the at least one first RB by using the second terminal device.

Embodiment 22: In the communications apparatus according to Embodiment 21, the first SL RLC bearer is different from a second SL RLC bearer on the sidelink, the second SL RLC bearer corresponds to a second radio bearer RB, and the communications apparatus transmits control signaling and data with the second terminal device on the second RB.

Embodiment 23: In the communications apparatus according to Embodiment 21 or Embodiment 22, the first configuration information includes:

one or more of SL RLC configuration information corresponding to the first SL RLC bearer, configuration information of a logical channel corresponding to the first SL RLC bearer, an index or identifier of the first SL RLC bearer, an identifier or index of the at least one first RB, or a logical channel identity LCID corresponding to the first SL RLC bearer.

Embodiment 24: In the communications apparatus according to any one of Embodiment 21 to Embodiment 23, the transceiver unit is further configured to send second configuration information to the second terminal device, where the second configuration information is determined based on the first configuration information.

Embodiment 25: In the communications apparatus according to Embodiment 24, the second configuration information includes: a logical channel identity LCID corresponding to the first SL RLC bearer, where the LCID is used to identify a logical channel corresponding to the first SL RLC bearer.

Embodiment 26: In the communications apparatus according to any one of Embodiment 21 to Embodiment 25, the first configuration information is determined by the second terminal device based on third configuration information, the third configuration information is sent by the network device to the second terminal device, and the third configuration information is used by the second terminal device to establish the first SL RLC bearer.

Embodiment 27: In the communications apparatus according to any one of Embodiment 21 to Embodiment 26, the transceiver unit is further configured to receive fourth configuration information by using the second terminal device, where the fourth configuration includes configuration information of each of the at least one first RB, and the configuration information of the first RB includes packet data convergence protocol PDCP configuration information corresponding to the first RB, and an index or identifier of the first SL RLC bearer.

Embodiment 28: In the communications apparatus according to Embodiment 27, the transceiver unit is further configured to send fifth configuration information to the second terminal device, where the fifth configuration information includes or indicates an index or identifier of the first SL RLC bearer and an identifier or index of the at least one first RB.

Embodiment 29: In the communications apparatus according to Embodiment 27 or Embodiment 28, a packet data convergence protocol data unit PDCP PDU of the at least one first RB includes first indication information, and the first indication information is used to indicate a first RB corresponding to the PDCP PDU.

Embodiment 30: In the communications apparatus according to Embodiment 27 or Embodiment 28, a protocol stack of the communications apparatus includes an adaptation layer, the adaptation layer is located between a radio link control RLC layer and a packet data convergence protocol PDCP layer, a protocol data unit PDU of the adaptation layer of the at least one first RB includes second indication information, and the second indication information is used to indicate a first RB corresponding to the PDU of the adaptation layer.

Embodiment 31: In the communications apparatus according to any one of Embodiment 21 to Embodiment 30, the at least one first RB includes at least one of a first RB 0, a first RB 1, a first RB 2, and a first RB 3.

Embodiment 32: In the communications apparatus according to any one of Embodiment 21 to Embodiment 31, the RB is a signaling radio bearer SRB or a data radio bearer DRB.

Embodiment 33: A communications apparatus is provided. The communications apparatus includes a processing unit and a transceiver unit.

The transceiver unit is configured to obtain a data packet.

The processing unit is configured to determine, based on indication information in the data packet, that the data packet corresponds to a first radio bearer RB or a second RB, where the communications apparatus transmits control signaling or data to a network device on the first RB by using a second terminal device, and the communications apparatus transmits control signaling or data to the second terminal device on the second RB.

Embodiment 34: In the communications apparatus according to Embodiment 33, both the first RB and the second RB correspond to a same sidelink radio link control SL RLC bearer on a sidelink between the communications apparatus and the second terminal device.

Embodiment 35: In the communications apparatus according to Embodiment 33 or Embodiment 34, a protocol stack of the communications apparatus includes an adaptation layer, the adaptation layer is located between a radio link control RLC layer and a packet data convergence protocol PDCP layer, and the processing unit is further configured to determine, based on indication information in a protocol data unit PDU of the adaptation layer, that the PDU of the adaptation layer corresponds to the first RB or the second RB.

Embodiment 36: In the communications apparatus according to Embodiment 33 or Embodiment 34, the processing unit is further configured to determine, based on indication information in a packet data convergence protocol data unit PDCP PDU, that the PDCP PDU corresponds to the first RB or the second RB.

Embodiment 37: In the communications apparatus according to any one of Embodiment 33 to Embodiment 36, the first RB is a plurality of first RBs, and the indication information is further used to indicate a first RB corresponding to the data packet in the plurality of first RBs.

Embodiment 38: In the communications apparatus according to any one of Embodiment 33 to Embodiment 37, the indication information is located in a fourth bit and/or a third bit in a first octet oct in the data packet.

Embodiment 39: In the communications apparatus according to Embodiment 37, the plurality of first RBs include at least two of a first RB 0, a first RB 1, a first RB 2, and a first RB 3.

Embodiment 40: In the communications apparatus according to any one of Embodiment 33 to Embodiment 39, the RB is a signaling radio bearer SRB or a data radio bearer DRB.

Embodiment 41: A communications apparatus is provided. The communications apparatus may be a terminal, a chip in the terminal, or a system-on-a-chip, the communications apparatus includes a processor and a memory, the memory stores instructions, and when the instructions are executed by the processor, the communications apparatus is enabled to perform the following steps:

receiving first configuration information by using a second terminal device, where the first configuration information includes or indicates information used to configure a first sidelink radio link control SL RLC bearer on a sidelink between the communications apparatus and the second terminal device;

establishing the first SL RLC bearer based on the first configuration information, where the first SL RLC bearer corresponds to at least one first radio bearer RB; and transmitting control signaling or data to a network device on the at least one first RB by using the second terminal device.

Embodiment 42: In the communications apparatus according to Embodiment 41, the first SL RLC bearer is different from a second SL RLC bearer on the sidelink, the second SL RLC bearer corresponds to a second radio bearer RB, and the communications apparatus transmits control signaling and data with the second terminal device on the second RB.

Embodiment 43: In the communications apparatus according to Embodiment 41 or Embodiment 42, the first configuration information includes:

one or more of SL RLC configuration information corresponding to the first SL RLC bearer, configuration information of a logical channel corresponding to the first SL RLC bearer, an index or identifier of the first SL RLC bearer, an identifier or index of the at least one first RB, or a logical channel identity LCID corresponding to the first SL RLC bearer.

Embodiment 44: In the communications apparatus according to any one of Embodiment 41 to Embodiment 43, the communications apparatus further performs the following step: sending second configuration information to the second terminal device, where the second configuration information is determined based on the first configuration information.

Embodiment 45: In the communications apparatus according to Embodiment 44, the second configuration information includes:

a logical channel identity LCID corresponding to the first SL RLC bearer, where the LCID is used to identify a logical channel corresponding to the first SL RLC bearer.

Embodiment 46: In the communications apparatus according to any one of Embodiment 41 to Embodiment 45, the first configuration information is determined by the second terminal device based on third configuration information, the third configuration information is sent by the network device to the second terminal device, and the third configuration information is used by the second terminal device to establish the first SL RLC bearer.

Embodiment 47: In the communications apparatus according to any one of Embodiment 41 to Embodiment 46, the communications apparatus further performs the following step: receiving fourth configuration information by using the second terminal device, where the fourth configuration includes configuration information of each of the at least one first RB, and the configuration information of the first RB includes packet data convergence protocol PDCP configuration information corresponding to the first RB, and an index or identifier of the first SL RLC bearer.

Embodiment 48: In the communications apparatus according to Embodiment 47, the communications apparatus further performs the following step: sending fifth configuration information to the second terminal device, where the fifth configuration information includes or indicates an index or identifier of the first SL RLC bearer and an identifier or index of the at least one first RB.

Embodiment 49: In the communications apparatus according to Embodiment 47 or Embodiment 48, a packet data convergence protocol data unit PDCP PDU of the at least one first RB includes first indication information, and the first indication information is used to indicate a first RB corresponding to the PDCP PDU.

Embodiment 50: In the communications apparatus according to Embodiment 48 or Embodiment 49, a protocol stack of the communications apparatus includes an adaptation layer, the adaptation layer is located between a radio link control RLC layer and a packet data convergence protocol PDCP layer, a protocol data unit PDU of the adaptation layer of the at least one first RB includes second indication information, and the second indication information is used to indicate a first RB corresponding to the PDU of the adaptation layer.

Embodiment 51: In the communications apparatus according to any one of Embodiment 41 to Embodiment 50, the at least one first RB includes at least one of a first RB 0, a first RB 1, a first RB 2, and a first RB 3.

Embodiment 52: In the communications apparatus according to any one of Embodiment 41 to Embodiment 51, the RB is a signaling radio bearer SRB or a data radio bearer DRB.

Embodiment 53: A communications apparatus is provided. The communications apparatus may be a terminal, a chip in the terminal, or a system-on-a-chip, the communications apparatus includes a processor and a memory, the memory stores instructions, and when the instructions are executed by the processor, the communications apparatus is enabled to perform the following steps:

obtaining a data packet; and determining, based on indication information in the data packet, that the data packet corresponds to a first radio bearer RB or a second RB, where the communications apparatus transmits control signaling or data to a network device on the first RB by using a second terminal device, and the communications apparatus transmits control signaling or data to the second terminal device on the second RB.

Embodiment 54: In the communications apparatus according to Embodiment 53, both the first RB and the second RB correspond to a same sidelink radio link control SL RLC bearer on a sidelink between the communications apparatus and the second terminal device.

Embodiment 55: In the communications apparatus according to Embodiment 53 or Embodiment 54, a protocol stack of the communications apparatus includes an adaptation layer, the adaptation layer is located between a radio link control RLC layer and a packet data convergence protocol PDCP layer, and the communications apparatus further performs the following step: determining, based on indication information in a protocol data unit PDU of the adaptation layer, that the PDU of the adaptation layer corresponds to the first RB or the second RB.

Embodiment 56: In the communications apparatus according to Embodiment 54 or Embodiment 55, the communications apparatus further performs the following step: determining, based on indication information in a packet data convergence protocol data unit PDCP PDU, that the PDCP PDU corresponds to the first RB or the second RB.

Embodiment 57: In the communications apparatus according to any one of Embodiment 53 to Embodiment 56, the first RB is a plurality of first RBs, and the indication information is further used to indicate a first RB corresponding to the data packet in the plurality of first RBs.

Embodiment 58: In the communications apparatus according to any one of Embodiment 53 to Embodiment 57, the indication information is located in a fourth bit and/or a third bit in a first octet oct in the data packet.

Embodiment 59: In the communications apparatus according to Embodiment 57, the plurality of first RBs include at least two of a first RB 0, a first RB 1, a first RB 2, and a first RB 3.

Embodiment 60: In the communications apparatus according to any one of Embodiment 53 to Embodiment 59, the RB is a signaling radio bearer SRB or a data radio bearer DRB.

Embodiment 61: A computer program product is provided. When the computer program product runs on a computer, the computer is enabled to perform the method according to any one of Embodiment 1 to Embodiment 12.

Embodiment 62: A computer program product is provided. When the computer program product nms on a computer, the computer is enabled to perform the method according to any one of Embodiment 13 to Embodiment 20.

Embodiment 63: A computer-readable storage medium is provided. The computer-readable storage medium stores instructions, and when the instructions are run on a computer, the computer is enabled to perform the method according to any one of Embodiment 1 to Embodiment 12.

Embodiment 64: A computer-readable storage medium is provided. The computer-readable storage medium stores instructions, and when the instructions are run on a computer, the computer is enabled to perform the method according to any one of Embodiment 13 to Embodiment 20.

Embodiment 65: A chip is provided. The chip includes a processor, and when the processor executes instructions, the processor is configured to perform the method according to any one of Embodiment 1 to Embodiment 12. The instructions may be from a memory inside the chip, or may be from a memory outside the chip. Optionally, the chip further includes an input/output circuit.

Embodiment 66: A chip is provided. The chip includes a processor, and when the processor executes instructions, the processor is configured to perform the method according to any one of Embodiment 13 to Embodiment 20. The instructions may be from a memory inside the chip, or may be from a memory outside the chip. Optionally, the chip further includes an input/output circuit.

Based on descriptions about the foregoing implementations, a person skilled in the art may understand that, for a purpose of convenient and brief description, division into the foregoing function modules is used as an example for illustration. In actual application, the foregoing functions may be allocated to different function modules and implemented according to a requirement. In other words, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, division into the modules or units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed at different places. Some or all of the units may be selected according to actual requirements to achieve the objectives of the solutions in embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A signaling radio bearer (SRB) configuration method implemented by a first terminal device or a chip in a first terminal device, wherein the SRB configuration method comprises:
receiving first configuration information from a second terminal device, wherein the first configuration information comprises or indicates information for configuring a first sidelink radio link control (SL RLC) bearer on a sidelink between the first terminal device and the second terminal device;
establishing, based on the first configuration information, the first SL RLC bearer, wherein the first SL RLC bearer corresponds to a first SRB, wherein the first SRB is configured to transmit first control signaling between the first terminal device and a network device, wherein the first SL RLC bearer is different from a second SL RLC bearer on the sidelink, wherein the second SL RLC bearer corresponds to a second SRB, and wherein the second SRB is configured to transmit second control signaling between the first terminal device and the second terminal device; and SRB; and
transmitting the first control signaling to the network device on the first SRB through the second terminal device.

2. The SRB configuration method of claim 1, wherein the first configuration information comprises SL RLC configuration information corresponding to the first SL RLC bearer, logical channel configuration information corresponding to the first SL RLC bearer, a first index or a first identifier of the first SL RLC bearer, a second index or a second identifier of the first SRB, or a logical channel identity (LCID) corresponding to the first SL RLC bearer.

3. The SRB configuration method of claim 1, further comprising sending second configuration information to the second terminal device, wherein the second configuration information is based on the first configuration information.

4. The SRB configuration method of claim 3, wherein the second configuration information comprises a logical channel identity (LCID) corresponding to the first SL RLC bearer, and wherein the LCID is for identifying a logical channel corresponding to the first SL RLC bearer.

5. The SRB configuration method of claim 1, wherein the first terminal device is a remote terminal device, wherein the second terminal device is a relay terminal device, wherein the first SRB is a Uu SRB, and wherein the second SRB is a SL SRB.

6. An apparatus being a first terminal device or a chip in a first terminal device, comprising:
a memory configured to store instructions; and
one or more processors coupled to memory and configured to execute the instructions to:
receive first configuration information from a second terminal device, wherein the first configuration information comprises or indicates information for configuring a first sidelink radio link control (SL RLC) bearer on a sidelink between the first terminal device and the second terminal device;
establish, based on the first configuration information, the first SL RLC bearer, wherein the first SL RLC bearer corresponds to a first signaling radio bearer (SRB), wherein the first SRB is configured to transmit first control signaling between the first terminal device and a network device, wherein the first SL RLC bearer is different from a second SL RLC bearer on the sidelink, wherein the second SL RLC bearer corresponds to a second SRB, and wherein the second SRB is configured to transmit second control signaling between the first terminal device and the second terminal device; and (SRB); and
transmit the first control signaling to the network device on the first SRB through the second terminal device.

7. The apparatus of claim 6, wherein the first configuration information comprises one or more of SL RLC configuration information corresponding to the first SL RLC bearer, logical channel configuration information corresponding to the first SL RLC bearer, a first index or a first identifier of the first SL RLC bearer, a second index or a second identifier of the first SRB, or a logical channel identity (LCID) corresponding to the first SL RLC bearer.

8. The apparatus of claim 6, wherein the one or more processors are is further configured to execute the instructions to send second configuration information to the second terminal device, and wherein the second configuration information is based on the first configuration information.

9. The apparatus of claim 8, wherein the second configuration information comprises a logical channel identity (LCID) corresponding to the first SL RLC bearer, and wherein the LCID is for identifying a logical channel corresponding to the first SL RLC bearer.

10. The apparatus of claim 6, wherein the first terminal device is a remote terminal device, wherein the second terminal device is a relay terminal device, wherein the first SRB is a Uu SRB, and wherein the second SRB is a SL SRB.

11. An apparatus being a second terminal device or a chip in a second terminal device, comprising:
a memory configured to store instructions; and
one or more processors coupled to the memory and configured to execute the instructions to:
receive first configuration information from a network device, wherein the first configuration information comprises or indicates information for configuring a first sidelink radio link control (SL RLC) bearer on a sidelink between a first terminal device and the second terminal device and a first relationship between the first SL RLC bearer and a first signaling radio bearer (SRB) of the first terminal device, wherein the first SRB is configured to transmit first control signaling between the first terminal device and the network device, wherein the first SL RLC bearer is different from a second SL RLC bearer on the sidelink, wherein the second SL RLC bearer corresponds to a second SRB, and wherein the second SRB is configured to transmit second control signaling between the first terminal device and the second terminal device;
establish, based on the first configuration information, the first SL RLC bearer, wherein the first SL RLC bearer corresponds to the first SRB; and
transmit the first control signaling to the network device on the first SRB.

12. The apparatus of claim 11, wherein the first configuration information comprises SL RLC configuration information corresponding to the first SL RLC bearer, logical channel configuration information corresponding to the first SL RLC bearer, a first index or a first identifier of the first SL RLC bearer, a second index or a second identifier of the first SRB, or a logical channel identity (LCID) corresponding to the first SL RLC bearer.

13. The apparatus of claim 11, wherein the first configuration information comprises a second relationship between the first SRB and a first Uu RLC bearer, and wherein the second terminal device transmits second control signaling to the network device on the first Uu RLC bearer.

14. The apparatus of claim 11, wherein the second terminal device further comprises an adaptation layer, wherein the one or more processors are further configured to execute the instructions to receive data from the adaptation layer, wherein the adaptation layer includes first indication information, and wherein the first indication information is to indicate the data received from the adaptation layer corresponding to the first SRB.

15. The apparatus of claim 14, wherein the one or more processors are further configured to execute the instructions to identify whether the data from the adaptation layer corresponds to the first SRB based on the first indication information and the first relationship, and wherein the first relationship is that between SL RLC bearer and at least one first SRBs of the first terminal device.

16. The apparatus of claim 11, wherein the second terminal device is configured to be implemented in a vehicle-to-everything (V2X) or a device-to-device (D2D) communication system.

17. The apparatus of claim 11, wherein the second terminal device is configured to be implemented in a Long-Term Evolution (LTE), a fifth generation (5G), or a WI-FI communication system.

18. The apparatus of claim 11, wherein the network device comprises an evolved node B (eNodeB), a base station, or an access point.

19. The apparatus of claim 11, wherein the network device comprises a handheld device or a vehicle-mounted device.

20. The apparatus of claim 11, wherein the first terminal device comprises a remote device, wherein the second terminal device comprises a relay device, wherein the first SRB is a Uu SRB, and wherein the second SRB is a SL SRB.

* * * * *